(12) United States Patent
Hiraguchi et al.

(10) Patent No.: US 7,380,739 B2
(45) Date of Patent: Jun. 3, 2008

(54) MAGNETIC TAPE CASSETTES

(75) Inventors: Kazuo Hiraguchi, Kanagawa (JP);
Wataru Iino, Kanagawa (JP); Shozo Onmori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/470,107

(22) Filed: Sep. 5, 2006

(65) Prior Publication Data

US 2007/0018025 A1  Jan. 25, 2007

Related U.S. Application Data

(62) Division of application No. 10/209,257, filed on Aug. 1, 2002, now Pat. No. 7,121,493.

(30) Foreign Application Priority Data

Aug. 1, 2001  (JP) .............................. 2001-233941

(51) Int. Cl.
*G11B 23/04* (2006.01)
(52) U.S. Cl. .................................. 242/345.2
(58) Field of Classification Search ............... 242/345, 242/345.2, 348; 360/132
See application file for complete search history.

(56) References Cited

U.S. PATENT DOCUMENTS

| 3,801,042 | A | * | 4/1974 | Dobson |
| 3,934,839 | A | * | 1/1976 | Serizawa |
| 4,083,508 | A | | 4/1978 | Pattillo |
| 4,289,282 | A | | 9/1981 | Kohno |
| 4,385,331 | A | | 5/1983 | Schoettle et al. |

(Continued)

FOREIGN PATENT DOCUMENTS

DE  91 11 545  3/1992

(Continued)

OTHER PUBLICATIONS

Japanese Office Action dated Nov. 24, 2006.

(Continued)

*Primary Examiner*—William A Rivera
(74) *Attorney, Agent, or Firm*—Sughrue Mion, PLLC

(57) ABSTRACT

A magnetic tape cassette includes a case that is formed by joining an upper half and a lower half, one or more tape reels, a window and a reel urging member having a tape reel contacting portion which contacts an upper part of the tape reel(s), bent arms connected to opposite sides of the tape reel contacting portion and sliding end portions provided at distal ends of the bent arm. A slide groove is provided in an inner surface of a perimeter of a window opening in the upper half and a window member has hold-and-retain portions which hold the sliding end portions in cooperation with a bottom surface of the slide groove into which the sliding end portions have been fitted. A tape reel suitable for use with the magnetic tape cassette, a resinous leaf spring and its production process are also provided. Tape reels housed in a cassette case can be urged toward the lower half by a member whose structure is simple and permits easy fitting and removal. Assorted collection of constituent materials, particularly for assorted collection of resin materials and selective collection of resin materials as separate from metal materials are possible.

12 Claims, 24 Drawing Sheets

U.S. PATENT DOCUMENTS

| | | |
|---|---|---|
| 4,473,194 A | 9/1984 | Kahimura |
| 4,496,118 A * | 1/1985 | Oishi et al. ............... 242/345.2 |
| 4,629,144 A * | 12/1986 | Schoettle ................. 242/345.2 |
| 4,662,579 A | 5/1987 | Gelardi et al. |
| 5,094,434 A | 3/1992 | Ryu |
| 5,114,089 A | 5/1992 | Posso |
| 5,379,960 A * | 1/1995 | Kaneda et al. ........... 242/345.2 |
| 5,727,752 A | 3/1998 | Matsuzoe |
| 5,803,401 A | 9/1998 | Matsuzoe |
| 5,881,960 A * | 3/1999 | Christie |
| 5,950,962 A | 9/1999 | Cheng |
| 6,154,342 A | 11/2000 | Vanderheyden et al. |
| 6,257,519 B1 | 7/2001 | Willems et al. |
| 6,364,246 B1 | 4/2002 | Huang |
| 6,643,096 B2 * | 11/2003 | Ashikawa et al. .......... 360/132 |
| 7,165,738 B2 * | 1/2007 | Hiraguchi et al. ........ 242/345.2 |

FOREIGN PATENT DOCUMENTS

| | | |
|---|---|---|
| DE | 42 08 690 A1 | 10/1992 |
| JP | 5253205 Y | 12/1977 |
| JP | 60166879 U | 11/1985 |
| JP | 3242889 A | 10/1991 |
| JP | 11273295 A | 10/1999 |
| JP | 11328915 | 11/1999 |
| JP | 11328915 A | 11/1999 |

OTHER PUBLICATIONS

German Office Action dated Apr. 27, 2007.

* cited by examiner

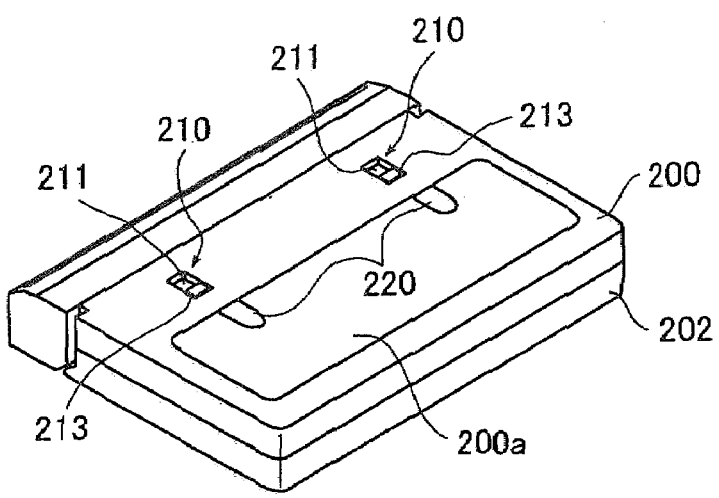
FIG.16A
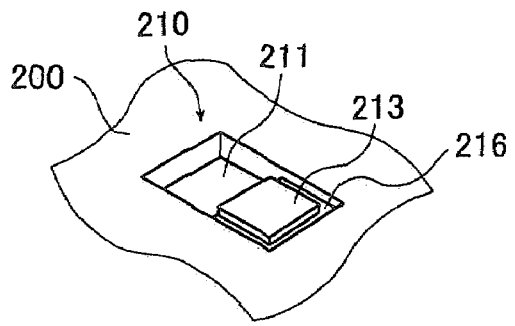
FIG.16B
FIG.17
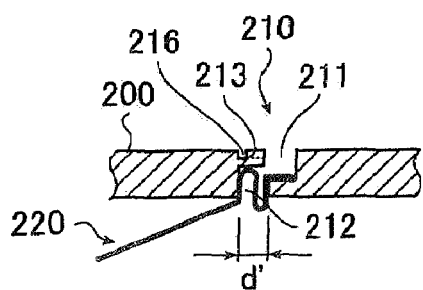
FIG.18
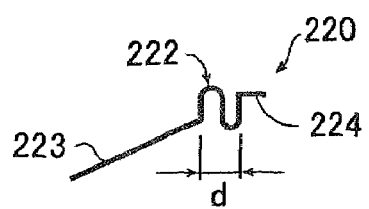

MAGNETIC TAPE CASSETTES

This is a divisional of application Ser. No. 10/209,257 filed Aug. 1, 2002. The entire disclosure of the prior application, application Ser. No. 10/209,257 is hereby incorporated by reference.

BACKGROUND OF THE INVENTION

This invention relates to magnetic tape cassettes such as digital video cassette (DVC), tape reels for use with them that can be broken down into parts, resinous (plastic) leaf springs, and a process for producing them.

More specifically, the invention relates to a magnetic tape cassette that has magnetic tape housed in a case made by joining an upper and a lower half in a face-to-face relationship and which can be disposed of by assorting the constituent materials simply enough to reduce the impact on the environment, thereby facilitating the recycling of the used cassette.

In order to ensure that the magnetic tape cassette discarded after use is broken down into various parts which are then assorted by material and recycled as feedstock for a second production, the invention also provides tape reels in a magnetic tape cassette which are of such a structure that the lower flange can be easily separated from the upper flange, the two flanges capable of being securely joined together at high enough precision in assembly to minimize wobbling of the upper flange.

The invention also relates to resinous (plastic) leaf springs that can be molded while achieving proper adjustment of spring load, as well as a process for producing such leaf springs.

Recording media cartridges and cassettes conventionally used as the recording media in external storages in computers and the like are divided into two major classes, magnetic or magneto-optical disk cartridges, etc. that use disks such as magnetic disks or magneto-optical disks as the recording media, and magnetic tape cartridges or cassettes, etc. that use magnetic tape as the recording media (and which are hereunder collectively referred to as "magnetic tape cassettes").

The magnetic or magneto-optical disk cartridges and the magnetic tape cassettes are also used to record and store data from computers and the like. In order to protect the stored valuable or important information, design consideration is made such that magnetic or magneto-optical disks will not be damaged or that magnetic tape will not jam or receive damage or will not be pulled accidentally out of the record/reproduce apparatus.

The magnetic tape cassettes of the second class are used as record/reproduce media in consumer or professional sound or image recording/reproducing apparatus (including various types of recorders such as video tape recorder and video cameras) or as large-capacity recording media to back up data in external storages in computers and the like.

Such magnetic tape cassettes are available in two types, the first type comprising magnetic tape stretched between a pair of tape reels that are housed rotatably within a case (body case) composed of an upper and a lower half (this is a so-called two-reel type) and the second type comprising magnetic tape wound around a single tape reel which is also housed rotatably in the case (this is a so-called one-reel type). Known examples of such magnetic tape cassettes include those whose structural and dimensional specifications are described in JIS X6127, X6129, X6130, X6171 and X6172, as well as in ECMA-288, etc.

On the pages that follow, a magnetic tape cassette of a two-reel type is described specifically as an example of the magnetic tape cassette. Intended typically for use as a digital video cassette (DVC), it consists of a case that contains a pair of tape reels around which magnetic tape is wound and which allow the magnetic tape to run for information recording and reproduction.

FIG. 53 is an exploded perspective view showing the structure of the prior art two-reel type magnetic tape cassette. As shown, the case of the magnetic tape cassette which is generally indicated by 450 consists of an upper half 452 and a lower half 454 that each have a rectangular bottom plate and peripheral walls and which are joined in a face-to-face relationship and secured by a plurality of fasteners such as screws 455 (which are five in the illustrated case).

In the interior of the case 450 which is composed of the upper half 452 and the lower half 454, magnetic tape 458 which is stretched between a pair of tape reels 456, one on the supply side and the other on the take-up side, is rotatably housed. Various other parts are also housed in the interior of the case 450. The pair of tape reels 456 are positioned along a sidewall 454*c* of the lower half 454 and their movement in a plane is regulated by, for example, a plurality of ribs 454*e* erected on the bottom plate 454*a* of the lower half 454. Each of the tape reels 456 consists of a reel hub (take-up hub) 456*b* to which an upper flange 456*c* and a lower flange 456*d* are both welded.

The bottom plate 454*a* of the lower half 454 has two extensions 460 that extend from the right and left sides in a forward direction (to the left in FIG. 53). The extensions 460 have semi-cylindrical tape guides 464 that stand vertically on the bottom plate 454*a* and by which the magnetic tape 458 stretched between the tape reels 456 is allowed to thread through a predetermined path to become exposed in an opening 462 at the front face of the cassette case. The space between the extensions 460 is not occupied by the lower half 454 but forms the opening 462 in the cassette case.

The bottom plate 454*a* of the lower half 454 also has two reel shaft insertion holes 454*b*. By means of the insertion holes 454*b*, a pair of tape reels 456 between which the magnetic tape 458 is stretched are supported rotatably and, in addition, when the magnetic tape cassette is loaded on the record/reproduce apparatus, reel shafts (not shown) on the record/reproduce apparatus pass through insertion holes (not shown) in the lower side of the tape reels 456 to engage them and thereby drive them to rotate.

The bottom plate 452*a* of the upper half 452 has openings so that the amount in which the magnetic tape 458 has been wound around the tape reels 456 can be seen (checked visually) from the outside of the case 450. In the openings, transparent window members (inspection windows) 452*b* made of transparent plastic (resin) are mounted by a suitable method such as ultrasonic or thermal welding.

A pair of reel retaining springs 466 in the form of a metallic leaf-like reel urging spring are provided on the inner surface of the upper half 452 (the lower surface in FIG. 53) in positions that correspond to the respective tape reels 456. Each of the reel retaining springs 466 is a leaf spring; its distal end portion 466*a* is bent downwardly and its basal end portion 466*b* is fastened to the lower surface of the bottom plate 452*a* of the upper half 452 (its inner surface) by a suitable means such as screwing, ultrasonic welding or thermal welding (neither is shown) so that the distal end portion 466*a* is cantilevered and depresses the center of the corresponding tape reel 456 to be urged toward the lower half 454.

In order to ensure that dust will not get into the upper half 452 when the magnetic tape cassette is not in service, the front face of the upper half 452 (the left lateral face in FIG. 53) is fitted with a front cover (lid) 467 which covers and protects the magnetic tape 458 (its front and back sides) as it is stretched between a pair of tape guides 464 on the lower half 454. The front cover (lid) 467 consists of three members, an outer lid 468, an upper lid 470 and an inner lid 472. The outer lid 468 has lock pins (guide pins) 474 that project inwardly from both lateral plates 468a. Since the lock pins 474 fit into engage-and-stop grooves 452d in two sidewalls 452c of the upper half 452, the whole of the front cover 467 can rotate to open in a direction approaching the upper surface of the upper half 452. On the other hand, torsion coil springs 475 fitted on the lock pins 474 urge the lid 467 in such a direction that it closes the opening 462 between the two extensions 460 of the bottom plate 454a of the lower half 454 of the magnetic tape cassette.

Sidewall portions 454c of the lower half 454 are fitted with rotatable lid locking members 476 that engage the lock pins 474 on the outer lid 468 to keep it closed. The lid locking members 476 are urged to engage the lock pins 474 by means of lid locking springs (not shown) which are similarly mounted on the lower half 454.

When the magnetic tape cassette is taken out of the record/reproduce apparatus, the lid locking members 476 keep the outer lid 468 closed so that the operator will not inadvertently touch the magnetic tape 458. When the magnetic tape cassette is reloaded into the record/reproduce apparatus, the engagement is removed by release pins (not shown) that project from the record/reproduce apparatus, whereupon the outer lid 468 can be rotated to open.

The lower half 454 also has a tape reel locking member 478 mounted in the rear end portion (the right farther end in FIG. 53). The tape reel locking member 478 has tape reel engage-and-stop arms 478a and a slidable body 478b. The slidable body 478b is slidably held by a pair of guide ribs 454d erected on the bottom plate 454a of the lower half 454 and it is urged forward by a compressive coil spring 480; as a result, each of the tape reel engage-and-stop arms 478a that spread in a V-shape come into engagement at the distal end with engaging teeth 456a formed on the circumference of the lower flange of the corresponding tape reel 456, thereby preventing it from rotating to ensure that the magnetic tape 458 will not unwind accidentally to get slack.

The lower half 454 is also fitted with an anti-erasure plug 482 that prevents inadvertent erasure of the data recorded on the magnetic tape 458. The anti-erasure plug 482 has a finger that projects from a lateral surface (the farthest side in FIG. 53) to become exposed to the outside through an opening in a peripheral wall of the upper half 452. By external manipulation of the finger, the anti-erasure plug 482 can be moved back and forth along a guide rib erected on the bottom plate 454a of the lower half 454, thereby closing or opening a detection hole in the bottom plate 454a of the lower half 454. A machine such as the record/reproduce apparatus reads the state of the detection hole and, depending on whether it is open or closed, determines whether new data can be written to the magnetic tape 458.

The upper half 452, the lower half 454, the front cover 467 (i.e., the outer lid 468, the upper lid 470 and the inner lid 472) and other principal components of the magnetic tape cassette are formed of the same resin (plastic) material by injection molding. The tape reels 456 (each consisting of the reel hub 456b, the upper flange 456c and the lower flange 456d), the tape reel locking member 478 and other members are formed of a different plastic material by injection molding. The magnetic tape cassette may of course use other injection molded members as appropriate.

As already mentioned, the conventional magnetic tape cassette uses the reel retaining springs 466 that keep the tape reels 456 from rotating in order to ensure that the magnetic tape 458 will not get slack or otherwise deteriorate. The reel retaining springs 466 are metallic reel urging springs.

As shown in FIG. 53, such metallic reel urging springs are commonly a pair of reel retaining springs 466 that correspond to the pair of reels 456. Of course, various other designs of reel retaining spring have been used or proposed.

FIG. 54 shows another conventional method that is commonly used to hold the pair of reels 456; as shown, the reels are retained by means of a single reel retaining spring 486.

FIG. 54 is a perspective view showing the inside of the upper half fitted with a reel retaining spring of a different design than is shown in FIG. 53. The reel retaining spring 486 of the design shown in FIG. 54 has two end portions 486a bent downward, with the center portion 486b being fixed to the lower surface of the bottom plate 452a of the upper half 452 by a suitable method such as screwing, ultrasonic welding or thermal welding, both end portions 486a of the reel retaining spring 486 depress the tape reels 456 at the center so that they are urged toward the lower half 454 (see FIG. 53). The two end portions 486a of the reel retaining spring 486 are each cantilevered by means of the center portion 486b and this parallels with the reel retaining springs 466 shown in FIG. 53.

JP 60-166879 U discloses a reel retaining spring which is a mesa-shaped leaf spring and indicated by 488 in FIGS. 55A and 55B. The leaf spring 488 is provided for each of tape reels 490 and it has a center portion 488a and two end portions 488b and 488c; the center portion 488a will contact a pivot (convex) 490b on the top of the center reel hub 490a of each tape reel 490 and depresses and urges it toward the lower half 492, and the two end portions 488b and 488c are bent down toward opposite sides of the center portion 488a to fit into grooves 496 made in the inner surface of the upper half 494. The end portion 488b has a larger width at the distal end that fits into a corresponding wider portion 496a of the groove 496. In order to load the magnetic tape cassette into the record/reproduce apparatus and drive the tape reels 490 to rotate, the reel shafts (not shown) on the record/reproduce apparatus are passed through the reel shaft insertion holes 492a in the lower half 492 and inserted into the holes 490c formed in the lower sides of the tape reels 490; due to the resulting engagement, the pivot 490b on each tape reel 490 depresses the center portion 488a of the leaf spring 488, whereupon the two end portions 488b and 488c of the leaf spring 488 that fit into the grooves 496 in the upper half 494 contact the end portions of the respective grooves 496 in their longitudinal direction, deforming to urge the tape reels 490 toward the lower half 492.

JP 52-53205 Y discloses a reel retaining spring unit which, being indicated by 500 in FIGS. 56A and 56B, is an integral assembly of a spring body 500a and a plurality of legs 500b that extend radially from the spring body 500a (and which are three in the illustrated case). The spring units 500 each have a slider 500c at the distal end of the leg 500b and these sliders 500c are placed within slots 504 in the upper half 502 such that projections 504a in the slots 504 are brought into engagement with lugs 500d of the sliders 500c of the spring units 500; each of the sliders 500c is allowed to slide along the slot 504 until the spring body 500a of the spring unit 500 contacts a metal ball 506b fitted at the center of the reel hub 506a of each tape reel 506 and urges it toward the lower half 508.

JP 3-242889 A discloses a reel retaining spring which, being indicated by 512 in FIG. 57, consists of a plurality of radially extending legs 512*a* (that are four in the illustrated case) and which is mounted as an integral unit with the center of the upper surface of each tape reel 510, namely, on the upper surface of the reel hub 510*a*. According to the patent, the reel retaining spring 512 is made of metal or highly resilient plastic. While there is no specific disclosure of how to render the reel retaining spring 512 integral with the tape reel 510, the patent shows by illustration that the legs 512*a* of the reel retaining spring 512 can be secured to the upper surface of the reel hub 510*a* of the tape reel 510 by screwing or welding as in the prior art (see FIG. 57).

As mentioned above, the magnetic tape cassettes are made of metal or various kinds of resin. With the recent growing concern over environmental problems, increasing attention is drawn to the possibility that the increase in various kinds of wastes including those of metals, resins (plastics) and composite materials may cause adverse effects on the environment. A design consideration that is becoming important is reducing the impact on the environment by producing less wastes or developing products which, if discarded, will not cause air, water or soil pollution and hence do not become any problem in environmental conservation. To this end, it is necessary to design industrial products, in particular, magnetic tape cassettes that can be recycled at an existing plant system.

To meet this need, JP 11-273295 A discloses a design that can be applied to magnetic tape cassettes in order to facilitate assorted collection of metals and plastics. This is achieved by a mesa-shaped metallic reel retaining spring which, being indicated by 522 in FIGS. 58A, 58B and 58C, comprises a central depressing portion 522*a* that depresses the central area of a tape reel 520, support portions 522*c* at opposite ends that are detachably supported on the upper half 524, and a slope 522*b* that bridges the central depressing portion 522*a* and the support portion 522*c* at either end. To mount the mesa-shaped reel retaining spring 522 on the upper half 524, the support portions 522*c* at opposite ends of the spring 522 are passed into insertion areas 528 formed in lugs 526*a* at four sites on the perimeter of a transparent window member 526 in the upper half 524. The insertion areas 528 may be through-holes or may be closed at an end. The window member 526 has a weld rib 526*b* formed inward of the lugs 526*a* and on the perimeter of the side which faces the upper half 524; by melting the weld rib 526, the window member 526 can be welded to the upper half 524.

Because of this design, the tape cassette disclosed in JP 11-273295 A has the advantage that no special jig or cutting tools need be used to dislodge the metallic reel retaining spring (reel urging spring) from the upper half and collect it as metal material.

The prior art products described above have their own problems. First, the metallic or resinous reel retaining springs illustrated in FIGS. 53, 54 and 57 which are used in prior art magnetic tape cassettes are mounted on the inner surface of the upper half by securing means such as crimping, welding and screwing. Hence, when disassembling a conventional magnetic tape cassette after use and separating the components according to whether they are made of resin or metal or resinous parts are separated by resin type with a view to collecting the components by material, the reel retaining spring cannot be dislodged easily; needless to say, it cannot be removed unless the cassette case is disassembled and dislodging the reel retaining spring from the inner surface of the upper half is a complex operation that involves considerable labor and cost. This has been a factor that precludes the effort to break down the magnetic tape cassette according to material and collect and recycle the respective components in assortment.

The reel urging, metallic leaf spring 488 illustrated in FIGS. 55A and 55B is simply retained by the force of friction with the groove 496 into which it has been fitted, so it can be easily disengaged from the groove 496. On the other hand, the leaf spring 488 may potentially come out of engagement with the groove 496 during assembly. As another problem, the lateral surfaces of the leaf spring 488 contact two walls of the groove 496 in the direction of shorter side whereas the two end portions 488*b* and 488*c* contact the other two walls of the groove 496 in the direction of longer side (see FIG. 55B) and this may potentially result in chipping the wall portions of the groove 496.

The metallic spring unit 500 illustrated in FIGS. 56A and 56B is such that the slider 500*c* of the leg portion 500*b* is constricted at the lug 500*d* to receive the projection 504*a* extending from the slot 504 to come into engagement with the lug 500*d*. It is not very difficult to bring the two lugs out of engagement but, on the other hand, assembling the metallic spring unit 500 is a complicated work, causing various problems such as the potential breaking of the resinous projection 504*a* and resin chipping of the bottom of the slot 504 due to the sliding of the slider 500*c*.

The metallic reel retaining spring 522 illustrated in FIGS. 58A, 58B and 58C can be easily dislodged from the upper half 524; however, if each of the insertion areas 528 has a closed end, the distal end of each support portion 522*c* of the reel retaining spring 522 may potentially cause resin chipping of the insertion areas 528 whereas if they are through-holes, difficulty is involved in molding operations or there is the need to form each insertion area 528 by securing two parts together and an extra step must be performed to make the lugs 526*a* on the inner surface of the upper half 524. What is more, the reel retaining spring 522 may be easy to separate from the upper half 524 but, on the other hand, the window member 526 which is welded to the upper half 524 cannot be easily dislodged.

These problems are by no means limited to the metallic reel retaining spring 522, they also occur in resinous reel retaining springs.

Speaking of various prior art magnetic tape cassettes including the above-described two-reel type which has a web of magnetic tape stretched between a pair of tape reels that are housed rotatably within a cassette case, if they are discarded after use, they are simply disposed of as unburnable waste in the current practice. However, as already mentioned, in order to save resources or protect the environment, it is most desirable to break down the discarded magnetic tape cassette into various parts, assort them by material and recycle the respective materials as feedstock for a second production.

In the conventional magnetic tape cassette, however, a pair of tape reels between which a web of magnetic tape is stretched are usually each composed of a lower flange integral with a reel hub around which the magnetic tape is wound and an upper flange fixed to the upper end of the reel hub, and the two flanges which are made of different materials are fastened together by ultrasonic or thermal welding. Once the upper and lower flanges are fastened together by ultrasonic or thermal welding to make a tape reel, considerable difficulty is involved in disassembling it safely and assorting the individual components by material.

The precision in assembly of the upper flange relative to the reference plane of the lower flange (which is usually its lower surface) is desirably as small as possible in order to prevent wobbling of the upper flange and keeping the magnetic tape wound in neat form and, most desirably, the precision is about 0.01 mm and less. However, the surface of the upper flange which is to be welded to the lower flange and the reference plane of the lower flange are not usually molded by a single die but molded by two dies, one fixed and the other movable, and on account of various factors including the precision in mating of dies, its thermal deformation and the pressure of molten plastic being injected, the mating position of dies is inevitably subject to change and it has been difficult to secure adequate precision in assembly of the upper flange. As a further problem, the upper flange is welded to the lower flange in a position much inward of its circumference and the wobbling of the upper flange will increase progressively from the center outward; as an inevitable result, the practically feasible precision in assembly of the upper flange has been about 0.1 mm-0.5 mm.

As already mentioned, the magnetic tape cassette is disassembled into respective components which are assorted so that they can be recycled as feedstock for a second production. In view of this, the components to be assorted are desirably made of the fewest kinds of materials and total elimination of metal from the magnetic tape cassette has been proposed. Hence, it is desired that the reel retaining spring which is conventionally made of metal and used to prevent unwanted rotation of magnetic tape should also be replaced by a plastic leaf spring. In addition, in order to ensure that the leaf spring is not an impurity that gets into the discarded upper half when it is recycled as feedstock for a second production, the retaining spring is desirably made of the same material as the upper half on which it is to be mounted.

However, the upper half which combines with the lower half to make the cassette case must have sufficiently high rigidity and strength that it can not only be loaded into or unloaded from the record/reproduce apparatus but also withstand transport. If highly rigid plastic is chosen to make the reel hub retaining spring of the same material as the upper half, the spring load will change considerably with the slightest change in thickness. Hence, in order to determine the thickness of the spring that assures an appropriate spring load for preventing unwanted rotation of magnetic tape, a lot of samples must be prepared at different thicknesses and it is necessary to check for the appropriate thickness of spring; on top of this, variations in thickness must be controlled but this adds to the complexity in manufacturing procedures.

SUMMARY OF THE INVENTION

The present invention has been accomplished under these circumstances and has as an object providing a magnetic tape cassette that is free from the aforementioned problems of the prior art and which meets the various requirements of recycling its components at an existing plant system.

Another object of the invention is to provide a tape reel that can be broken down and which is suitable for use with the magnetic tape cassette.

Still another object of the invention is to provide a resinous leaf spring.

Yet another object of the invention is to provide a process for producing the resinous leaf spring.

Thus, one of the principal objects of the invention is to provide a magnetic tape cassette that is free from the problems of the prior art, that permits tape reels in a cassette case to be urged by means of a member which is simple in structure and can be easily fitted and removed, and that is advantageous for assorted collection of constituent materials, particularly for assorted collection of resin materials and selective collection of resin materials as separate from metal materials.

Specifically, a first object of the invention is to provide a magnetic tape cassette that permits tape reels in a cassette case to be urged by means of a member which is simple in structure and can be easily fitted and removed and that is advantageous for assorted collection of constituent resin materials.

A second object of the invention is to provide a magnetic tape cassette that permits a reel retaining spring to be easily removed from a cassette case, that allows the spring to be easily separated even if it is made of metal and which therefore is advantageous for selective collection of resin materials as separate from metal materials.

Another principal object of the invention is to provide a tape reel that is free from the problems of the prior art and which will not tear apart during service but which can be easily broken down for collection.

Specifically, a third object of the invention is to provide a tape reel that can be easily broken down when a magnetic tape cassette discarded after use is disassembled into respective components so they are assorted by material but which will not tear apart accidentally during service of the magnetic tape cassette.

A fourth object of the invention is to provide a tape reel which can be easily broken down into a lower flange and an upper flange in order that a magnetic tape cassette discarded after use is disassembled into respective components so they are assorted by material and recycled separately as feedstock for a second production, thereby contributing to the saving of resources or protection of the environment and which is so designed that the upper flange will wobble by the smallest possible amount.

Still another principal object of the invention is to ensure that when a magnetic tape cassette discarded after use is recycled as feedstock for a second production, the respective components into which the magnetic tape cassette has been broken down can be assorted by material as easily as possible.

More specifically, a fifth object of the invention is to provide a resinous (plastic) leaf spring which replaces the conventional metallic, reel hub retaining spring used to prevent unwanted rotation of magnetic tape and of which the spring load can be easily adjusted to a desired value during molding, as well as a process for producing the resinous leaf spring.

A sixth object of the invention is to provide a magnetic tape cassette in which a tape reel in a cassette case can be urged by means of a resin member of simple structure, thereby facilitating selective collection of different materials.

A seventh object of the invention is to provide a magnetic tape cassette in which a tape reel in a cassette case can be urged by means of a resin member of simple structure without using a metallic spring, thus proving advantageous for assorted collection of resin materials.

An eighth object of the invention is to provide a magnetic tape cassette which, even if it is so designed as to permit easy mounting and dismounting of a reel retaining spring, can be assembled no less efficiently than the magnetic tape cassette of conventional design and which is not at all affected in its basic performance by adopting that design.

A ninth object of the invention is to provide a magnetic tape cassette with a reel retaining spring that is not only made of resin (plastic material) but also so shaped as to allow for easy assembling during manufacture and disassembling during recycling.

With a view to attaining the various objects stated above, the present inventors took various approaches in reducing the wastes from magnetic tape cassettes having the aforementioned various designs (i.e., reducing their impact on the environment) and made intensive studies on a structure that would enable a reel retaining spring to be easily taken out of the magnetic tape cassette. As a result, the inventors found various designs for cassette case that would be effective in assorting different materials and which could simplify the procedure of breaking it down, in particular, those designs which would allow the reel retaining spring to be easily taken out of the cassette case. The present invention has been accomplished on the basis of this finding.

The present inventors thought that the magnetic tape cassette of the invention should further satisfy the following requirements: it should be assembled no less efficiently than magnetic tape cassettes of conventional designs; the reel urging spring used as a reel retaining spring should be easily mounted in and dismounted from the magnetic tape cassette so that there will be no drop in strength and shape stability (i.e., no torsion or warpage should occur); most importantly, the alteration in the design for mounting the reel urging spring should not cause any adverse effects on the basic performance of the magnetic tape cassette. The present invention has been accomplished on the basis of these additional considerations.

In order to attain the first principle object, in particular the first object described above, a first aspect of the present invention provides a magnetic tape cassette comprising:
  a case that is formed by joining an upper half and a lower half;
  a tape reel or tape reels around which magnetic tape is wound and which are housed in the case;
  a window through which the magnetic tape is visible and with which the upper half is provided; and
  a reel urging member having a tape reel contacting portion which contacts an upper part of the tape reel or each of the tape reels, bent arms connected to opposite sides of the tape reel contacting portion and sliding end portions provided at distal ends of the bent arms,
  wherein a slide groove along which the sliding end portions of the reel urging member slide is provided in an inner surface of a perimeter of a window opening in the upper half and a window member which is removably fitted in the window opening has hold-and-retain portions which hold the sliding end portions in cooperation with a bottom surface of the slide groove into which the sliding end portions have been fitted.

In order to attain the above-mentioned first principle object, in particular the second object described above, a second aspect of the present invention provides a magnetic tape cassette comprising:
  a case that is formed by joining an upper half and a lower half;
  a tape reel or tape reels around which magnetic tape is wound and which are housed in the case; and
  a kinky leaf-like reel urging spring that urges the tape reel or each of the tape reels toward the lower half, the reel urging spring having an engagement hole at an end and an engage-and-stop grooved portion at the other end, the engagement hole coming into engagement with an engaging pin erected on an inner surface of the upper half so as to fix the pin and the engage-and-stop grooved portion being such that an engage-and-stop pin erected on the inner surface of the upper half is fitted loosely into the engage-and-stop grooved portion so that it has free play along a length of the engage-and-stop grooved portion.

In order to attain the second principle object, in particular the third object described above, a third aspect of the present invention provides a tape reel that can be broken down and which has:
  a lower flange having a reel hub around which magnetic tape is wound;
  engage-and-stop lugs provided on the reel hub of the lower flange; and
  an upper flange that fits to an upper end of the reel hub and which has engage-and-stop pawls that are fixed by coming into engagement with the engage-and-stop lugs.

The third aspect of the present invention also provides a tape reel which further includes a reel urging spring having a central base from which a plurality of elastic arms extend radially to urge the tape reel, magnetic tape being wound around the tape reel which is housed in a case formed by joining an upper half and a lower half, the elastic arms of the reel urging spring coming into slidable engagement with an engagement groove provided in either the reel hub of the lower flange or the upper flange or in both, and the central base contacting an inner surface of the upper half so that the reel urging spring urges the tape reel toward the lower half.

In order to attain the third object described above, a fourth aspect of the present invention provides a tape reel that can be broken down and which has:
  a lower flange having a reel hub around which magnetic tape is wound and also having a first engage-and-stop pawl;
  an upper flange that fits to an upper end of the reel hub of the lower flange and which has a second engage-and-stop pawl which, when twisted, meshes with the first engage-and-stop pawl to become fixed; and
  an engage-and-stop member which not only fits to the lower flange but also has a third engage-and-stop pawl which, when twisted, engages the position where the first and second engage-and-stop pawls on the lower flange and the upper flange are in engagement with each other, thereby preventing undesired twisting of the upper flange.

In order to attain the above-mentioned second principle object, in particular the fourth object described above, a fifth aspect of the present invention provides a tape reel that can be broken down and which has a lower flange having a reel hub around which magnetic tape is wound and an upper flange mounted on an upper end of the reel hub of the lower flange, the tape reel having:
  engage-and-stop lugs provided on the lower flange;
  engage-and-stop members that are provided on the upper flange and which come into contact and engagement with the engage-and-stop lugs so as to join the lower flange with the upper flange;
  an area of contact between the lower flange and the upper flange which is situated inward of the engage-and-stop members on the upper flange but in a position away from a flange surface of the upper flange; and
  an urging means that applies urging force between an area of contact and the engage-and-stop members on the upper flange that have come into contact and engagement with the engage-and-stop lugs on the lower flange, thereby causing the engage-and-stop members to be elastically secured to the engage-and-stop lugs, wherein the lower flange is molded by a pair of dies including a fixed die and a movable die, with a reference plane of the lower flange and the engage-and-stop lugs as molded being provided by parallel die surfaces oriented in a same direction that have been formed on either the fixed die or the movable die.

In a preferred embodiment of the fifth aspect, said area of contact is provided by an elastic convex formed in the center of said reel hub of said lower flange or in the center of said upper flange, with said upper flange being fixed in a predetermined position by the urging force of said elastic convex. In another preferred embodiment, said area of contact is provided by a convex formed in the center of said reel hub of said lower flange or in the center of said upper flange, with the upper flange being fixed in a predetermined position by the urging force created when said upper flange deforms elastically.

In yet another preferred embodiment, said area of contact is provided by an elastic convex formed in the center of said reel hub of said lower flange or in the center of said upper flange, with said upper flange being fixed in a predetermined position by the interaction between the urging force of said elastic convex and the urging force created when said upper flange deforms elastically. More preferably, said engage-and-stop members are engage-and-stop pawls that come into engagement with said engage-and-stop lugs by snap fit.

In order to attain the third principle object, in particular the fifth object described above, a sixth aspect of the present invention provides a resinous leaf spring which has thin-walled portions or recesses or cutouts formed in selected areas and the spring load of which is adjusted by changing either a thickness of the thin-walled portion or a size or depth of the recesses or the cutouts or their position during molding of the leaf spring.

The present invention also provides a process for producing a leaf spring with a die assembly, the die assembly having a base part which defines a basic shape of the leaf spring and a moving part that is capable of movement relative to the base part, either the base part or the moving part being equipped with a movable part that allows adjustment of a spring load of the leaf spring and which is adjusted in position to provide a specified spring load.

Said movable part that allows adjustment of the spring load is desirably one that adjusts said spring load by changing the thickness of said leaf spring or one that adjusts said spring load by changing the sizes, depths or positions of recesses or cutouts formed in selected areas of said leaf spring.

In order to attain the above-mentioned third principle object, in particular the sixth object described above, a seventh aspect of the present invention provides a magnetic tape cassette comprising:

a case that is formed by joining an upper half and a lower half;

a tape reel or tape reels around which magnetic tape is wound and which are housed in the case; and a reel urging member which urges the tape reel or each of the tape reels toward the lower half, which is generally of a V shape in cross section and which has a base portion secured to an inner surface of the upper half and a tape reel contacting portion in a form of an inclined plane that is connected to an end of the base portion via a bend.

In order to attain the above-mentioned third principle object, in particular the seventh object described above, an eighth aspect of the present invention provides a magnetic tape cassette comprising:

a case that is formed by joining an upper half and a lower half;

a tape reel or tape reels around which magnetic tape is wound and which are housed in the case; and a reel urging member which urges the tape reel or each of tape reels toward the lower half and that deforms elastically in a direction generally perpendicular to a direction in which the tape reel or each of the tape reels are urged.

Preferably, said reel urging member comprises a pair of flexible ribs erected on the inner surface of said upper half to extend toward said lower half and a contact member that is fitted over the distal ends of said flexible ribs and which have an inclined inner surface describing a generally U shaped cross section.

In another preferred embodiment, said reel urging member comprises a pair of flexible ribs erected on the inner surface of said upper half to extend toward said lower half and a recess in the form of an inverted cone that is made in the upper surface of the tape reel and into which the distal ends of said flexible ribs are inserted.

In order to attain the above-mentioned third principle object, in particular the eighth object described above, a ninth aspect of the present invention provides a magnetic tape cassette having a recording medium housed between an upper half and a lower half joined to each other in a face-to-face relationship, wherein a reel urging spring an insertion portion of which has at least two bends is inserted into a reel urging spring insertion area provided in the upper half and a cover portion of the reel urging spring insertion area is an easy-to-break part.

In a preferred embodiment of the ninth aspect, said easy-to-break part is surrounded by a groove formed in a selected region of the cover portion of said reel urging spring insertion area in such a way that said cover portion can be easily broken. The groove may be provided in the upper surface (obverse surface) of said upper half or it may be provided in its lower surface. The depth of the groove may be determined as appropriate.

In another preferred embodiment of the ninth aspect, said reel urging spring insertion area provided in said upper half may be formed by conventional molding technology without using a slide core. The at least two bends formed on said reel urging spring preferably exhibit a specified degree of spring elasticity when the reel urging spring is inserted into said reel urging spring insertion area.

In order to attain the above-mentioned third principle object, in particular the ninth object described above, a tenth aspect of the present invention provides a magnetic tape cassette comprising:

a case that is formed by joining an upper half and a lower half in a face-to-face relationship and in which magnetic tape is housed;

a tape reel or tape reels for winding up the magnetic tape;

a reel urging spring having a central base from which a plurality of elastic arms extend radially to urge the tape reel or each of the tape reels; and spring seats that are provided in the central base portion of an upper flange of the tape reel or each of the tape reels and which hold in position the reel urging spring by placing distal ends of the elastic arms to rest on the spring seats or by fitting them into the spring seats, wherein the central base portion of the reel urging spring contacts an inner surface of the upper half and urging force developed by the reel urging spring as a result of deformation of the elastic arms urges the tape reel or each of the tape reels toward the lower half.

Preferably, said spring seats are provided in a recess formed in the center of the upper flange of said tape reel and the distal ends of the elastic arms of said reel urging spring lie in the same plane as the central base of said reel urging spring.

It is also preferred that the central base of said reel urging spring is formed at a higher position than the distal ends of said elastic arms.

In another preferred embodiment, a downwardly projecting pivot is formed on said upper half in the position corresponding to the center of said tape reel and a recess into which the pivot is fitted is provided in the central base of said reel urging spring.

In yet another preferred embodiment, an upwardly projecting pivot may be formed in the central base of said reel urging spring and a recess into which the pivot is fitted is provided in the inner surface of the upper half.

The pivot provided to project either from said upper half or from the central base of the reel urging spring is preferably made of plastic having low enough friction coefficient.

BRIEF DESCRIPTION OF THE DRAWINGS

FIG. 1 is a perspective view showing how the inner surface of an upper half of an example of the magnetic tape cassette according to the first aspect of the invention looks like;

FIG. 16A is a perspective view showing the whole external appearance of a magnetic tape cassette according to an example of the ninth aspect of the invention;

FIG. 16B is a partial enlarged view of FIG. 16A;

FIG. 17 shows in section an area of the magnetic tape cassette according to the example shown in FIGS. 16A and 16B where a reel urging spring is inserted;

FIG. 18 shows how the reel urging member shown in FIG. 17 looks like in the free state;

DETAILED DESCRIPTION OF THE INVENTION

The magnetic tape cassettes of the invention, the tape reels for use with them, as well as the resinous leaf spring and the process for producing it are described below in detail with reference to the preferred embodiments shown in FIGS. 1-52 in the accompanying drawings.

On the pages that follow, the magnetic tape cassette of the invention (which is hereunder sometimes referred to simply as the cassette) will be described in detail. In the following description, the term "upper" refers to the side on which the upper half is located, the term "lower" refers to the side on which the lower half is located, the term "front" refers to the side on which the front cover is located, and the term "rear" refers to the opposite side.

The concept of the invention is applicable to magnetic tape cassettes having magnetic tape and a case in which the magnetic tape is housed rotatably. It is applicable to magnetic tape cassettes of either a one-reel type or a two-reel type, in which magnetic tape is wound around a single tape reel or stretched between a pair of tape reels, said tape reel or tape reels being housed in the case at a specified area or specified areas such that the magnetic tape can be pulled out of the case or allowed to run in either a forward or reverse direction.

Figure 53:
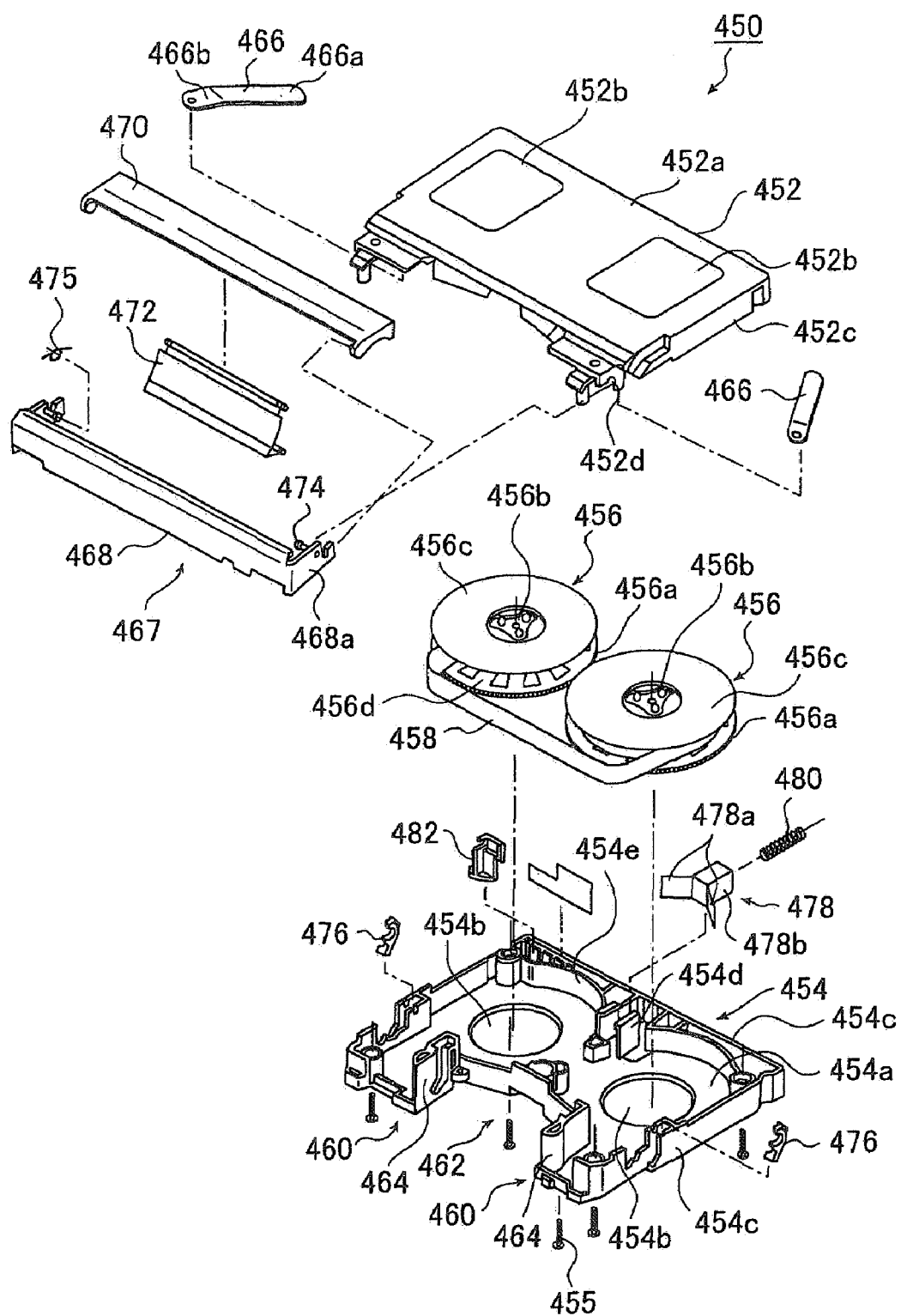
FIG. 53 is an exploded perspective view showing the principal components of a conventional magnetic tape cassette.
Figure 55A:
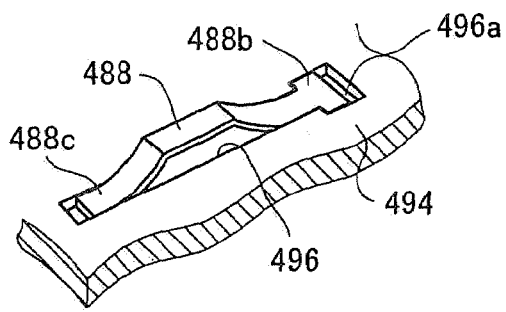
FIG. 55A is a partial perspective view showing how the inner surface of the upper half of a magnetic tape cassette looks like if it is fitted with another example of the conventional reel retaining spring.
Figure 55B:
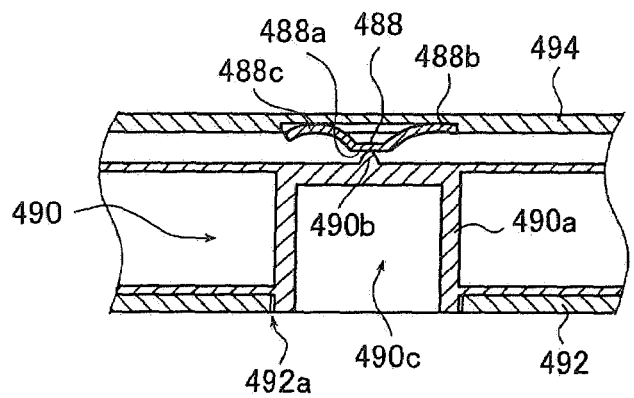
FIG. 55B is a partial cross section of the magnetic tape cassette as it has been fitted with the reel retaining spring shown in FIG. 55A.
Figure 56A:
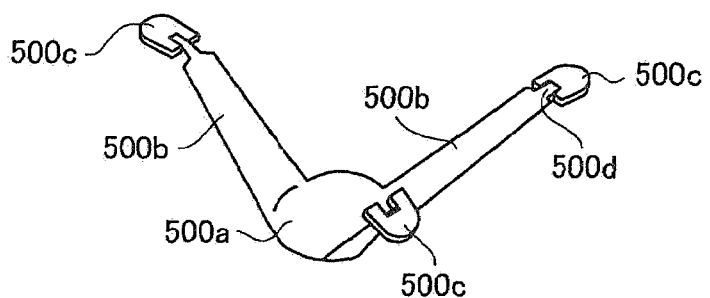
FIG. 56A is a perspective view of yet another example of the conventional reel retaining spring.
Figure 56B:
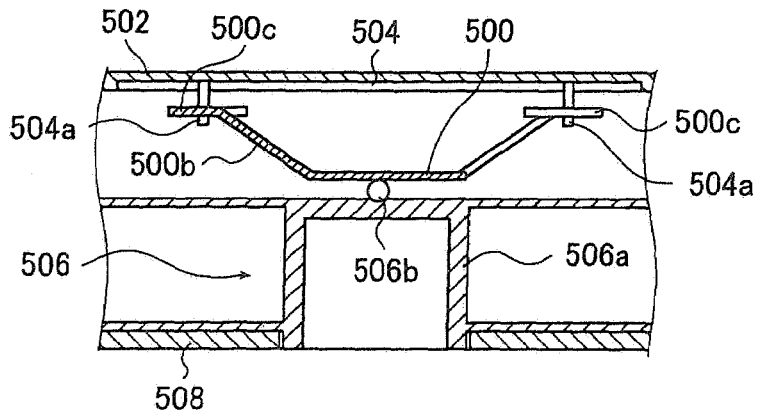
FIG. 56B is a partial cross section of the magnetic tape cassette as it has been fitted with the reel retaining spring shown in FIG. 56A.
Figure 57:
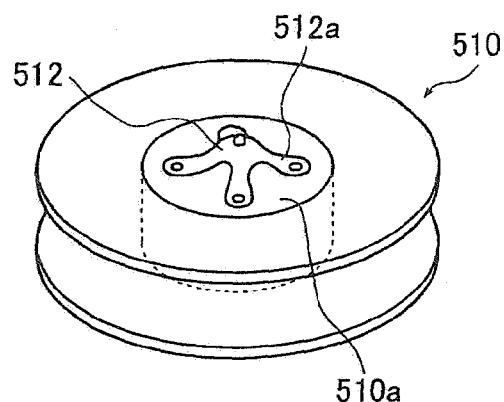
FIG. 57 is a perspective view of a tape reel in a magnetic tape cassette as it has been fitted with still another example of the conventional reel retaining spring.
Figure 58A:
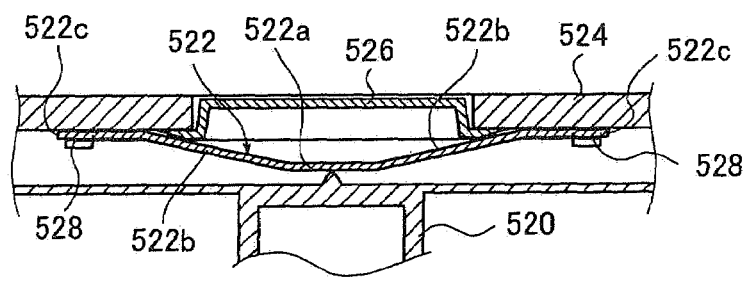
FIG. 58A is a partial cross section of a magnetic tape cassette as it has been fitted with a further example of the conventional reel retaining spring.
Figure 58B:
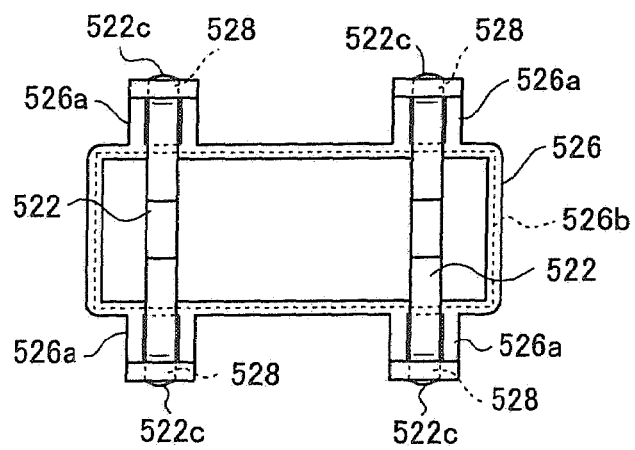
FIG. 58B is a plan view of a window member as it has been fitted with the reel retaining spring shown in FIG. 58A.
Figure 58C:
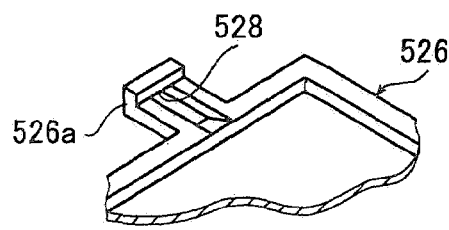
FIG. 58C is a partial perspective view showing how one of the lugs on the window member shown in FIG. 58B looks like if it is seen from the inside.

According to the invention, the case of the cassette (or cassette case) refers to a component that has the upper and lower halves as the principal components and include other members that are to be fitted on the upper or lower half, as well as those members which are fitted on the upper or lower half in order to retain or house the tape reel or tape reels around which the magnetic tape are wound and part of the magnetic tape that has been drawn from the tape reels. Speaking of the magnetic tape cassette of a two-reel type which is illustrated in FIG. 53, the other members are those which are formed by combining the upper and lower halves as they are composed of a plurality of members including the front cover (i.e., the outer lid, upper lid and inner lid) that is fitted on the upper half.

To start, we describe the magnetic tape cassette according to the first aspect of the invention with reference to FIGS. 1-5.

In the magnetic tape cassette according to the first aspect of the invention, the tape reels housed in the case are urged toward the lower half by means of a reel urging member. Depending upon the tape reels housed in the case, one or more reel urging members are provided on the inner surfaces of the perimeters of the windows in the upper half. For example, the magnetic tape cassette shown in FIG. 53 has two or more reel urging members instead of the leaf-like reel urging springs.

In the magnetic tape cassette according to the first aspect of the invention, the reel urging member has a tape reel contacting portion which contacts the upper part of the tape reel housed in the case and two bent arms formed on opposite sides of the tape reel contacting portion, with a sliding end portion being provided at the distal end of either bent arm.

The tape reel contacting portion is a site that contacts the upper part of the tape reel housed in the case which is formed by combining the upper and lower halves; it may be flat, or generally of an inverted V shape or in any other shapes including one that contacts the upper part of the tape reel at one or more sites.

Both sides of the tape reel contacting portion are bent as arms and at the distal end of each bent arm, there is provided a sliding end portion that is to be inserted into a slide groove made in the inner surface of the perimeter of the opening in the upper half.

In order to ensure that the magnetic tape in the case can be visually checked from the outside, a removable transparent window member is fitted in the opening which forms an inspection window in the upper half. In order that the tape reel around which the magnetic tape is wound and which is housed in the cassette case is urged toward the lower half, the sliding end portions of the reel urging member are inserted into and slid along the slide groove which is made in the inner surface of the perimeter of the opening.

The slide groove traverses the center of the tape reel housed in the case and it is made in the inner surface of the perimeter of the opening to extend toward the front and rear sides of the upper half such that the tape reel contacting portion of the reel urging member whose sliding end portions are to be inserted into the slide groove will contact the center of the reel hub in the tape reel. The sliding end portions of the reel urging member are inserted into the slide groove and, after being located in the front and rear slide grooves which are on opposite sides of the center in the longitudinal direction of the slide groove, the sliding end portions slide on the inner bottom surfaces of the front and rear slide grooves.

The transparent window member which is to be removably fitted in the window opening has hold-and-retain portions that are to be placed on the lower surfaces of the front and rear slide grooves along which the sliding end portions of the reel urging member as inserted into the slide groove will slide and which hold the sliding end portions in cooperation with the inner bottom surfaces of the front and rear slide grooves. The distal ends of the hold-and-retain portions are fitted in a stepped area formed along the slide groove in the inner surface of the upper half.

In the first aspect of the invention, the slide groove along which the sliding end portions of the reel urging member slides in order to retain the reel urging member on the inner surface of the upper half is made in the inner surface of the upper half and the distal end of each of the hold-and-retain portions of the window member which hold the sliding end portions in cooperation with the slide groove is fitted into the stepped area formed along the slide groove in the inner surface of the upper half; hence, there is no need to provide extra projections on the inner surface of the upper half.

When the tape reel in the cassette according to the first aspect of the invention depresses the tape reel contacting portion of the reel urging member toward the upper half as it contacts the tape reel, for example, in the case where the magnetic tape cassette is loaded in the record/reproduce apparatus and the tape drive unit is fitted in the lower part of the tape reel so that the latter is depressed toward the upper half, the tape reel contacting portion is depressed toward the upper half and the sliding end portions of the bent arms slide on the inner bottom surface of the slide groove toward its front and rear ends as the bent arms deform to spread, whereupon the tape reel is urged toward the lower half.

The sliding end portions of the reel urging member which are to be held by the hold-and-retain portions of the window member in cooperation with the inner bottom surfaces of the slide groove (i.e., the front and rear slide grooves) are free ends and, in the absence of any part that constrains (contacts) the distal end of either sliding end portion of the reel urging member while they slide, the sliding end portions are free to slide and this contributes to eliminating or reducing problems such as resin chipping.

To assemble the cassette according to the first aspect of the invention, the following procedure may be taken. The window member is fitted in the window opening in the upper half and the distal ends of the hold-and-retain portions of the window member are fitted in the stepped area formed along the slide groove on its perimeter; then, each of the sliding end portions of the reel urging member is inserted between the inner bottom surface of the slide groove and the associated hold-and-retain portion, whereby the reel urging member is fitted on the upper half. The upper half thus fitted with the reel urging member, the lower half, the front cover and any other required members and components are fitted and combined to assemble the magnetic tape cassette having the above-mentioned reel urging member.

To disassemble the cassette of the invention, the following procedure may be taken. The case is broken down so that the upper half is uncoupled from the lower half and the tape reel contacting portion of the reel urging member fitted on the upper half is pulled to extract the sliding end portions of the reel urging member each of which has been inserted between the inner bottom surface of the slide groove and the associated hold-and-retain portion; in this way, the reel urging member can be easily separated and dislodged from the upper half. In the first aspect of the invention, the window member is adapted to be removable from the window opening in the upper half and, hence, the reel urging member can be easily dislodged when the window member is removed from the window opening in the upper half.

FIGS. 1-5 illustrate an exemplary design for the structures of the reel urging member and the upper half of the magnetic tape cassette according to the first aspect of the invention. The constituent elements of the cassette according to the first aspect of the invention on excepting those indicated by reference numerals in FIGS. 1-5 are not limited in any particular way and may be the same as those used in the prior art magnetic tape cassette shown in FIG. 53; hence, those constituent elements are not shown specifically in FIGS. 1-5, nor are they explained in the following description.

Figure 1:
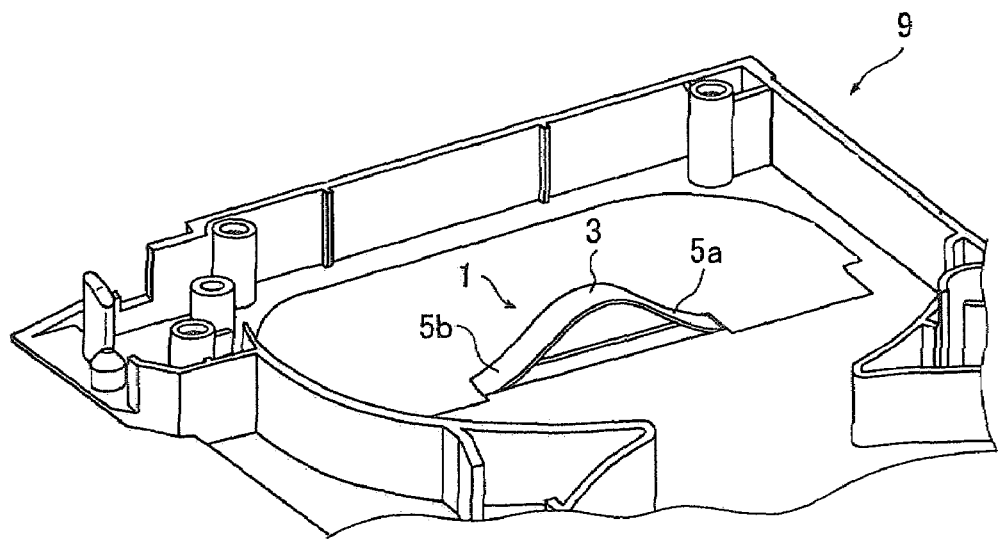

FIG. 1 is a perspective view showing the inner surface of an example of the upper half of the magnetic tape cassette. In the magnetic tape cassette shown in FIG. 1, the reel urging member generally indicated by 1 urges the tape reel in the case toward the lower half.

Figure 4:
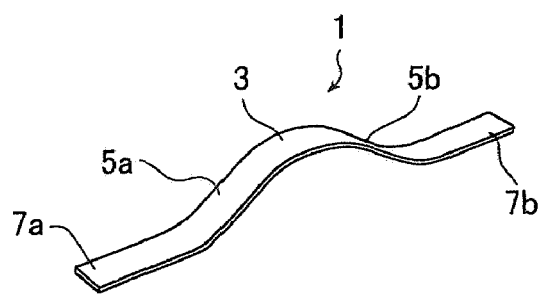
FIG. 4 is a perspective view of a reel urging member to be fitted on the upper half shown in FIGS. 2A and 2B.

As shown in FIGS. 1 and 4, the reel urging member 1 has a tape reel contacting portion 3, generally of an inverted V shape in cross section, that is brought into contact with the upper part of the tape reel, bent arms 5a and 5b connecting to opposite sides of the tape reel contacting portion 3, and sliding end portions 7a and 7b which are at the distal ends of the bent arms 5a and 5b, respectively.

Figure 2A:
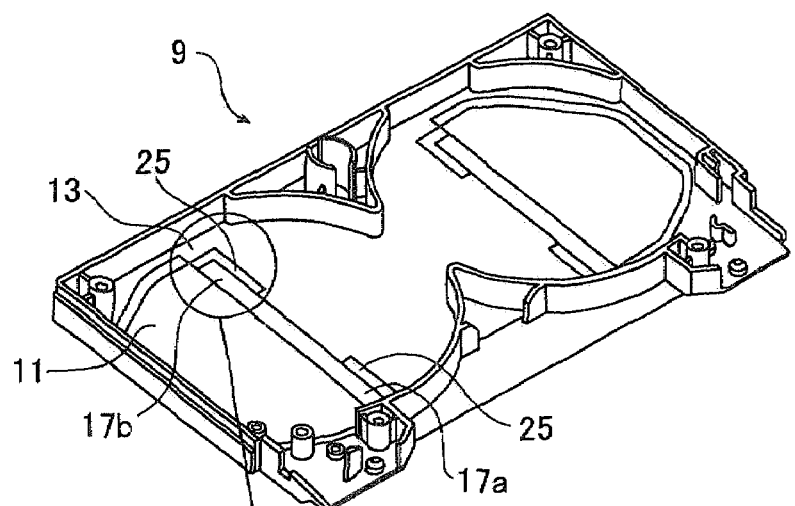
FIG. 2A is a perspective view showing the structure of an upper half of another example of the magnetic tape cassette according to the first aspect of the invention.
Figure 2B:
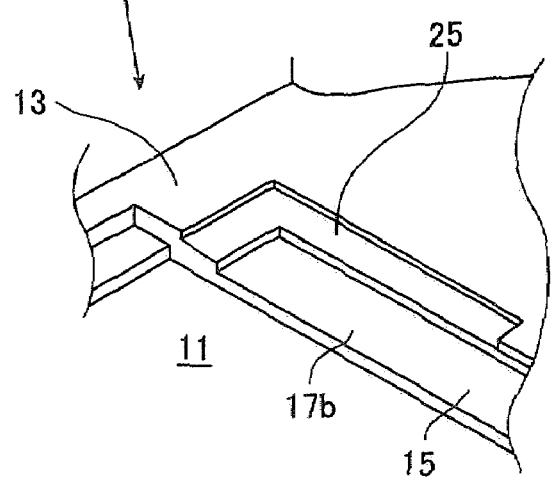
FIG. 2B is a partial enlarged view of FIG. 2A.

As shown in FIG. 2A and FIG. 2B which is a partial enlarged view of FIG. 2A, the upper half 9 has a window opening 11 and the inner surface 13 on its perimeter has a slide groove 15 into which the sliding end portions 7a and 7b of the reel urging member 1 will be inserted. The slide groove 15 traverses the center of the tape reel housed in the case and it is made in the inner surface 13 of the perimeter of the opening 11 to extend toward the front and rear sides of the upper half 9 such that the tape reel contacting portion 3 of the reel urging member 1 whose sliding end portions 7a and 7b are to be inserted into the slide groove 15 will contact the center of the reel hub in the tape reel. The sliding end portions 7a and 7b of the reel urging member 1 are inserted into the slide groove 15 and, after being located in the front and rear slide grooves 17a and 17b which are on opposite sides of the center in the longitudinal direction of the slide groove 15, the sliding end portions 7a and 7b slide on the inner bottom surfaces of the front and rear slide grooves 17a and 17b.

Figure 3:
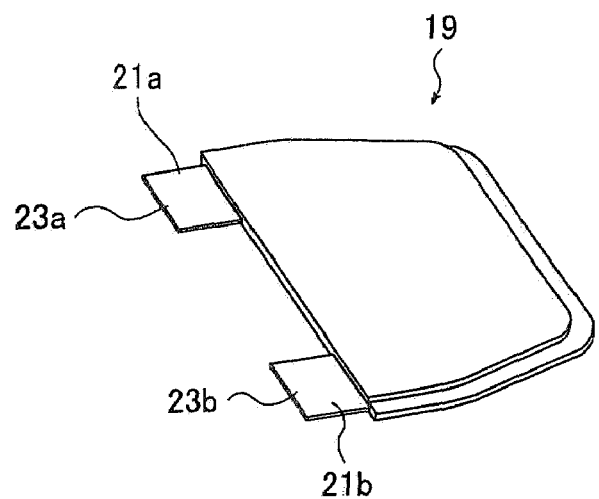
FIG. 3 is a perspective view of a window member to be fitted on the upper half shown in FIGS. 2A and 2B.

As shown in FIG. 3, the transparent window member 19 which is to be fitted in the window opening 11 has hold-and-retain portions 21a and 21b that are to be placed on the lower surfaces of the front and rear slide grooves 17a and 17b along which the sliding end portions 7a and 7b of the reel urging member 1 as inserted into the slide groove 15 will slide and which hold the sliding end portions 7a and 7b in cooperation with the inner bottom surfaces of the front and rear slide grooves 17a and 17b. The distal ends 23a and 23b of the hold-and-retain portions 21a and 21b are fitted in a stepped area 25 formed along the slide groove 15 in the inner surface of the upper half 9.

When the tape reel in the magnetic tape cassette having the upper half as it has been fitted with the reel urging member 1 of the design shown in FIG. 1 depresses the tape reel contacting portion 3 of the reel urging member 1 toward the upper half as it contacts the tape reel, for example, in the case where the magnetic tape cassette is loaded in the record/reproduce apparatus and the tape drive unit is fitted in the lower part of the tape reel so that the latter is depressed toward the upper half 9, the tape reel contacting portion 3 is depressed toward the upper half 9 and the sliding end portions 7a and 7b of the bent arms 5a and 5b slide on the inner bottom surfaces of the front and rear slide grooves 17a and 17b toward the front and rear ends of the slide groove 15 as the bent arms 5a and 5b deform to spread, whereupon the tape reel is urged toward the lower half.

To assemble the magnetic tape cassette having the upper half fitted with the reel urging member shown in FIG. 1, the following procedure may be taken. The window member 17 shown in FIG. 3 is fitted in the window opening 11 in the upper half 9 and the distal ends 23a and 23b of the hold-and-retain portions 21a and 21b of the window member 17 are fitted in the stepped area 25; then, the sliding end portion 7a (or 7b) of the reel urging member 1 shown in FIG. 4 is inserted between the inner bottom surface of the front slide groove 17a (or the rear slide groove 17b) and the hold-and-retain portion 21a (or 21b), whereby the reel urging member 1 is fitted on the upper half 9. The upper half 9 thus fitted with the reel urging member 1, the lower half, the front cover and any other required members and components are fitted and combined to assemble the magnetic tape cassette having the above-mentioned reel urging member 1.

To disassemble the magnetic tape cassette under consideration, the following procedure may be taken. The case is broken down so that the upper half is uncoupled from the lower half and the tape reel contacting portion 3 of the reel urging member 1 fitted on the upper half is pulled to extract the sliding end portion 7a (or 7b) of the reel urging member 1 which has been inserted between the inner bottom surface of the front slide groove 17a (or the rear slide groove 17b) and the hold-and-retain portion 21a (or 21b); in this way, the reel urging member 1 can be easily separated and dislodged from the upper half 9.

Figure 5:
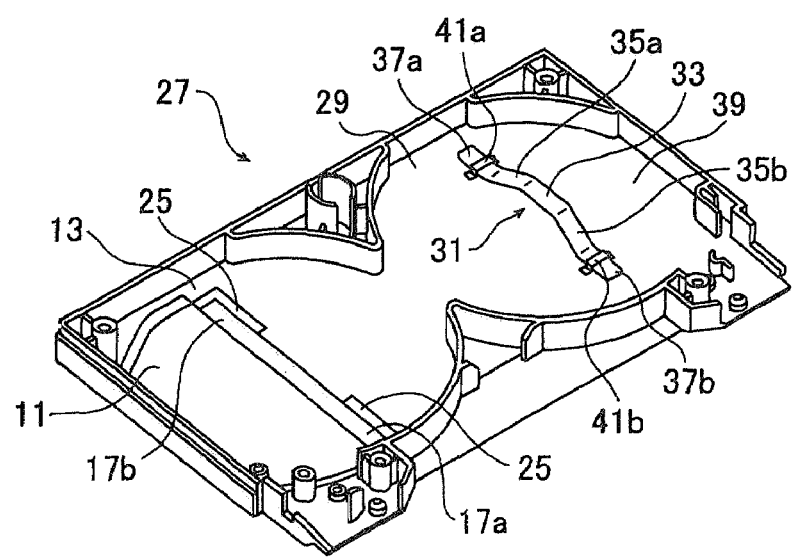
FIG. 5 is a perspective view showing the inner surface of an upper half of yet another example of the magnetic tape cassette according to the first aspect of the invention.

FIG. 5 is a perspective view showing the inner surface of the upper half of another example of the cassette according to the first aspect of the invention.

The magnetic tape cassette shown in FIG. 5 is such that the upper half 27 has the window opening 11 in either the right or left area of the upper plate 29 but has no window opening in the other area. The reel urging member 1 shown in FIG. 4, particularly its sliding end portions 7a and 7b, are inserted into the slide groove 15 made in the inner surface 13 of the perimeter of the window opening 11, and a reel urging member 31 different from the reel urging member 1 is provided in the area of the upper plate 29 which has no window opening.

The reel urging member 1 in the upper half 27, the slide groove 15, the window member to be fitted in the window opening 11, the hold-and-retain member associated with the window member and the stepped area 25, as well as their structures, interrelationships and actions are identical to those illustrated in FIGS. 1-4; hence, the members and sites which are identical to those shown in FIGS. 1-4 are identified by like numerals and will not be described in detail.

The reel urging member 31 has a tape reel contacting portion 33, generally of an inverted V shape in cross section, that is brought into contact with the upper part of the tape reel, bent arms 35a and 35b connecting to opposite sides of the tape reel contacting portion 33, and sliding end portions 37a and 37b which are at the distal ends of the bent arms 35a and 35b, respectively.

The reel urging member 31 is provided on the inner surface 39 of the upper half 27; the reel urging member 31 traverses the center of the tape reel housed in the case and it extends toward the front and rear sides of the upper half 27 such that the tape reel contacting portion 33 will contact the center of upper part of the reel hub in the tape reel. The sliding end portions 37a and 37b of the reel urging member 31 are inserted such that they come into engagement with engage-and-stop portions 41a and 41b erected on the inner surface 39.

The engage-and-stop portions 41a and 41b have insertion holes through which the sliding end portions 37a and 37b are to be fitted.

When the tape reel depresses the tape reel contacting portion 33 of the reel urging member 31 toward the upper half as it contacts the tape reel, for example, in the case where the magnetic tape cassette is loaded in the record/reproduce apparatus and the tape drive unit is fitted in the lower part of the tape reel so that the tape reel is depressed toward the upper half 27, the tape reel contacting portion 33 is depressed toward the upper half 27 and the sliding end portions 37a and 37b of the bent arms 35a and 35b in engagement with the engage-and-stop portions 41a and 41b, respectively, slide on the inner surface of the upper half 27 as the bent arms 35a and 35b deform to spread, whereupon the tape reel is urged toward the lower half.

To assemble the magnetic tape cassette having the upper half 27 fitted with the reel urging members 1 and 31 shown in FIG. 5, the following procedure may be taken. The window member 17 shown in FIG. 3 is fitted in the window opening 11 in the upper half 27 and the distal ends 23a and 23b of the hold-and-retain portions 21a and 21b of the window member 17 are fitted in the stepped area 25; then, the sliding end portion 7a (or 7b) of the reel urging member 1 shown in FIG. 4 is inserted between the inner bottom surface of the front slide groove 17a (or the rear slide groove 17b) and the hold-and-retain portion 21a (or 21b), whereby the reel urging member 1 is fitted on the upper half 27. In addition, the sliding end portions 37a and 37b of the reel urging member 31 are inserted into the engage-and-stop portions 41a and 41b, respectively, whereby the reel urging member 31 is fitted on the upper half 27. The upper half 27 thus fitted with the reel urging members 1 and 31, the lower half, the front cover and any other required members and components are fitted and combined to assemble the magnetic tape cassette having the above-mentioned reel urging members 1 and 31.

To disassemble the magnetic tape cassette under consideration, the following procedure may be taken. The case is broken down so that the upper half is uncoupled from the lower half and the tape reel contacting portion 3 of the reel urging member 1 fitted on the upper half 27 is pulled to extract the sliding end portion 7a (or 7b) of the reel urging member 1 which has been inserted between the inner bottom surface of the front slide groove 17a (or the rear slide groove 17b) and the hold-and-retain portion 21a (or 21b); further, the tape reel contacting portion 33 of the reel urging member 31 is pulled to extract the sliding end portions 37a and 37b from within the engage-and-stop portions 41a and 41b, respectively; in this way, the reel urging members 1 and 31 can be easily separated and dislodged from the upper half 27.

Described above are the basic structural features of the magnetic tape cassette according to the first aspect of the invention.

We now describe the magnetic tape cassette according to the second aspect of the invention with reference to FIGS. 6-9.

The magnetic tape cassette according to the second aspect of the invention uses a leaf-like spring as the reel urging spring. It has a kinky shape and the kink may be a generally inverted V shape, mesa-shaped, arcuate or of any other cross-sectional shape; depending on shape, any point such as the crest or a point halfway the bent arm is brought into contact with the upper part of the tape reel, say, the reel hub so that the tape reel is depressed and thereby urged toward the lower half.

The reel urging spring has an engagement hole at an end and an engage-and-stop grooved portion at the other end. The engagement hole comes into engagement with an engaging pin erected on the inner surface of the upper half, whereby the end of the reel urging spring having this hole is constrained in movement relative to the upper half and it becomes the fixed end of the reel urging spring. The engaging pin may be erected on a lip-like step that is formed on the inner surface of the upper half such that it can be torn off. This is a preferred embodiment since the cassette case is sufficiently thin in the lip-like step area that the reel urging member can be taken out of the case without breaking it down but by simply applying pressure from the outside to split the lip-like step open. More preferably, the lip-like step is formed by making a cutout in the upper plate of the upper half since this provides ease in applying pressure from the outside of the case to split the lip-like step open.

The engage-and-stop pin erected on the inner surface of the upper half is fitted loosely into the engage-and-stop grooved portion so that it has free play along the length of the engage-and-stop grooved portion. In consequence, as the reel urging spring flexes in the vertical direction, the engage-and-stop grooved portion moves in the longitudinal direction of the reel urging spring, constantly giving an appropriate urging force to the tape reel.

The engage-and-stop grooved portion is formed along the length of the reel urging spring and its other end preferably has a split shape which is open at the distal end. This is an effective design since if pressure is applied to the aforementioned lip-like step from the outside to split it open and the other end of the reel urging spring is extracted, the reel urging spring can be easily dislodged from the upper half without breaking down the case.

If desired, the cassette according to the second aspect of the invention may have a temporary locking recess on the straight line connecting the engaging pin and the engage-and-stop pin on the inner surface of the upper half and in a position closer to the engage-and-stop pin such that the engaging pin is fitted into the engagement hole and secured in position before the upper half is coupled to the lower half while at the same time the engage-and-stop end of the reel urging spring is brought into engagement with the temporary locking recess, thereby allowing the reel urging spring to be locked temporarily to the upper half. If the upper half to which the reel urging spring has been locked temporarily is coupled to the lower half to assemble the cassette case with the tape reel in it, the reel urging spring contacts the upper part of the tape reel which then depresses the reel urging spring so that its engage-and-stop end is no longer in temporary engagement with the temporary locking recess but moves toward the engage-and-stop pin until it comes into engagement with the engage-and-stop pin. This offers the advantage of not only facilitating the work of mounting the reel urging spring during the process of assembling the cassette of the invention but also providing ease in removing the reel urging spring in the process of assembly in order to break down the cassette case or re-mounting it in order to assemble the case.

FIGS. 6-9 illustrate an exemplary design for the structures of the upper half and the leaf-like reel urging spring in the magnetic tape cassette according to the second aspect of the invention. The following description mainly concerns the upper half and the reel urging spring and the other constituent elements (e.g. members and components) of the magnetic tape cassette such as the constituent elements (e.g. members and components) other than the upper half and the reel urging spring in the magnetic tape cassette illustrated in FIG. 53 are not limited in any particular way and may be the same as those used in the prior art magnetic tape cassette shown in FIG. 53; hence, those constituent elements are not shown specifically in FIGS. 6-9, nor are they explained in the following description.

Figure 6A:
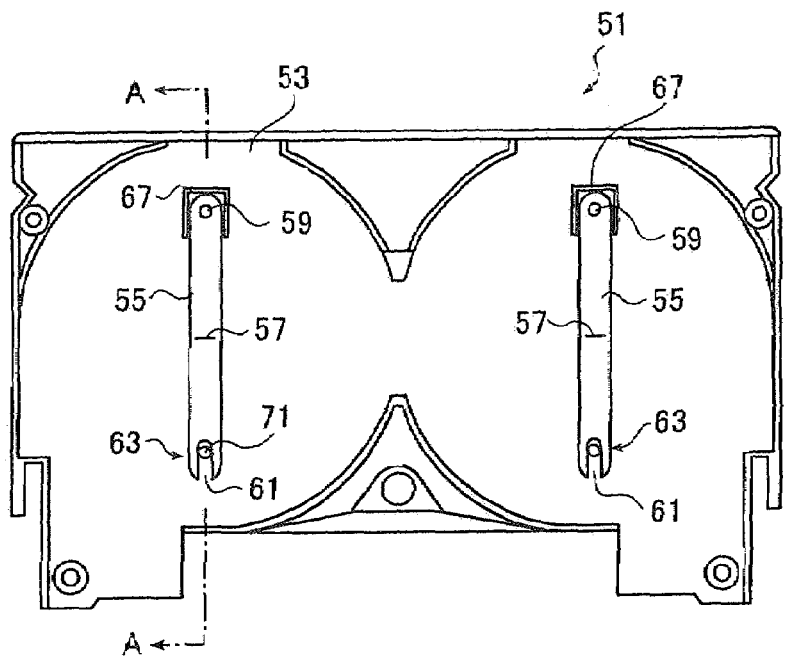
FIG. 6A is a plant view showing the inner surface of an upper half of an example of the magnetic tape cassette according to the second aspect of the invention, as well as the structure of a leaf-like reel urging spring used in the upper half.
Figure 6B:
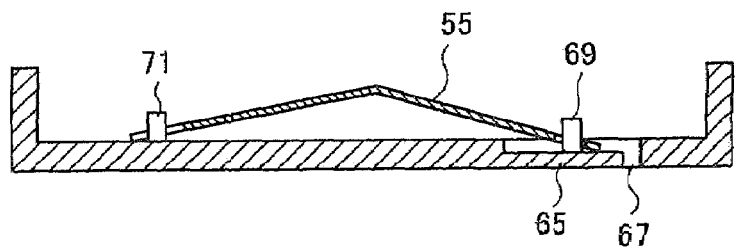
FIG. 6B is section A-A of FIG. 6A.

FIG. 6A is a plan view showing an exemplary design for the structures of the upper half and the reel urging spring in the magnetic tape cassette according to the second aspect of the invention. FIG. 6B is section A-A of FIG. 6A.

In FIG. 6A, two reel urging springs 55 in the form of a kinky leaf are shown to be fitted on the inner surface 53 of the upper half 51.

Figure 7A:
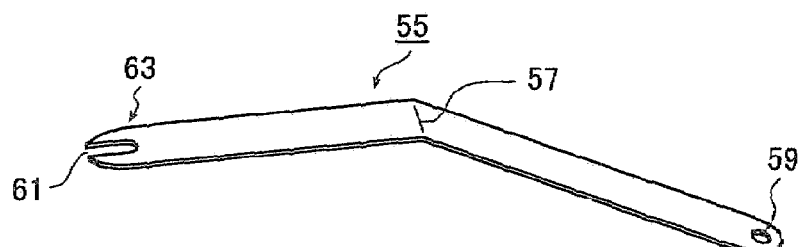
FIG. 7A is a perspective view showing the structure of an example of the reel urging spring in the magnetic tape cassette according to the second aspect of the invention.

As shown in FIG. 7A, the leaf-like reel urging spring 55 is of an inverted V shape in cross section which is kinky with a crest 57 in the middle; it has an engagement hole 59 at an end and an engage-and-stop grooved portion 63 at the other end which is split to form a groove 61 that permits free play.

As shown in FIGS. 6A and 6B, the inner surface 53 of the upper half 51 has a lip-like step 65 and this forms a recess in the inner surface 53 since a cutout 67 is provided on its perimeter and since the lip-like step 65 is thin-walled. An engaging pin 69 is erected on the lip-like step 65 such that it comes into engagement with the engagement hole 59. The lip-like step 65 has a smaller wall thickness than the upper plate of the upper half in the surrounding area; in addition, it has the cutout 67 on the perimeter and, hence, the lip-like step 65 can be easily split to open by applying pressure to the upper half from the outside (from the other side of the paper) and the remaining part of the lip-like step 65 can be easily torn off, which is indeed a preferred embodiment of the invention.

An engage-and-stop pin 71 is also erected on the inner surface 53 of the upper half 51 and this pin is loosely fitted into the free play groove 61 in the engage-and-stop grooved portion 63 which is provided at the other end of the reel urging spring 55. When the engage-and-stop pin 71 is loosely fitted into the free play groove 61, the engage-and-stop grooved portion 63 constrains the direction of action of the reel urging spring 55 such that it is free to move along the engage-and-stop grooved portion 63 only in the longitudinal direction.

In the magnetic tape cassette under consideration which has the upper half 51 and the leaf-like reel urging spring 55, the crest 57 of the reel urging spring 55 contacts the upper part of the tape reel rotatably housed in the interior of the case formed by coupling the upper and lower halves and the tape reel is urged toward the lower half, with the crest 57 working as the apex. In this situation, the engaging pin 69 is fitted into the engagement hole 59 in the reel urging spring 55 and secured in position; hence, the end of the reel urging spring 55 at which the engagement hole 59 is made is constrained in movement relative to the upper half 51 and becomes the fixed end of the latter.

The engage-and-stop pin 71 erected on the inner surface of the upper half 51 is fitted loosely into the free play groove 61 in the engage-and-stop grooved portion 63 and brought into engagement such that it is free to move along the length of the free play groove 61. In consequence, as the reel urging spring 55 flexes in the vertical direction, the engage-and-stop grooved portion 63 moves in the longitudinal direction of the reel urging spring, constantly giving an appropriate urging force to the tape reel.

To disassemble the magnetic tape cassette under consideration, pressure may be applied to the lip-like step 65 from the outside of the upper half 51 until it splits open; the lip-like step 65 is then pulled out to take the reel urging spring 55 from within the upper half 51. The lip-like step 65 has a smaller wall thickness than the upper plate of the upper half in the surrounding area; in addition, it has the cutout 67 on the perimeter and, hence, the lip-like step 65 can be easily split open by applying pressure to the upper half from the outside (from the other side of the paper) and the remaining part of the lip-like step 65 can be easily torn off. In addition, the free play groove 61 in the engage-and-stop grooved portion 63 has a split shape that is open at the distal end of the engage-and-stop grooved portion 63; therefore, the reel urging spring 55 can be smoothly pulled out of the upper half without letting the other end of the reel urging spring 55 to get stuck on the engage-and-stop pin 71.

As a result, the metallic reel urging spring 55 can be easily dislodged from the cassette case without breaking it down.

Figure 7B:
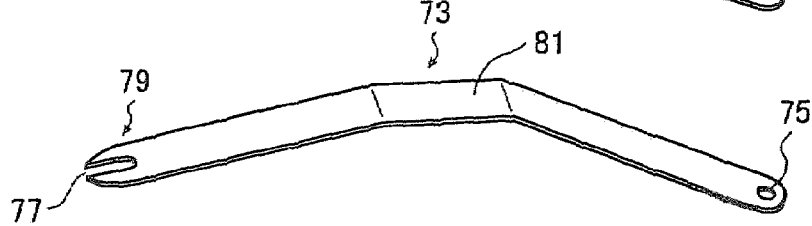
FIG. 7B is a perspective view showing another example of the reel urging spring.

FIG. 7B illustrates another example of the leaf-like reel urging spring which is different from the one shown in FIG. 7A.

The leaf-like reel urging spring indicated by 73 in FIG. 7B is similar to the reel urging spring 55 shown in FIG. 7A which has an inverted V shape in cross section, in that it has an engagement hole 75 at one end into which the engaging pin on the upper half is to be fitted and secured in position whereas it has an engage-and-stop grooved portion 79 at the other end with a split shape at the distal end having a free play groove 77; the difference is that the leaf-like urging spring 73 is mesa-shaped in cross section which is kinky with a flat crest 81. Except for the crest 81, the reel urging spring 73 performs in the same way, has the same function and achieves the same effect as the reel urging spring 55 shown in FIG. 7A.

In the cases shown in FIGS. 6 and 7, the apex 57 of the leaf-like reel urging spring 55 which has an inverted V shape in cross section or the flat crest 81 of the leaf-like reel urging spring 73 which is mesa-shaped in cross section contacts the upper part of the tape reel, say, the upper part of the reel hub. However, there is no particular limitation on the site at which the reel urging spring in the cassette of the invention contacts the tape reel and any part of the reel urging spring may contact the tape reel. For example, the reel urging spring 55 shown in FIG. 7A may contact the tape reel at a site halfway between the engagement hole 9 and the apex 57 or at a site halfway between the engage-and-stop grooved portion 63 and the apex 57.

Figure 8:
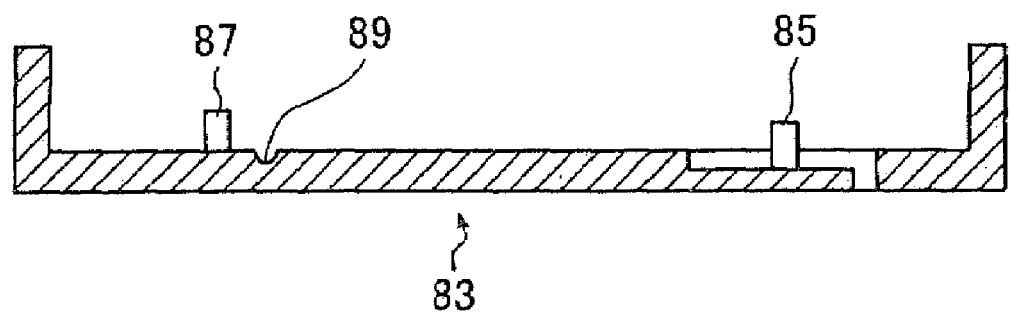
FIG. 8 is a schematic cross-sectional view showing the structure of an upper half in another example of the magnetic tape cassette according to the second aspect of the invention.

FIG. 8 illustrates still another example of the upper half of the cassette according to the second aspect of the invention. The upper half indicated by 83 in FIG. 8 has a temporary locking recess 89 on the straight line connecting an engaging pin 85 and an engage-and-stop pin 87 and in a position closer to the engage-and-stop pin 87.

Figure 9A:
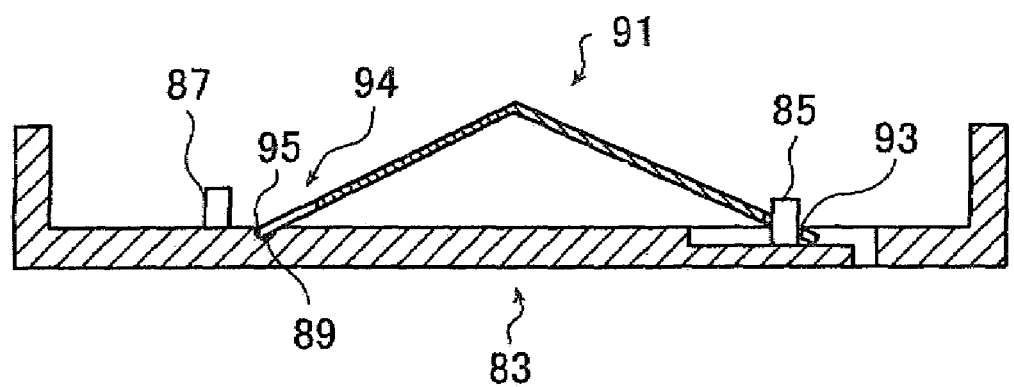
FIG. 9A is a schematic cross-sectional view illustrating how the reel urging spring is retained temporarily in the upper half shown in FIG. 8.
Figure 9B:
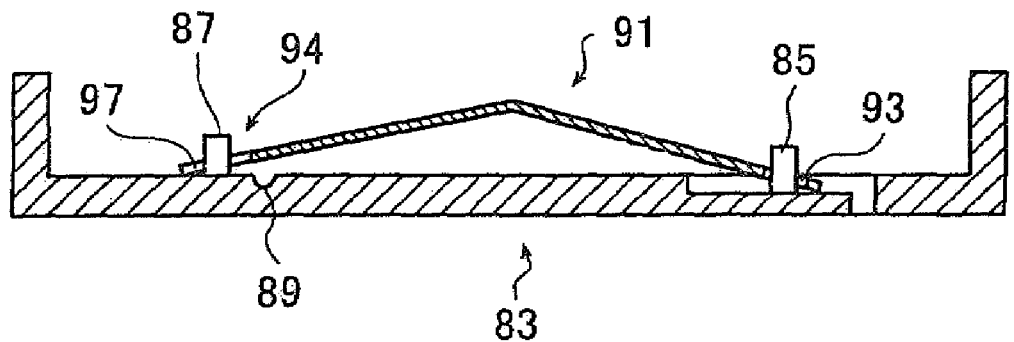
FIG. 9B is a schematic cross-sectional view illustrating how the reel urging spring is mounted on the upper half.

As shown in FIG. 9A, the magnetic tape cassette using the upper half 83 has the engaging pin 85 fitted into the engagement hole 93 in the leaf-like reel urging spring 91 to provide a fixed end while at the same time the distal end 95 of the engage-and-stop grooved portion 94 of the reel urging spring 91 is brought into temporary engagement with the temporary locking recess 89, thereby allowing the reel urging spring 91 to be locked temporarily to the upper half 83. If the upper half 83 to which the reel urging spring 91 has been locked temporarily is coupled to the lower half (not shown) to construct the cassette case with the tape reel in it, the reel urging spring 91 contacts the upper part of the tape reel which then depresses the reel urging spring 91 so that it comes out of temporary engagement with the temporary locking recess 89; then, as shown in FIG. 9B, the engage-and-stop grooved portion 94 moves toward the engage-and-stop pin 87 until it is loosely fitted into the free play groove 97 to allow free movement in the longitudinal direction.

The foregoing design enables the manufacturer of the magnetic tape cassette to perform various operations with the leaf-like reel urging spring locked temporarily to the upper half and this offers the advantage of not only facilitating the work of mounting the reel urging spring during the assembling process but also providing ease in removing the reel urging spring in the process of assembly in order to break down the cassette case or re-mounting it in order to assemble the case.

Described above are the basic structural features of the magnetic tape cassette according to the second aspect of the invention.

Before describing the tape reel that can be broken down according to the third to fifth aspects of the invention, as well as the resinous leaf spring according to the sixth aspect of the invention and the process for producing it, we will continue to describe the magnetic tape cassette of the invention as it concerns the seventh to tenth aspects of the invention.

The magnetic tape cassette according to the seventh aspect of the invention is described below with reference to FIGS. 10-12.

In the magnetic tape cassette according to the seventh aspect of the invention, the reel urging member comprises a base portion which is to be secured to the inner surface of the upper half and a tape reel contacting portion in the form of an inclined plane connecting to an end of the base portion via a bent portion. When the tape reel contacting portion contacts the upper part of the tape reel, the bent portion will deform under the pressure exerted by the tape reel and the resiliency against this deformation causes the tape reel to be urged toward the lower half. Generally speaking, the angle θ the base portion of the reel urging member forms with the tape reel contacting portion at the bent portion is preferably in the range of 5-70 degrees and from the viewpoint of causing the tape reel to be pressed against the lower half by spring force, a particularly preferred range is 20-60 degrees. If θ is excessive, difficulty may be encountered in mounting the tape reel.

The upper half can be secured to the base portion by any methods without particular limitation. Exemplary methods that can be used include welding and bonding.

In the seventh aspect under consideration, the tape reel contacting portion of the reel urging member is a site which contacts the upper part of the tape reel, particularly the crest of the reel hub, when the tape reel is housed in a cassette case constructed by coupling the upper and lower halves. The tape reel contacting portion may have any cross-sectional shape as exemplified by a flat plate and it may be of such a shape that it contacts the upper part of the tape reel at one or more sites. The tape reel contacting portion (107) may have a recess (113) at a site which contacts the crest (119) of the reel hub (117) such that the crest (119) can be fitted into the recess (113); this design is effective since it enables the tape reel to be supported in a stable manner. The tape reel contacting portion (125) may further be provided with a contacting area (129) that is bent in a U shape in cross section which is convex toward the base portion (127) and the distal end of which contacts the base portion (127). This design is preferred since it can not only control the spring force but also minimize the effect that is exerted on the spring force by the means of mounting the base portion (127) to the upper half.

Further in addition, a convex or a ridge (131) may be provided on the side of the base portion (127) which faces the tape reel contacting portion (125); this is a more effective design since the pressing force exerted upon the tape reel can be further stabilized by bending the tape reel contacting portion (125) until it contacts the ridge (131).

Figure 10:
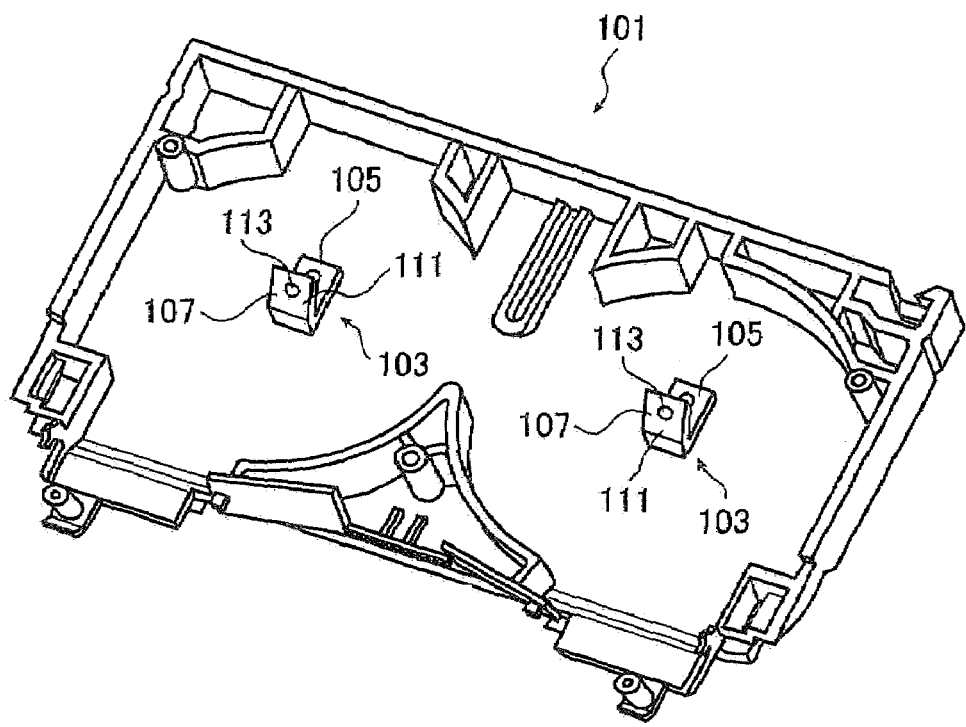
FIG. 10 is a perspective view showing a reel urging member as it has been fitted on the upper half of a magnetic tape cassette according to an example of the seventh aspect of the invention.
Figure 11:
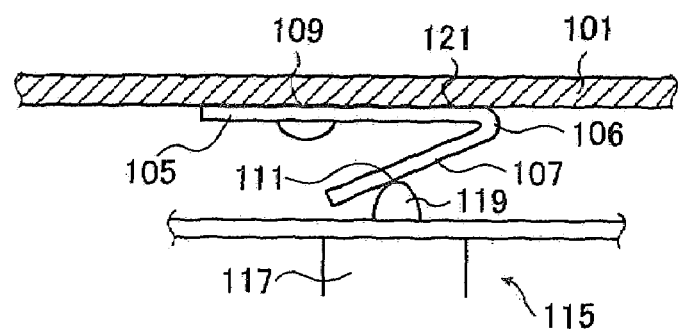
FIG. 11 is a schematic cross-sectional view illustrating how a tape reel is urged by means of the reel urging member shown in FIG. 10.
Figure 12:
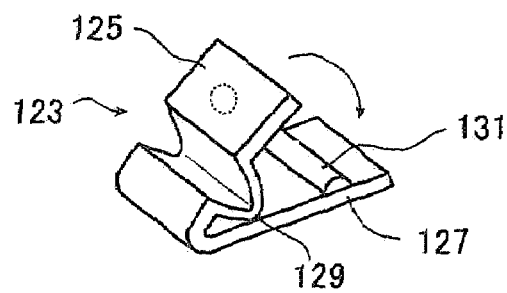
FIG. 12 shows in conceptual form a reel urging member according to another example of the seventh aspect of the invention.

FIGS. 10-12 illustrate an exemplary design for the structures of the reel urging member and the upper half of the magnetic tape cassette according to the seventh aspect of the invention. The constituent elements of the cassette according to the seventh aspect of the invention excepting those indicated by reference numerals in FIGS. 10-12 are not limited in any particular way and may be the same as those used in the prior art magnetic tape cassette shown in FIG. 53; hence, those constituent elements are not shown specifically in FIGS. 10-12, nor are they explained in the following description.

FIG. 10 is a perspective view showing the inner surface of an example of the upper half to be used in the seventh aspect of the invention. In the upper half generally indicated by 101 in FIG. 10, the reel urging member generally indicated by 103 urges the tape reel (not shown) in the case toward the lower half.

As shown in FIGS. 10 and 11, the reel urging member 103 is generally of a V shape in cross section, specifically of a V shape with one side lying horizontally, and has a base portion 105 in the form of a flat plate and a tape reel contacting portion 107 also in the form of a flat plate which connects to an end of the base portion 105 via a bend 106 at angle θ. The base portion 105 has a mounting portion 109 and the tape reel contacting portion 107 has a recess 113 formed in the surface 111 at the center.

As shown in FIG. 11, the magnetic tape cassette has the reel urging member 103 mounted on the inner surface 121 of the upper half 101 by welding the mounting portion 109 of the base portion 105 such that the crest 119 of the reel hub 117 in the tape reel 115 will be in a position where it fits into the recess 113.

When the upper half 101 having the reel urging member 103 mounted on the inner surface and the lower half (not shown) are coupled to construct a cassette case with the tape reel in it, the crest 119 of the reel hub 117 in the tape reel 115 causes the tape reel contacting portion 107 in contact with the crest 119 to be pressed toward the upper half 101 (see FIG. 11), whereupon the bend 106 deforms elastically and its resiliency causes the tape reel 115 to be urged toward the lower half (downward in FIG. 11).

FIG. 12 illustrates another example of the seventh aspect of the invention. In the illustrated example, the reel urging member generally indicated by 123 is essentially the same as what is shown in FIGS. 10 and 11, except that the tape reel contacting portion 125 is provided with a contacting area 129 that is bent in a U shape in cross section which is convex toward the base portion 127 and the distal end of which contacts the base portion 127; another difference is that a ridge 131 is provided on the side of the base portion 127 which faces the tape reel contacting portion 125. This design is preferred since it can not only control the spring force but also minimize the effect that is exerted on the spring force by the means of mounting the base portion 127 to the upper half.

Described above are the basic features of the magnetic tape cassette according to the seventh aspect of the invention.

Figure 13A:
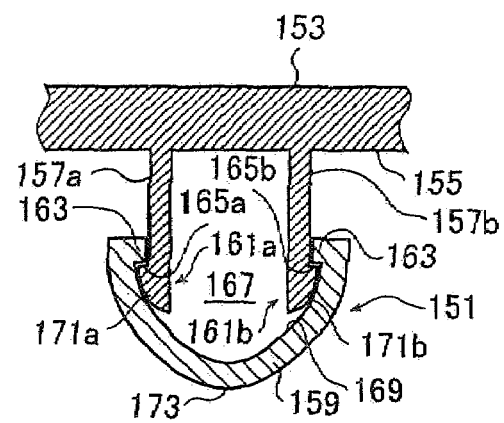
FIG. 13A is a schematic cross-sectional view illustrating the structure of a reel urging member of an example of the magnetic tape cassette according to the eighth aspect of the invention.
Figure 13B:
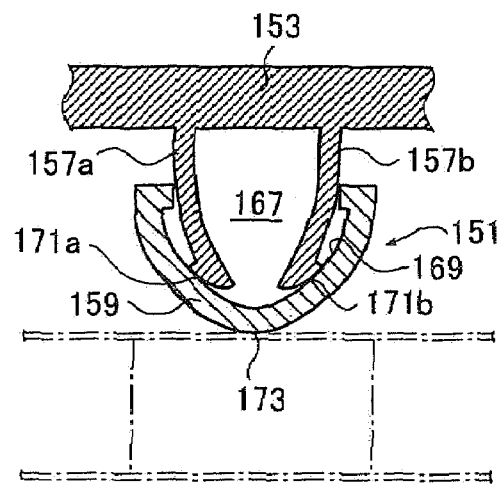
FIG. 13B is a schematic cross-sectional view illustrating how a tape reel is urged by means of the reel urging member.
Figure 14:
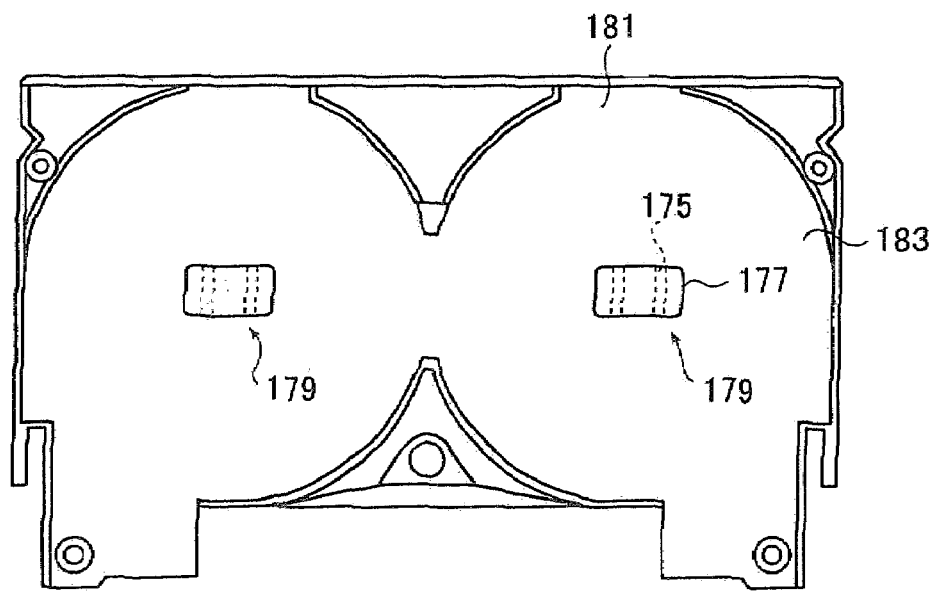
FIG. 14 is a plan view showing the inner surface of an upper half in an example of the magnetic tape cassette according to the eighth aspect of the invention.

We next describe the magnetic tape cassette according to the eighth aspect of the invention with reference to FIGS. 13-15.

In the eighth aspect of the invention, the reel urging member contacts the tape reel and deforms elastically in a direction generally perpendicular to the direction of urging the reel, thereby causing the tape reel to be urged toward the lower half. In the eighth aspect of the invention, the direction of urging the reel is from the upper half toward the lower half; elastic deformation in a direction generally perpendicular to the direction of urging the reel means that flexible ribs deform elastically by bending through angles within 90 degrees either inwardly (as shown in FIG. 13B) or outwardly (as in FIG. 15B) with respect to the direction of urging the reel.

In the eighth aspect of the invention, the reel urging member is one of the following types: (1) it comprises flexible ribs erected on the inner surface of the upper half to extend toward the lower half and a contact member that is fitted over the distal ends of the flexible ribs; (2) it comprises flexible ribs erected on the inner surface of the upper half to extend toward the lower half, with a recess in the form of an inverted cone being made in the upper surface of the tape reel such that the distal ends of the flexible ribs are to be inserted into the recess; or (3) it consists of any other shapes that permit the tape reel to be urged toward the lower half by elastic deformation of flexible ribs.

In the eighth aspect of the invention, the flexible ribs are erected on the inner surface of the upper half such that they extend toward the lower half from positions that are determined by the positions where the tape reels are housed in the cassette case. The flexible ribs may take any shapes including a pair of ribs that are erected parallel on the inner surface of the upper half.

The flexible ribs each have an engage-and-stop end portion at the distal end which is to be either fitted into a fitting portion that is formed by the inclined inner surface of a downwardly convex contact member having a generally U shaped cross section or inserted into a recess in the form of an inverted cone that is made in the upper surface of the tape reel; the engage-and-stop end portions preferably have sliding ends that slide in contact with the inclined inner surface of the fitting portion or the recess. It is also preferred that the flexible ribs which are to be fitted into the contact member have engage-and-stop shoulders that come into engagement with an engage-and-stop flange formed at the upper edge of the inclined inner surface of the contact member.

In the cassette of the eighth aspect of the invention, the reel urging member may be composed of flexible ribs and a contact member. If the upper half of this design is assembled, the engage-and-stop shoulders of the engage-and-stop end portions at the distal ends of the flexible ribs as fitted into the fitting area of the contact member come into engagement with the engage-and-stop flange formed at the upper edge of the contact member. The upper half fitted with this reel urging member is coupled with the lower half to construct the cassette case. When the tape reel is housed in the cassette case, the crest at the lower part of the contact member is brought into contact with the upper part of the tape reel. As a result of this contact, the reel urging member is depressed by the tape reel, whereupon the contact member is pressed upward; in response to the developed pressing force, the sliding ends of the flexible ribs slide on the U-shaped, inclined inner surface of the contact member, causing the flexible ribs to deform elastically by bending in a direction generally perpendicular to the direction of urging the tape reel; this elastic deformation develops a drive force that urges the tape reel toward the lower half.

Alternatively, the reel urging member may be composed of flexible ribs, with a recess being formed in the upper part of the tape reel such that the flexible ribs are inserted into the recess. The upper half fitted with the flexible ribs on the inner surface is coupled with the lower half to construct the cassette case. When the tape reel having the recess formed in the upper part is housed in the cassette case, the distal ends of the flexible ribs are inserted into the recess in the upper part of the tape reel. As a result of this contact, the flexible ribs are pressed upward; in response to the developed pressing force, the flexible ribs deform elastically by bending in a direction generally perpendicular to the direction of urging the tape reel; this elastic deformation develops a drive force that urges the tape reel toward the lower half.

In the cassette according to the eighth aspect of the invention, the reel urging member is provided on the inner surface of the upper half in a position where it urges the tape reel and which is determined by where in the cassette case the tape reel is to be housed. For instance, it may be provided on the inner surface of the upper half at a site which corresponds to an upper part where the reel hub in the tape reel is to be located.

If the flexible ribs and the contact member combine to form the reel urging member, the cross-sectional shape of the contact member is not limited in any particular way and it may be of an inverted cone, one of the two longitudinally split sections of a tube or any other shape that has an inclined inner surface describing a U-shaped cross section which makes slidable contact with the distal ends of the flexible ribs. In a particularly preferred case, the contact member has a cross-sectional shape of one of the two longitudinally split sections of a tube.

If the recess into which the distal ends of the flexible ribs are to be inserted is made in the upper part of the tape reel, the shape of the recess is not limited in any particular way and it may be of any shape such as an inverted cone or one of the two longitudinally split sections of a tube.

If the reel urging member of the cassette according to the eighth aspect of the invention is composed of flexible ribs and a contact member into which the flexible ribs are to be fitted, both the flexible ribs and the contact member may be formed of a resin material. In particular, the flexible ribs may be formed of the same resin material as the upper half of which it is an integral part; alternatively, they may be formed of a different resin material than the upper half. If the contact member is formed of the same resin material as the upper half and the flexible ribs, the upper half need not be broken down into the respective parts and this is effective for the purpose of assorted collection of resin materials.

If the reel urging member is composed of flexible ribs and a recess is formed in the upper part of the tape reel such that the flexible ribs are inserted into the recess, the flexible ribs may again be formed of the same resin material as the upper half of which it is an integral part; alternatively, they may be formed of a different resin material than the upper half. If the flexible ribs are formed of the same resin material as the upper half, the upper half need not be broken down into the respective parts and this is effective for the purpose of assorted collection of resin materials.

FIGS. 13-15 illustrate an exemplary design for the structures of the reel urging member and the upper half of the magnetic tape cassette according to the eighth aspect of the invention. The constituent elements of the cassette according to the eighth aspect of the invention excepting those indicated by reference numerals in FIGS. 13-15 are not limited in any particular way and may be the same as those used in the prior art magnetic tape cassette shown in FIG. 53; hence, those constituent elements are not shown specifically in FIGS. 13-15, nor are they explained in the following description.

FIG. 13A is a schematic cross-sectional view of the reel urging member which is generally indicated by 151 and which urges the tape reel in the case toward the lower half.

The reel urging member 151 has a pair of flexible ribs 157a and 157b and a contact member 159. The flexible ribs are erected parallel on the inner surface 155 of the upper half 153 to extend toward the lower half (not shown), and the contact member 159 is one of the two longitudinally split sections of a tube which is oriented convex downward to be fitted over the distal ends of the flexible ribs 157a and 157b.

The flexible ribs 157a and 157b have engage-and-stop end portions 161a and 161b, respectively, at the distal ends. The engage-and-stop end portion 161a (or 161b) has an engage-and-stop shoulder 165a (or 165b) that engages an engage-and-stop flange 163 formed at the upper edge of the contact member 159, as well as a sliding end portion 171a (or 171b) that slides in contact with the inclined inner surface 169 of a U-shaped cross section which faces the fitting area 167 inside of the contact member 159.

If the upper half fitted with the reel urging member 151 is assembled, the engage-and-stop shoulders 165a and 165b of the engage-and-stop end portions 161a and 161b at the distal ends of the flexible ribs 157a and 157b as fitted into the fitting area 167 of the contact member 159 come into engagement with the engage-and-stop flange 163 formed at the upper edge of the contact member 159.

The upper half fitted with this reel urging member 151 is coupled with the lower half to construct the cassette case. When the tape reel is housed in the cassette case, the crest 173 at the lower part of the contact member 159 is brought into contact with the upper part of the tape reel (indicated by the short-and-long dashed line in FIG. 13B). As a result of this contact, the reel urging member 151 is depressed by the tape reel, whereupon the contact member 159 is pressed upward; in response to the developed pressing force, the sliding end portions of 171a and 171b of the flexible ribs 157a and 157b slide on the U-shaped, inclined inner surface 169 of the contact member 159, causing the two flexible ribs 157a and 157b to deform elastically by bending inwardly in opposite directions; this elastic deformation develops a drive force that urges the contact member 159 toward the tape reel.

In the magnetic tape cassette having the reel urging member 151, the reel urging member is provided on the inner surface of the upper half in a position where it urges the tape reel and which is determined by where in the cassette case the tape reel is to be housed. Consider, for example, a two-reel type magnetic tape cassette; as in the exemplary design illustrated in FIG. 14, the reel urging member generally indicated by 179 which is composed of flexible ribs 175 and a contact member 177 may be provided on the inner surface 183 of the upper half 181 at two sites where the reel hub in the tape reel is to be located.

FIG. 15 is a schematic cross-sectional view illustrating another exemplary design for the reel urging member in the cassette according to the eighth aspect of the invention.

The reel urging member generally indicated by 185 consists of a pair of flexible ribs 187a and 187b which are erected parallel on the inner surface (not shown) of the upper half to extend toward the lower half, with a recess 195 in the form of an inverted cone being made in the upper surface 191 of the tape reel 189 such that the distal ends 193a and 193b of the flexible ribs 187a and 187b are to be inserted into the recess.

The flexible ribs 187a and 187b have sliding end portions 199a and 199b that contact the inclined inner surface 197, in the form of an inverted cone, of the recess 195 in the tape reel 189.

When the upper half fitted with the flexible ribs 187a and 187b that combine together to form the reel urging member is coupled with the lower half to construct the cassette case as it contains the tape reel, the distal ends 193a and 193b of the flexible ribs 187a and 187b are inserted into the recess 195 in the upper surface 191 of the tape reel 189, whereupon the sliding end portions 199a and 199b come into contact with the inclined inner surface 197 of the recess 195. As a result of this contact, the flexible ribs 187a and 187b are pressed upward by the tape reel 189; in response to the developed pressing force, the sliding end portions 199a and 199b of the flexible ribs 187a and 187b keep contacting the inclined inner surface 197 of the recess 195 and, as shown in FIG. 15B, the flexible ribs 187a and 187b bend in the direction of arrow A and deform elastically in a direction generally perpendicular to the direction of urging the tape reel 189; this elastic deformation develops a drive force that urges the tape reel 189 toward the lower half.

In the magnetic tape cassette having the flexible ribs 187a and 187b as reel urging members, those flexible ribs 187a and 187b are provided on the inner surface of the upper half in such positions that they urge the tape reel 189 and these positions are determined by where the tape reel 189 is housed within the cassette case.

Figure 15A:
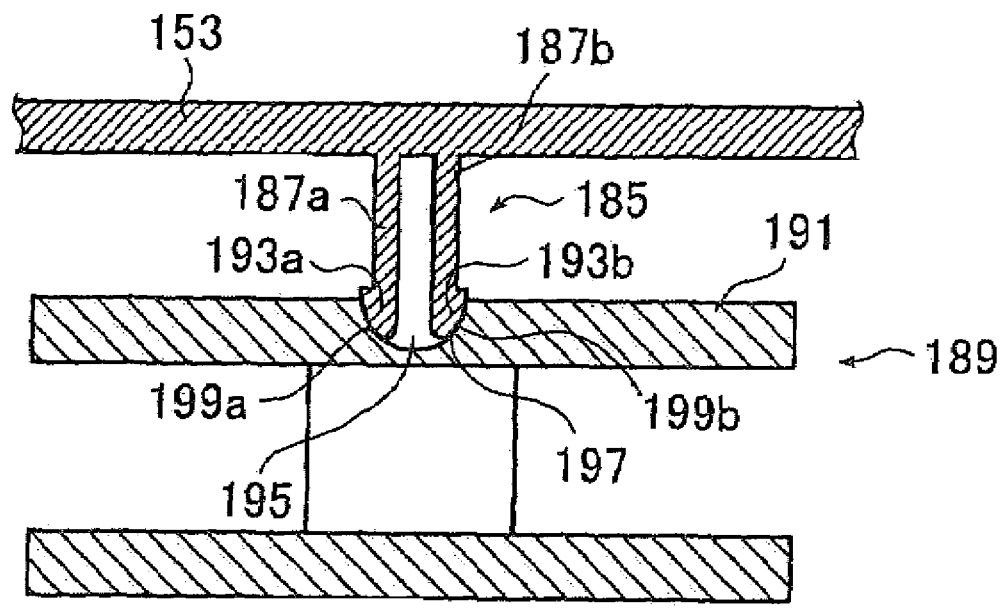
FIG. 15A is a schematic cross-sectional view illustrating the structures of a reel urging member and a tape reel in another example of the magnetic tape cassette according to the eighth aspect of the invention.
Figure 15B:
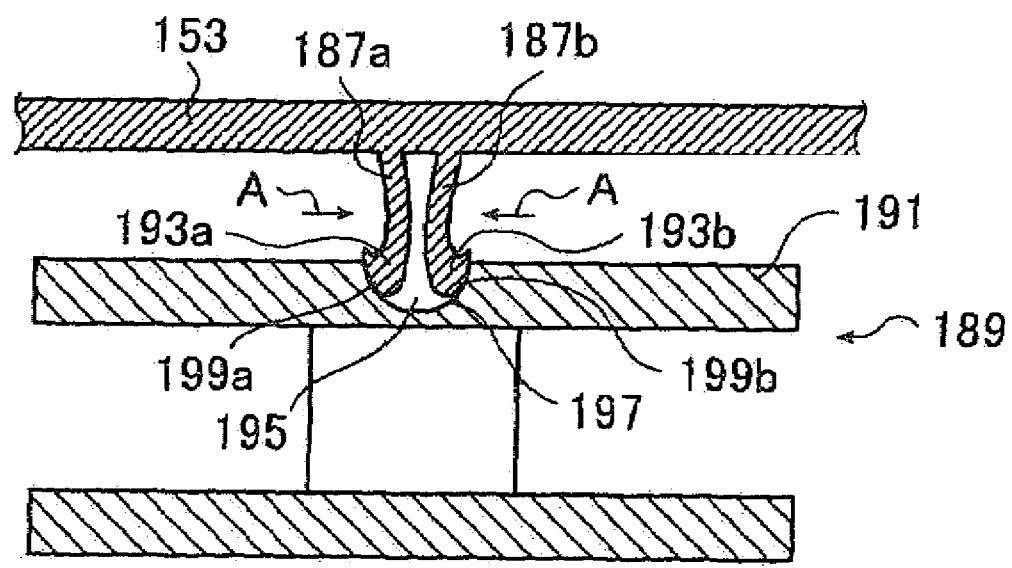
FIG. 15B is a schematic cross-sectional view illustrating how a tape reel is urged by means of the reel urging member.

The reel urging members illustrated in FIGS. 13A and 15A have a simple and straightforward structure and are yet capable of adequately urging the tape reel toward the lower half; what is more, they can be formed of a resin material instead of a metal material. Hence, the magnetic tape cassette having these reel urging members are advantageous for assorted collection of resin material.

Described above are the basic features of the design for the magnetic tape cassette according to the eighth aspect of the invention.

We now describe a magnetic tape cassette according to the ninth aspect of the invention with reference to FIGS. 16-20.

The following description concerns the case of applying the ninth aspect of the invention to a two-reel type magnetic tape cartridge (magnetic tape cassette).

FIG. 16A is a perspective view of a magnetic tape cassette according to an example of the ninth aspect of the invention, and FIG. 17 shows in section a reel urging spring insertion area of the magnetic tape cassette shown in FIG. 16A. In FIGS. 16A and 17, no parts of the magnetic tape cassette that are irrelevant to the ninth aspect of the invention are shown. In the following description, the overall construction of the magnetic tape cassette already described with reference to FIG. 53 is omitted and only the essential parts will be described.

In the example shown in FIG. 17, reel urging spring insertion areas 210 are each provided in the upper half 200 at a specified position in a hook (crank) shape that penetrates the upper half 200. To be more exact, each of the reel urging spring insertion areas 210 as provided in the upper half 200 at specified positions consists of two staggered recesses 211 and 212, one of which faces the bottom surface (inner surface) of the upper half 200 and the other facing the outer surface (upper surface). The two recesses 211 and 212 connect to each other as they are spaced apart by a small distance.

In the example under consideration, the leaf-like reel urging spring 220 is typically of the shape shown in FIG. 17 and consists of an insertion part having two hairpin-like bends 222 which are U-shaped in opposite directions and a flat portion 224 at the terminal end of the bend 222, and an elastic portion 223 provided in the distal end portion of the bend 222. The bend 222 has been worked to exhibit a specified degree of spring elasticity when the flat portion 224 of the reel urging spring 220 makes face contact with the bottom surface of the recess 211 and when the bend 222 as inserted into the reel urging spring insertion area 210 makes face contact with both lateral surfaces of the recess 212.

FIG. 18 illustrates the reel urging spring 220 as it has been taken out of the reel urging spring insertion area 210.

As FIG. 18 shows, the bend 222 of the reel urging spring 220 taken out of the reel urging spring insertion area 210 has spread considerably than when it was inserted into the reel urging spring insertion area 210. To be more specific, in the example under consideration, the reel urging spring 220 having the bend 222 of size d (the width of the bend in the natural state) shown in FIG. 18 is compressed by a certain degree (to size d' in FIG. 17) when it is inserted into the reel urging spring insertion area 210, thus assuring more positive engagement.

In the illustrated case, that part of the reel urging spring 220 which is to be inserted into the reel urging spring insertion area 210 is designed to have two hairpin-like bends 222. However, the shape of this part is by no means limiting and it may be designed to have any shape that exhibits a specified degree of spring elasticity when the reel urging spring 220 is inserted into the reel urging spring insertion area 210.

FIG. 16A is a perspective view showing the whole exterior appearance of the magnetic tape cassette according to the example under consideration which is furnished with the reel urging spring engage-and-stop mechanism of the design just described above, and FIG. 16B shows enlarged the region around the reel urging spring insertion area 210.

As shown in FIGS. 16A and 16B, the magnetic tape cassette according to the example under consideration has the recess 211 in the reel urging spring insertion area 210 exposed on the upper surface.

The upper half has a portion 213 that overhangs the recess 211 and which is surrounded by a groove 216 facing the recess 212. When pulled up, the portion 213 breaks and so does the reel urging spring insertion area 210. In other words, the portion 213 is an easy-to-break part that enables the reel urging spring 220 to be taken out of the magnetic tape cassette without separating and breaking down the upper and lower halves.

In the illustrated case, the easy-to-break part 213 is surrounded by the groove 216 formed in only the obverse surface of the upper half 200. This is not the sole case of the invention and a groove may be formed in the reverse surface or in both the obverse and reverse surfaces of the upper half 200. The groove need not surround the entire perimeter of the easy-to-break part 213 or it may be discontinuous rather than continuous. The easy-to-break part 213 as surrounded by the groove 216 also has a capability for preventing dust particles from getting into the cassette. The reference numeral 202 designates the lower half and the reference numeral 200a designates a transparent inspection window.

The magnetic tape cassette according to the example described above has not only the advantage that by disassembling it into the upper and lower halves, the reel urging spring 220 can be taken out of the cassette without using any special tool and the like; another advantage is that without disassembling the magnetic tape cassette into the upper and lower halves but by using a suitable jig, one can remove the reel urging spring 220 alone and thereby contributes to facilitating the assorted collection of constituent materials.

Figure 19:
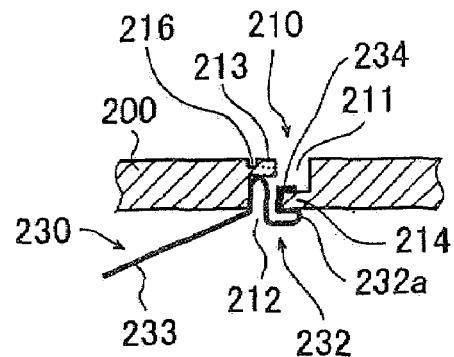
FIG. 19 shows in section an area of the magnetic tape cassette according to another example of the ninth aspect of the invention where a reel urging spring is inserted.

FIG. 19 shows in section a reel urging spring insertion area of the magnetic tape cassette according to another example of the ninth aspect of the invention. The difference from the example shown in FIG. 17 lies in the shape of the reel urging spring 230. As shown, the reel urging spring 230 according to the example under consideration has not only a dual bend 232 that is inserted into the recess 212 in the reel urging spring insertion area 210 to contact the upper half 200 but also an additional bend 232a which is oriented perpendicular to the bend 232 and placed in contact with the inner surface of that area of the upper half 200 which faces the recess 212, thereby protecting the reel urging spring insertion area 210 (recess 212) more effectively against dust coming from the outside. In addition, the reel urging spring 230 clamps a lug 214 formed in the lower part of the recess 211 in the upper half 200 and this assures more positive engagement of the reel urging spring 230. Needless to say, the reel urging spring 230 has an elastic portion 233 at the distal end of the bend 232 and a flat portion 234 at the terminal end of the bend 232a.

Figure 20:
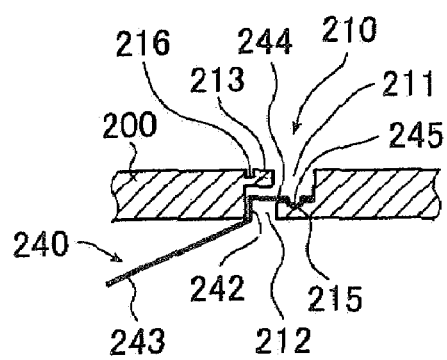
FIG. 20 shows in section an area of the magnetic tape cassette according to yet another example of the ninth aspect of the invention where a reel urging spring is inserted.

FIG. 20 shows in section a reel urging spring insertion area of the magnetic tape cassette according to yet another example of the ninth aspect of the invention. The difference from the examples shown in FIGS. 16 and 19 is that the shape of the reel urging spring 240 is simpler. To be specific, the reel urging spring 240 according to the example under consideration has a very simple shape in that the portion which is to be brought into engagement with the recess 212 in the reel urging spring insertion area 210 has only two bends and this design facilitates the manufacture of the reel urging spring. To be more specific, the reel urging spring 240 consists of an elastic portion 243, a hook (or crank) shaped bend 242 that is continuous from the elastic portion 243 at an acute angle and which then bends at right angles, and a flat portion 244 continuous from the bend 242.

In the example under consideration, a recess 252 which comes into engagement with a projection 245 on the reel urging spring 240 is provided in the reel urging spring insertion area 210 (i.e., on the bottom of the recess 211 in the illustrated case) in order to assure positive engagement of the reel urging spring 240. This design is simple and yet has the advantage of bringing the reel urging spring 240 into positive engagement with the reel urging spring insertion area 210.

Again, the magnetic tape cassettes using the reel urging spring engage-and-stop mechanisms according to the examples just described above offer the advantage that there is no need to use tools in order to take out the reel urging spring from the magnetic tape cassette as it is torn apart; in addition, constituent materials of the magnetic tape cassette can be efficiently assorted according to their kind.

Described above are the basic features of the design for the magnetic tape cassette according to the ninth aspect of the invention.

We next describe a magnetic tape cassette according to the tenth aspect of the invention with reference to FIGS. 21-30.

In the following description of the magnetic tape cassette according to the tenth aspect of the invention, a two-reel type magnetic tape cassette is taken as an example. The magnetic tape cassette according to this example of the tenth aspect of the invention has basically the same construction as the prior art magnetic tape cassette shown in FIG. 53, except for the design of the reel urging spring used as the reel retaining spring. Therefore, the following description is directed to only the design of the reel urging spring.

Figure 21:
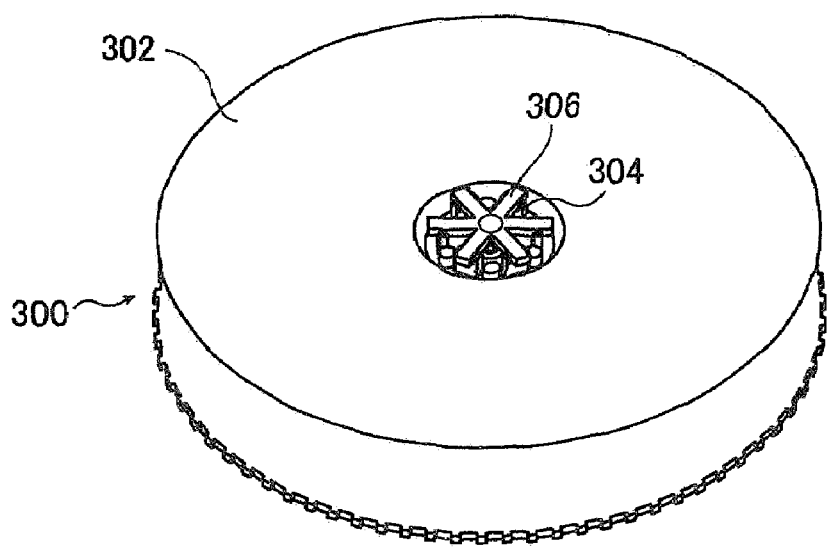
FIG. 21 is a perspective view showing an example of the reel urging structure in the magnetic tape cassette according to the tenth aspect of the invention as it has been mounted in a tape reel.
Figure 22:
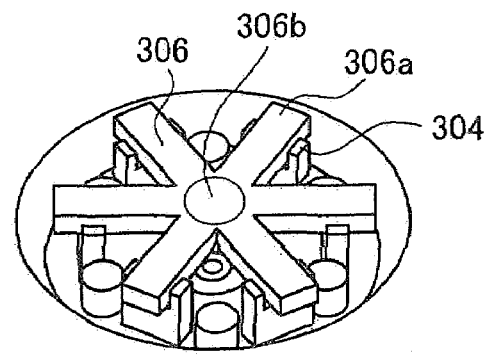
FIG. 22 is a perspective view showing enlarged the reel urging structure of FIG. 21 as it has been mounted in the tape reel.
Figure 23:
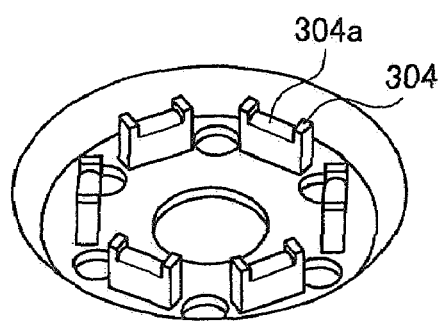
FIG. 23 is a perspective view showing spring seats as elements of the reel urging structure shown in FIG. 22.
Figure 24:
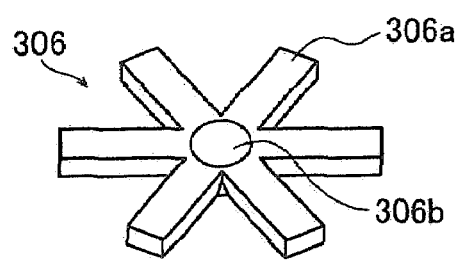
FIG. 24 is a perspective view showing the upper surface of a reel urging spring as another element of the reel urging structure shown in FIG. 22.
Figure 25:
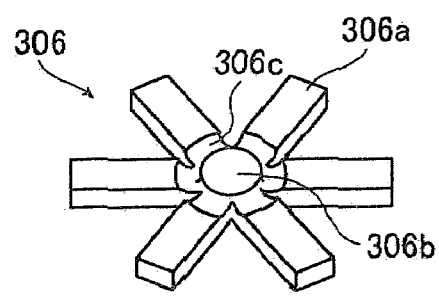
FIG. 25 is a perspective view showing the lower surface of the reel urging spring shown in FIG. 24.
Figure 26:
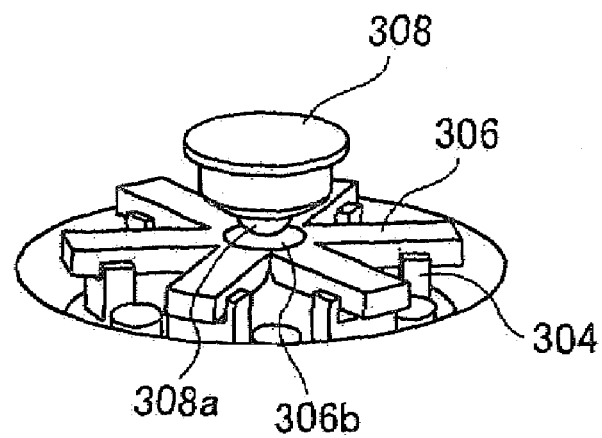
FIG. 26 is a perspective view showing how the recess in the reel urging spring shown in FIG. 24 is associated with a pivot provided on the upper half.

FIG. 21 is a perspective view showing an example of the reel urging spring structure in the magnetic tape cassette according to the tenth aspect of the invention as it has been mounted in a tape reel; FIG. 22 is a perspective view showing enlarged the reel urging structure of FIG. 21 as it has been mounted in the tape reel; FIG. 23 is a perspective view showing spring seats as elements of the reel urging structure shown in FIG. 22; FIG. 24 is a perspective view showing the upper surface of a reel urging spring as another element of the reel urging structure shown in FIG. 22; FIG. 25 is a perspective view showing the lower surface of the reel urging spring shown in FIG. 24; and FIG. 26 is a perspective view showing how the recess in the reel urging spring is associated with a pivot provided on the upper half.

As shown in FIGS. 21-26, the reel urging spring in the magnetic tape cassette according to the example under consideration is buried in the center of the upper flange 302 of the tape reel 300; a plurality of spring seats 304 are provided in a recessed area in the center of the upper flange 302 and the reel urging spring 306 in the form of a plurality of elastic arms 306a extending radially from the central base (in the same plane) is placed to rest on the spring seats 304. The plurality of elastic arms 306a (six in the illustrated case) in the reel urging spring 306 are fitted into grooves 304a in the plurality of spring seats 304 (six in the illustrated case) and fixed in position; thus, the reel urging spring 306 needs only to be placed on the spring seats 304 in order to be situated in the center of the upper flange 302 of the tape reel 300.

A spherical concavity 306b is provided in the central base of the reel urging spring 306; a pivot 308 having a spherical convex 308a formed at the tip with a smaller radius of curvature than that of the concavity 306b is provided on the inner surface of the upper half (not shown) in the position corresponding to the center of the tape reel 300 and in such a way as to project downward. As shown in FIG. 26, the convex 308a of the pivot 308 provided on the inner surface of the upper half is fitted into the concavity 306b at the central base of the reel urging spring 306 and then depressed, whereupon the reel urging spring 306 is depressed to cause a downward deformation of the elastic arms 306a; the urging force developed by the deformed elastic arms 306a causes the tape reel 300 to be depressed toward the lower half. The above-described structural design of the reel urging spring according to the example under consideration has the advantage that even if the elastic arms 306a of the reel urging spring 306 are not completely fixed at their distal ends, the reel urging spring 306 can always be situated at the center of the flange of the tape reel 300 by fitting the convex 308a of the pivot 308 into the concavity 306b.

The elastic arms 306a of the reel urging spring 306 may be in the form of metallic leaf spring; however, considering the need to disassemble the discarded magnetic tape cassette and collect the respective components after assorting them according to material, the elastic arms 306a are desirably made of nonmetallic highly elastic materials such as rigid rubber and highly elastic plastics, with highly elastic plastics being particularly desirable. The elastic arms 306a suitably range from two to eight in number and, in order to ensure that they can be placed in stable position while preventing them from being cluttered, the elastic arms 306a are desirably from three to six in number.

In order to ensure that the elastic arms 306a provide an appropriate urging force, the reel urging spring 306 may have a thin-walled portion 306c in the lower part of each elastic arm 306a as shown in FIG. 25. The thin-walled portion 306c may be a semicircular recess as shown in FIG. 25; alternatively, it may be long enough to cover almost the entire length of each elastic arm 306a. While the thickness of each elastic arm 306a varies with the constituent material or the required urging force, it is generally desired to select a value of about 0.6 mm.

Of course, the relative positions of the pivot and the concavity may be reversed so that the concavity is provided in the inner surface of the upper half whereas the pivot is provided at the central base of the reel urging spring 306. If desired, the pivot may be made of plastic having a lower friction coefficient than the reel urging spring 306 or the inner surface of the upper half or, alternatively, the surface of the pivot may be coated with a material of lower friction coefficient so that the drive force required to rotate the tape reel 300 is sufficiently reduced to permit smoother rotation of it.

Figure 27:
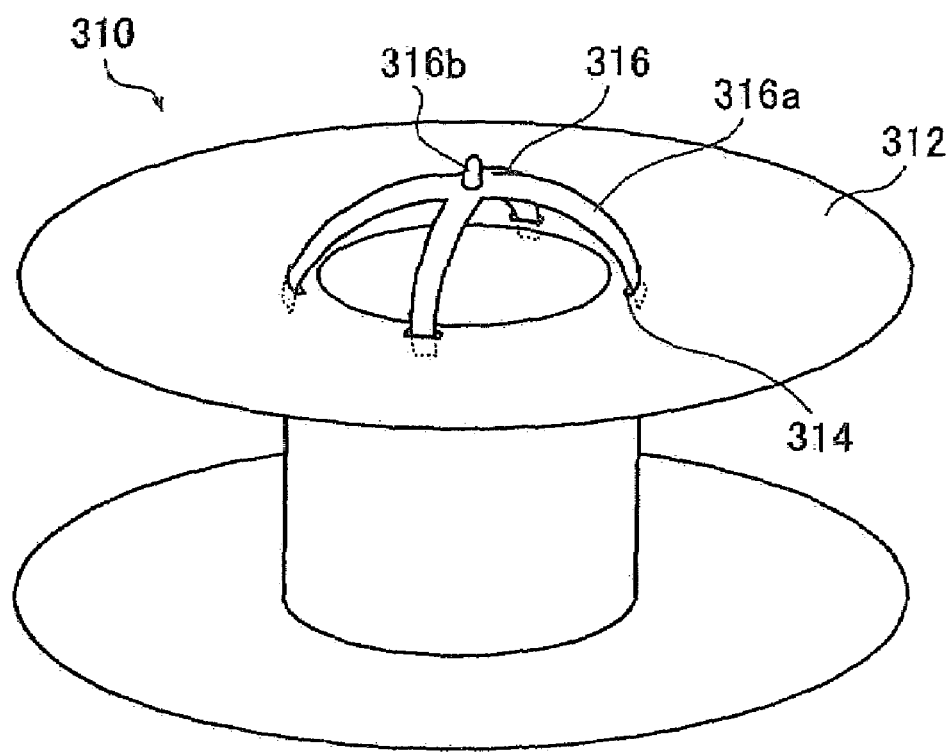
FIG. 27 is a perspective view showing another example of the reel urging structure in the magnetic tape cassette according to the tenth aspect of the invention as it has been mounted in a tape reel.

FIG. 27 is a perspective view showing another example of the design for the reel urging spring in the magnetic tape cassette according to the tenth aspect of the invention as it has been mounted in a tape reel. As shown, the tape reel 310 has a plurality of slit-like spring seats 314 (four in the illustrated case) formed in the surface of an upper flange 312 and the tips of a plurality of elastic arms 316a (four in the illustrated case) that extend radially from the central base of the reel urging spring 316 are inserted into the respective slits such that the central base of the reel urging spring 316 is situated at a higher position than the tips of the respective elastic arms 316a. In the example under consideration, a convex 316b provided at the central base of the reel urging spring 316 is depressed by the inner surface of the upper half (not shown) so that the elastic arms 316a deform downward, whereupon an urging force develops to depress the tape reel 310 toward the lower half.

The convex 316b at the central base of the reel urging spring 316 is not necessarily an essential element; however, smaller friction occurs if the reel urging spring 316 makes point contact with the inner surface of the upper half in the position where it is being depressed by the latter and, hence, the convex 316b is desirably provided at the central base of the reel urging spring 316. On the other hand, there is no need to form a concavity in the inner surface of the upper half because the elastic arms 316a, with their tips inserted into the slit-like spring seats 314, are completely controlled in their position so that the central position of the reel urging spring 316 automatically aligns with the center of the tape reel 310. As for other design considerations including the constituent material of the elastic arms 316a, the number of the arms, the formation of thin-walled portions and the use of a material of lower fiction coefficient, the comments given in connection with the example shown in FIGS. 21-26 will apply and there is no need to give detailed explanation here.

Figure 28:
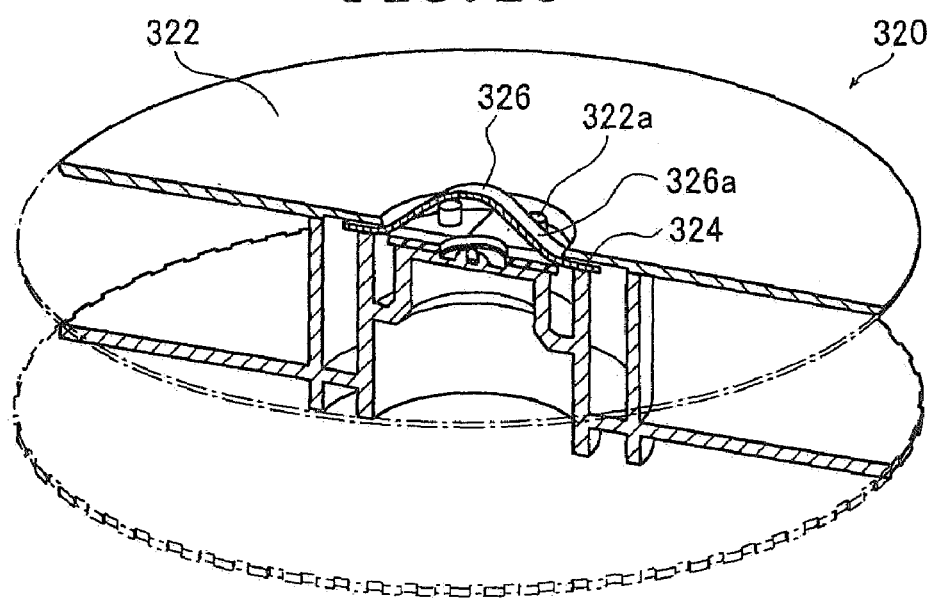
FIG. 28 is a perspective view showing in partial section still another example of the reel urging structure in the magnetic tape cassette according to the tenth aspect of the invention as it has been mounted in a tape reel.
Figure 29:
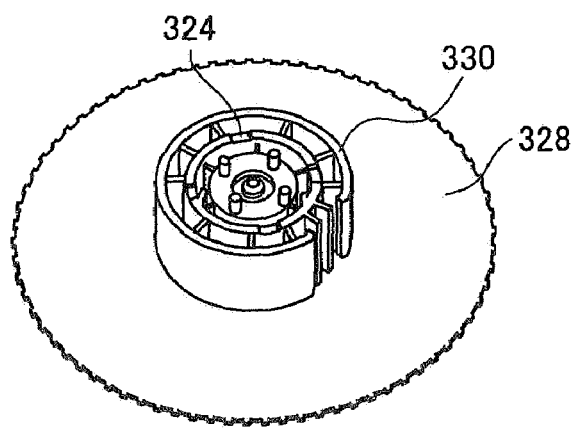
FIG. 29 is a perspective view showing the reel urging spring mounting portion of the reel urging structure shown in FIG. 28, except that the upper flange of the tape reel has been removed.
Figure 30:
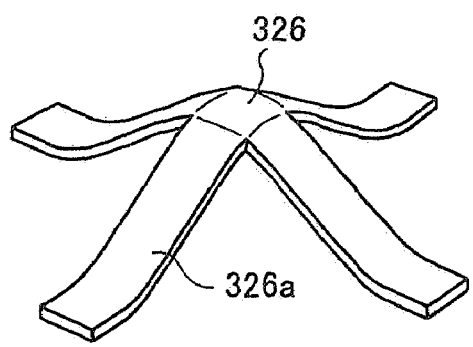
FIG. 30 is a perspective view showing the shape of the reel urging spring shown in FIG. 28.

FIG. 28 is a perspective view showing in partial section a third example of the design for the reel urging spring in the magnetic tape cassette according to the tenth aspect of the invention as it has been mounted in a tape reel. FIG. 29 is a perspective view showing the reel urging spring mounting portion of the tape reel, with the upper flange being removed. FIG. 30 is a perspective view showing the shape of the reel urging spring shown. As these figures show, the reel urging spring of the example under consideration has such a structure that a circular center hole 322a is provided in the center of an upper flange 322 of a tape reel 320 and that a plurality of spring seats 324 (four in the illustrated case) into which the tips of a plurality of elastic arms 326a (four in the illustrated case) that extend from the central base of the reel urging spring 326 are to be inserted are formed beneath the perimeter of the center hole 322a.

In the example under consideration, the tape reel 320 is assembled with the reel urging spring 326 being mounted inside of it in order to ensure that once inserted into the spring seats 324, the reel urging spring 326 will not come off. To this end, the spring seats 324 are formed on the upper surface of a hub 330 in a tape reel substrate 328 (see FIG. 29) before the upper flange 322 is mounted; on these spring seats 324, the reel urging spring 326 whose central base is at a higher position than the tips of the elastic arms (see FIG. 30) are placed and the upper flange 322 is then placed on top of the reel urging spring 326 such that the latter passes through the center hole 322a in the upper flange 322 and project therefrom.

In the example under consideration, no convex is provided at the central base of the reel urging spring 326 but, if necessary, a convex may be provided as mentioned above. Again, the center of the reel urging spring 326 is depressed by the inner surface of the upper half so that the elastic arms 326a deform downward, whereupon an urging force develops to depress the tape reel 320 toward the lower half. In the example under consideration, the tips of the elastic arms 326a of the reel urging spring 326 are designed to be capable of moving lengthwise through the spring seats 324, so on account of the depressing force exerted by the inner surface of the upper half, the elastic arms 326a slide through the spring seats 324 such that the reel urging spring 326 is depressed to a lower position.

As for other design considerations including the constituent material of the elastic arms 326a, the number of the arms, the formation of thin-walled portions and the use of a material of lower fiction coefficient, the comments given in connection with the example shown in FIGS. 21-26 will also apply and there is no need to give detailed explanation here. When disassembling the discarded magnetic tape cassette and collecting the respective components by assorting them by material, one needs only to pull up the central base of the reel urging spring 326, whereupon it can be easily dislodged from the tape reel 320 without causing undue burden on the personnel who are working on the magnetic tape cassette to break it down.

While the two examples in the foregoing description are directed to a two-reel type magnetic tape cassette, the concept of the invention is equally applicable to a one-reel type magnetic tape cassette.

Described above are the basic features of the design for the magnetic tape cassette according to the tenth aspect of the invention.

A tape reel that can be broken down according to the third aspect of the invention is now described with reference to FIGS. 31-34.

Note that the tape reel that can be broken down according to the third aspect of the invention is applicable to both the above-mentioned one-reel type magnetic tape and the conventional two-reel type magnetic tape cassette illustrated in FIG. 53. Also note that the constituent elements of the cassette other than the tape reel according to the third aspect of the invention are not limited in any particular way and may be the same as those used in the prior art magnetic tape cassette shown in FIG. 53; hence, those constituent elements are not shown specifically in FIGS. 31-34, nor are they explained in the following description.

Figure 31:
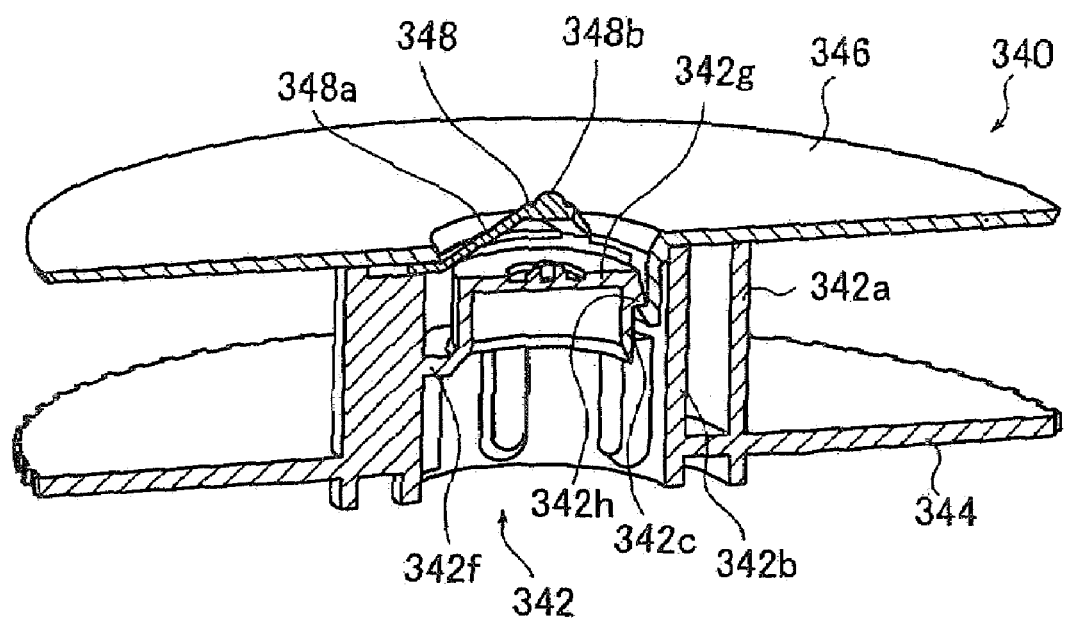
FIG. 31 is a perspective view showing in partial section the overall shape of an example of a tape reel that can be broken down according to the third aspect of the invention.
Figure 32:
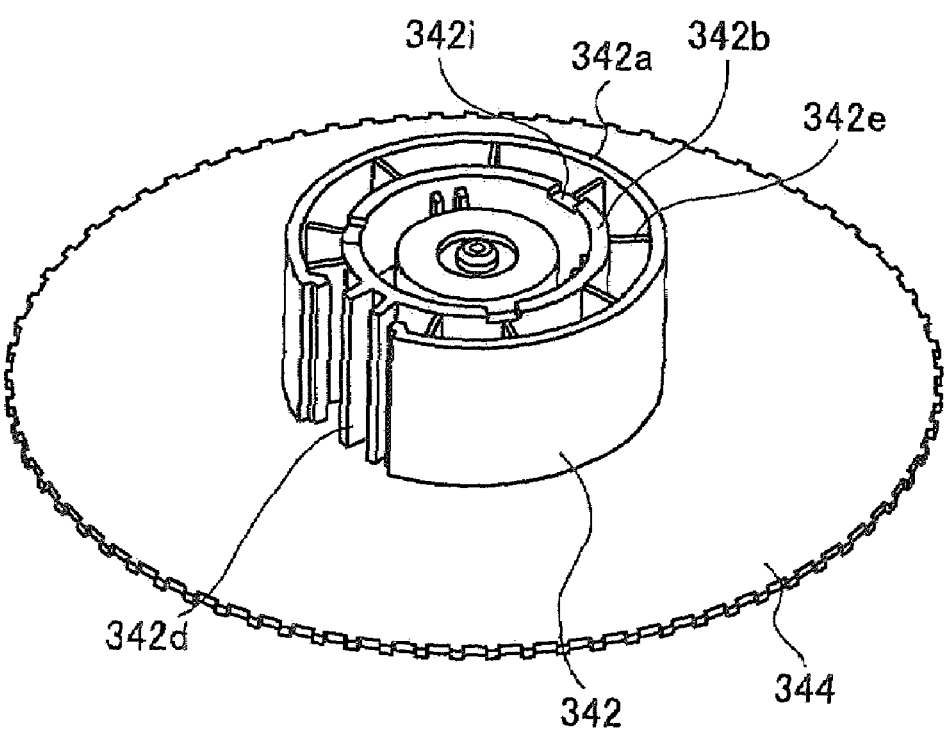
FIG. 32 is a perspective view showing an example of the lower flange as a component of the tape reel shown in FIG. 31.
Figure 33:
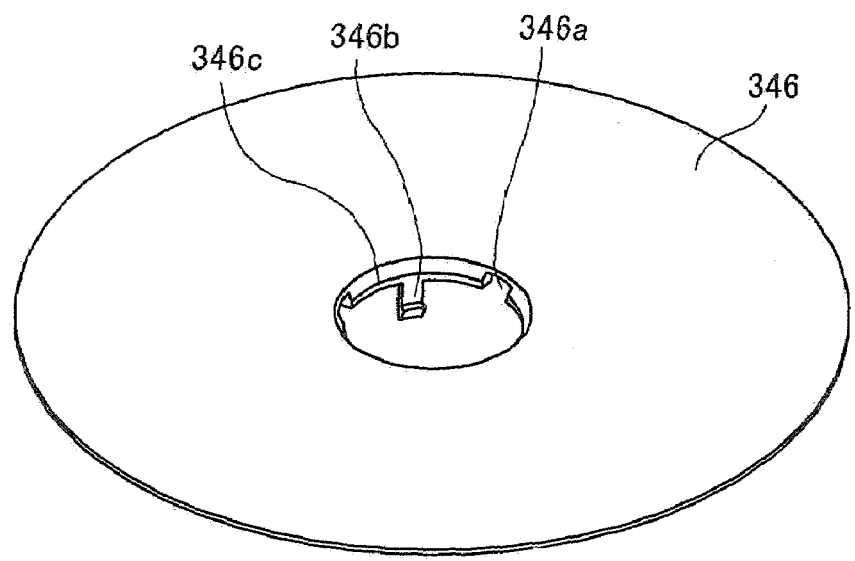
FIG. 33 is a perspective view showing an example of the upper flange as another component of the tape reel shown in FIG. 31.
Figure 34:
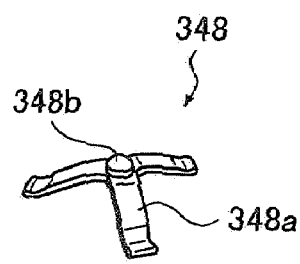
FIG. 34 is a perspective view showing an example of the reel urging spring as still another component of the tape reel shown in FIG. 31.

FIG. 31 is a perspective view showing in partial section the overall shape of a tape reel that can be broken down according to an example of the third aspect of the invention; FIGS. 32-34 are perspective views showing an example each of the lower flange, the upper flange and the reel urging (retaining) spring as components of the tape reel shown.

As shown in FIG. 31, the tape reel 340 that can be broken down according to the third aspect of the invention comprises a lower flange 344 formed as an integral part of a reel hub 342 around which magnetic tape (not shown) is to be wound and an upper flange 346 which is circular and formed as a generally flat plate. The tape reel 340 is combined with a reel urging spring 348 that contacts the inner surface of the upper half 12 to urge the tape reel 340 toward the lower half 14.

The lower flange 344 formed as an integral part of the reel hub 342 has three concentric cylindrical tubes 342a, 342b and 342c, with a fixing end 342d (see FIG. 32) provided in part of the outermost cylindrical tube 342a for fixing an end of magnetic tape.

A multiple of ribs 342e are provided between the outermost cylindrical tube 342a and the intermediate cylindrical tube 342b which is connected to the innermost cylindrical tube 342c by an intermediate wall 342f and the upper end of the innermost cylindrical tube 342c is fitted with a cover 342g; this structural design prevents deformation of the three concentric cylindrical tubes 342a, 342b and 342c and guarantees adequate mechanical strength.

A plurality of engage-and-stop lugs 342h (three in the example under consideration) are formed on the circumference of the innermost cylindrical tube 342c to extend outward. Engagement grooves 342i are provided in the upper surface of the intermediate cylindrical tube 342b at a position intermediate between adjacent engage-and-stop lugs 342h.

As shown in FIG. 33, the upper flange 346 has a cylindrical portion 346a that fits to the inside of the upper end of the intermediate cylindrical tube 342b of the reel hub 342 and from this cylindrical portion 346a, engage-and-stop pawls 346b project downward in a number that corresponds to the number (three in the example under consideration) of engage-and-stop lugs 342h on the reel hub 342.

When the cylindrical portion 346a of the upper flange 346 is inserted to a specified position inside the intermediate cylindrical tube 342b of the reel hub 342, the engage-and-stop pawls 346b of the upper flange 346 are brought into engagement with the engage-and-stop lugs 342h of the reel hub 342. Provided at a position intermediate between engage-and-stop pawls 346b of the cylindrical portion 346a is an engagement groove 346c of the same width as the engagement groove 342i in the reel hub 342.

The reel urging spring 348 functions as a reel retaining spring; a leg 348a is inserted into the engagement groove 342i in the upper surface of the intermediate cylindrical tube 342b of the reel hub 342 and into the engagement groove 346c of same width in the cylindrical portion 346a of the upper flange 346, whereupon the tape reel according to the example under consideration is prevented from lifting up toward the inner surface of the upper half; as shown in FIG. 34, the reel urging spring 348 has three of such legs 348a that extend radially outward from the central base.

As just described above, the engage-and-stop pawls 346b of the upper flange 346 are brought into engagement with the engage-and-stop lugs 342h of the reel hub 342, whereby the upper flange 346 forms an inseparable integral unit with the lower flange 344. At the same time, the legs 348a of the reel urging spring 348 are inserted into the engagement grooves 346c in the upper flange 346 and into the engagement grooves 342i in the upper end of the reel hub 342, whereby the tape reel is prevented from lifting up toward the inner surface of the tape reel. As a result of these actions, the lower flange 344 and the upper flange 346 make a positive integral unit and will not tear apart during service.

As is clear from FIG. 34, the legs 348a of the reel urging spring 348 describe a generally conical shape such that a spherical convex 348b at the central base will project from the upper surface of the upper flange 346. Hence, when the lower half 454 is combined with the upper half 452 to make the cassette case (see FIG. 53) and the tape reel 340 is assembled into the case to fabricate the magnetic tape cassette, the legs 348a and the convex 348b come into contact with the inner surface of the upper half 452, acting together as a spring that urges the tape reel 340 toward the lower half 454.

When the magnetic tape cassette is discarded after use and the respective parts are assorted by material, the following procedure may simply be taken; the reel urging spring 348 is first removed and then a screwdriver or the like is inserted into the reel hub 342 from below and the engage-and-stop pawls 346b on the upper flange 346 are disengaged from the engage-and-stop lugs 342h on the reel hub 342, whereupon the magnetic tape cassette can be easily broken down into respective parts. The magnetic tape cassette can be broken down more easily if the tips of the engage-and-stop lugs 342h are tapered as shown in FIG. 31 and pushed outward by means of an inserted dedicated tool in a cylindrical form.

The foregoing example is just one case of the invention and should by no means be taken as limiting. Various improvements and modifications can of course be made without departing from the spirit and scope of the invention; for instance, the width and thickness of the legs 348a of the reel urging spring 348 may be modified or the number of the legs 348a may be changed so as to modify the force by which the tape reel 340 is urged toward the lower half 454.

Described above are the basic features of the design for the magnetic tape cassette according to the third aspect of the invention.

A tape reel that can be broken down according to the fourth aspect of the invention will now be described with reference to FIGS. 35-42.

Note that the tape reel that can be broken down according to the fourth aspect of the invention is applicable to both the above-mentioned one-reel type magnetic tape and the conventional two-reel type magnetic tape cassette illustrated in FIG. 53. Also note that the constituent elements of the cassette other than the tape reel according to the fourth aspect of the invention are not limited in any particular way and may be the same as those used in the prior art magnetic tape cassette shown in FIG. 53; hence, those constituent elements are not shown specifically in FIGS. 35-42, nor are they explained in the following description.

Figure 35:
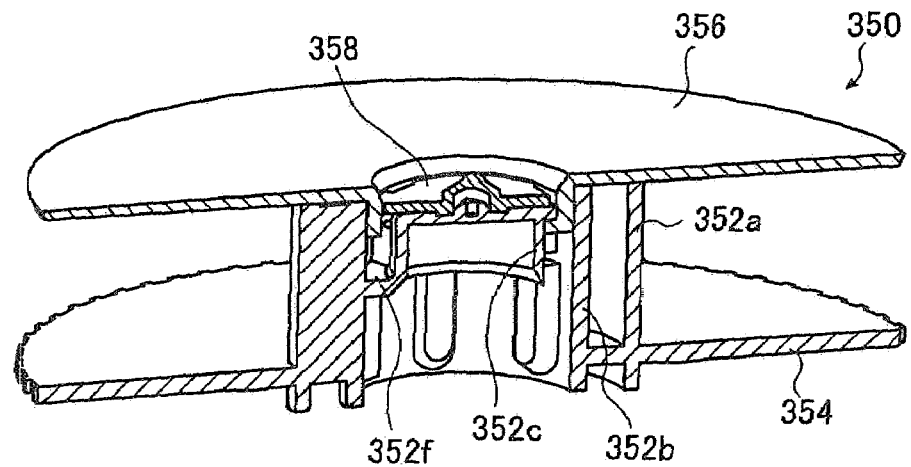
FIG. 35 is a perspective view showing in partial section the overall shape of an example of a tape reel that can be broken down according to the fourth aspect of the invention.
Figure 36:
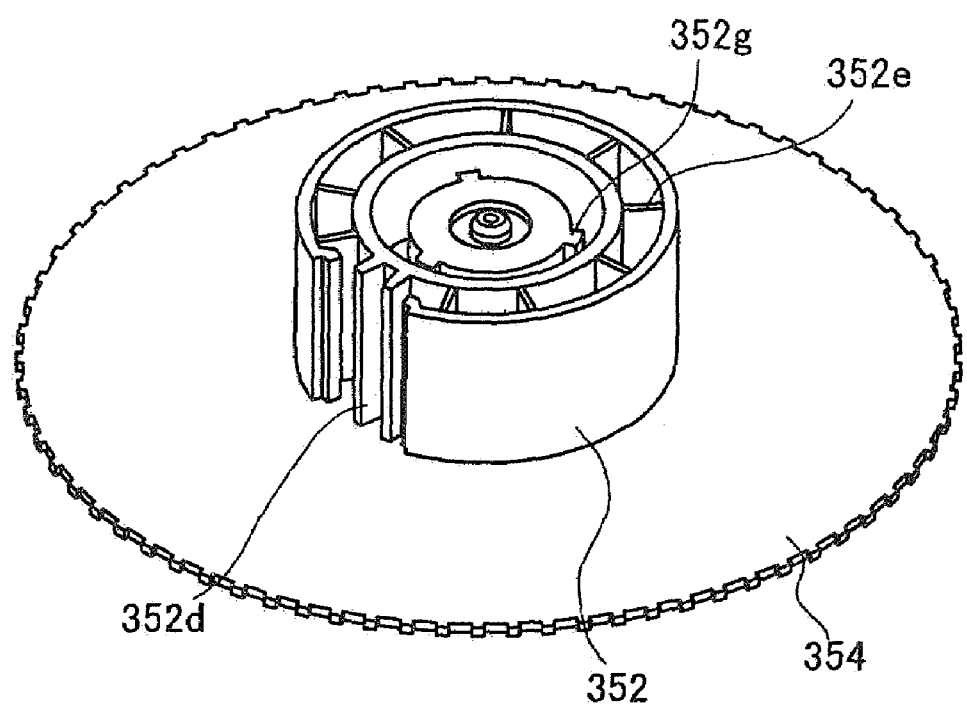
FIG. 36 is a perspective view showing an example of the lower flange as a component of the tape reel shown in FIG. 35.
Figure 37:
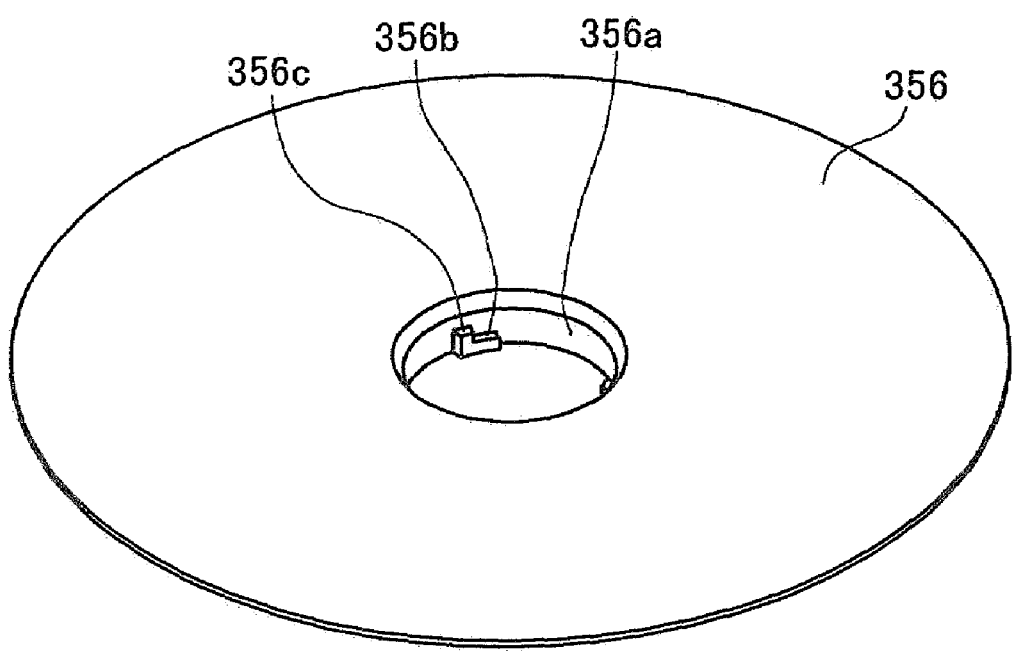
FIG. 37 is a perspective view showing an example of the upper flange as another component of the tape reel shown in FIG. 35.
Figure 38:
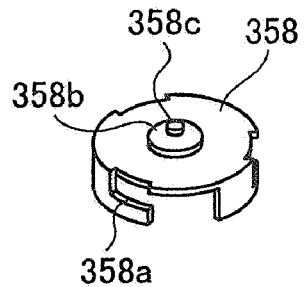
FIG. 38 is a perspective view showing an example of the engage-and-stop member as still another component of the tape reel shown in FIG. 35.
Figure 39:
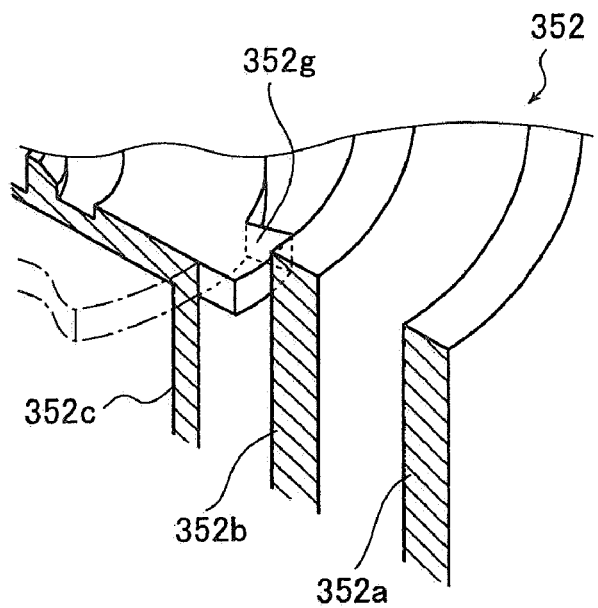
FIG. 39 is a perspective view showing in partial section the essential part of the lower flange as a component of the tape reel shown in FIG. 35.
Figure 40:
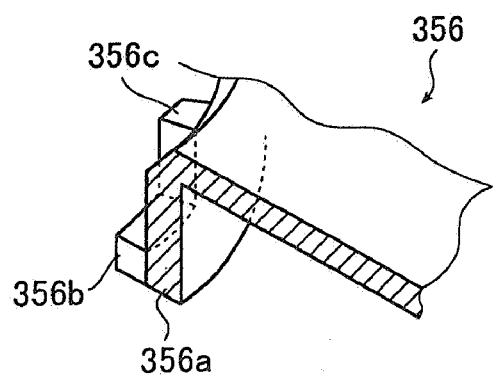
FIG. 40 is a perspective view showing in partial section the essential part of the upper flange as another component of the tape reel shown in FIG. 35.
Figure 41:
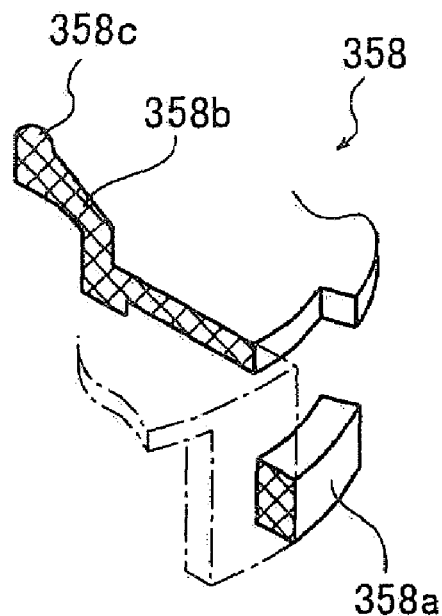
FIG. 41 is a perspective view showing in partial section the essential part of the engage-and-stop member as still another component of the tape reel shown in FIG. 35.
Figure 42:
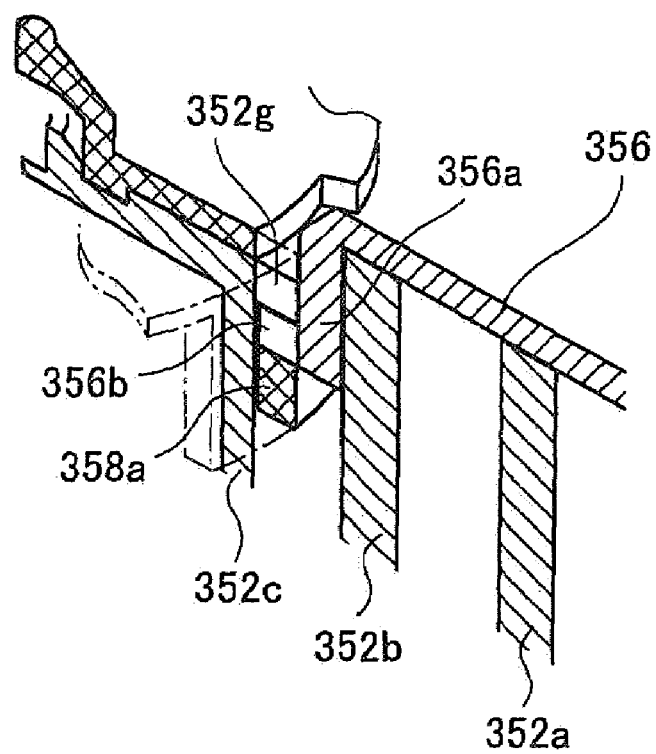
FIG. 42 is a fragmentary perspective view showing the essential part in which the lower flange, the upper flange and the engage-and-stop member have been combined in an example of the fourth aspect of the invention.

FIG. 35 is a perspective view showing in partial section the overall shape of a tape reel that can be broken down according to an example of the fourth aspect of the invention; FIGS. 36-38 are perspective views showing an example each of the lower flange, the upper flange and the engage-and-stop member as components of the tape reel shown. FIGS. 39-41 are perspective views showing in partial section the essential part of the lower flange, the upper flange and the engage-and-stop member as components of the tape reel shown. FIG. 42 is a fragmentary perspective view showing the essential part in which the lower flange, the upper flange and the engage-and-stop member have been combined in the example under consideration.

As shown in FIGS. 35 and 36, the tape reel 350 that can be broken down according to the fourth aspect of the invention comprises a lower flange 354 formed as an integral part of a reel hub 352 around which magnetic tape (not shown) is to be wound, an upper flange 346 which is circular and formed as a generally flat plate, and an engage-and-stop member 358 that secures the lower flange 354 and the upper flange 356 as an integral unit.

The lower flange 354 formed as an integral part of the reel hub 352 has three concentric cylindrical tubes 352a, 352b and 352c, with a fixing end 352d (see FIG. 36) provided in part of the outermost cylindrical tube 352a for fixing an end of magnetic tape.

A multiple of ribs 352e are provided between the outermost cylindrical tube 352a and the intermediate cylindrical tube 352b which is connected to the innermost cylindrical tube 352c by an intermediate wall 352f; this structural design prevents deformation of the three concentric cylindrical tubes 352a, 352b and 352c and guarantees adequate mechanical strength.

A first group of engage-and-stop pawls 352g (three in FIG. 36) are formed at the upper end of the innermost cylindrical tube 352c to extend outward (see FIG. 39).

As shown in FIGS. 37 and 40, the upper flange 356 has a cylindrical portion 356a that fits to the inside of the intermediate cylindrical tube 352b of the reel hub 352 and from the lower end of this cylindrical portion 356a, a second group of engage-and-stop pawls 356b project inward in a number that corresponds to the number (three in the illustrated example) of the first group of engage-and-stop pawls 352g on the reel hub 352. When the cylindrical portion 356a of the upper flange 356 is inserted inside the intermediate cylindrical tube 352b of the reel hub 352 and twisted clockwise, the second group of engage-and-stop pawls 356b will be brought into engagement with the first group of engage-and-stop pawls 352g; positioning of the second group of engage-and-stop pawls 356b in the rotational direction is effected by means of a stopper 356c (see FIG. 42).

As shown in FIGS. 38 and 41, the engage-and-stop member 358 is inserted between the intermediate cylindrical tube 352b of the reel hub 352 and the innermost cylindrical tube 352c and has a third group of engage-and-stop pawls 358a (three in the illustrated example) that extend downward. After being inserted between the intermediate cylindrical tube 352b of the reel hub 352 and the innermost cylindrical tube 352c, the third group of engage-and-stop pawls 358a are twisted counterclockwise to the position where the first group of engage-and-stop pawls 352g are in engagement with the second group of engage-and-stop pawls 356b, whereupon the second engage-and-stop pawl 356b of the upper flange 356 is securely held between the first engage-and-stop pawl 352g of the reel hub 352 and the third engage-and-stop pawl 358a to prevent further twisting of the upper flange 356 (see FIG. 42).

To be more specific, the upper flange 356 cannot be twisted any further in a clockwise direction because the stopper 356c on the second engage-and-stop pawl 356b contacts the first engage-and-stop pawl 352g on the reel hub 352 (see FIG. 42); the upper flange 356 cannot be twisted any further in a counterclockwise direction because the second engage-and-stop pawl 356b is held between the first engage-and-stop pawl 352g and the third engage-and-stop pawl 358a.

Any insufficiency in the holding power to be exerted by the first engage-and-stop pawl 352g and the third engage-and-stop pawl 358a can be easily dealt with by forming tiny asperities in the mating surfaces of the first engage-and-stop pawl 352g and the second engage-and-stop pawl 356b or by making those mating surfaces slightly tapered to provide large enough friction against the twisting of the upper flange 356.

The engage-and-stop member 358 has a conical elastic portion 358b formed in the center and a spherical convex 358c is provided at the center such that it will project from the upper surface of the upper flange 356. When the lower half 454 is combined with the upper half 452 to make the cassette case (see FIG. 53) and the tape reel 350 is assembled into the case to fabricate the magnetic tape cassette, the elastic portion 358b and the convex 358c come into contact with the inner surface of the upper half 452, acting together as a spring that urges the tape reel 350 toward the lower half 454. Thus, in the example under consideration, the engage-and-stop member 358 also functions as a reel retaining spring.

The foregoing example is just one case of the invention and should by no means be taken as limiting. For instance, the engage-and-stop pawls 352*g* to be provided on the reel hub 352 may be interchanged for the engage-and-stop pawls 356*b* (356*c*) provided on the upper flange 356 and L-shaped engage-and-stop pawls may be provided on the reel hub 352 rather than on the upper flange 356.

Various other improvements and modifications can of course be made without departing from the spirit and scope of the invention; for instance, slits may be provided as appropriate in the elastic portion 358*b* of the engage-and-stop member 358 in order to modify the force by which the tape reel 350 is urged toward the lower half 454.

Described above are the basic features of the design for the magnetic tape cassette according to the fourth aspect of the invention.

A tape reel that can be broken down according to the fifth aspect of the invention is now described with reference to FIGS. 43-45.

Note that the tape reel that can be broken down according to the fifth aspect of the invention is applicable to both the above-mentioned one-reel type magnetic tape and the conventional two-reel type magnetic tape cassette illustrated in FIG. 53. Also note that the constituent elements of the cassette other than the tape reel according to the fifth aspect of the invention are not limited in any particular way and may be the same as those used in the prior art magnetic tape cassette shown in FIG. 53; hence, those constituent elements are not shown specifically in FIGS. 43-45, nor are they explained in the following description.

Figure 43:
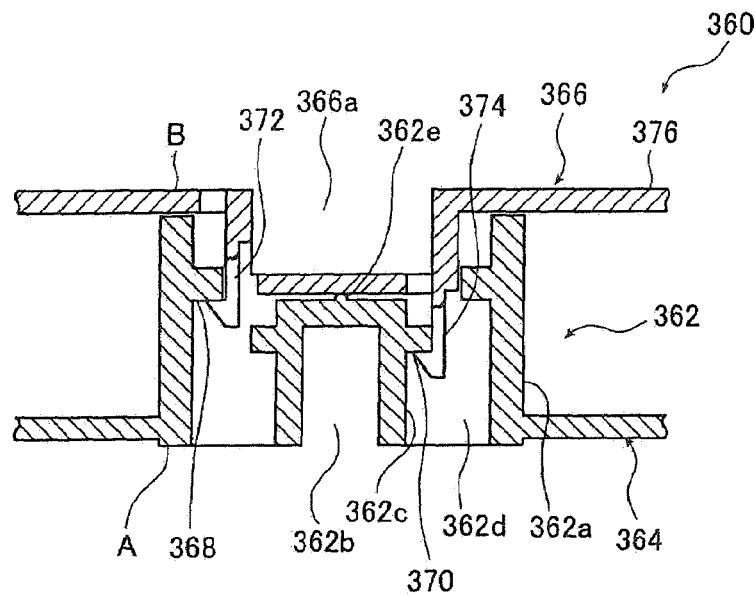
FIG. 43 is a cross-sectional view showing the essential part (central part) of a specific example of the tape reel that can be broken down according to the fifth aspect of the invention.

FIG. 43 is a cross-sectional view showing the essential part (central part) of a specific example of the tape reel that can be broken down according to the fifth aspect of the invention. As shown in FIG. 43, the tape reel 360 that can be broken down according to the fifth aspect of the invention comprises a lower flange 364 formed as an integral part of a reel hub 362 around which magnetic tape (not shown) is to be wound and an upper flange 366 which is circular and formed as a generally flat plate.

The reel hub 362 formed as an integral part of the lower flange 364 consists of an outer tube 362*a* around which magnetic tape (not shown) is to be wound and an inner tube 362*c* provided in its interior with a coupling portion 362*b* into which the reel shaft on the record/reproduce apparatus is to be inserted (the specific shape of the coupling portion 362*b* is not shown); the outer tube 362*a* and the inner tube 362*c* are joined integrally by means of ribs 362*d*.

An engage-and-stop lug 368 is provided on the inner surface of the outer tube 362*a* in such a way as to project inward whereas an engage-and-stop lug 370 is provided on the outer surface of the inner tube 362*c* in such a way as to project outward. The upper part of the inner tube 362*c* is closed and a convex 362*e* is provided at the center of the closed top such that the lower flange 364 will contact the upper flange 366 via the convex 362*e*.

Provided in the center of the upper flange 366 is a space 366*a* reserved for the means of urging the tape reel 360 toward the lower half; engage-and-stop pawls 372 and 374 extend downward from below the space 366*a*. The engage-and-stop pawls 372 and 374 work as engaging members that bring the upper flange 366 into contact and engagement with the lower flange 364; the engage-and-stop pawl 372 is snap fitted to the engage-and-stop lug 368 whereas the engage-and-stop pawl 374 is snap fitted to the engage-and-stop lug 370, thus causing the upper flange 366 to be secured to the lower flange 364. In the example under consideration, three engage-and-stop pawls 372 are provided as spaced apart by 120 degrees such that they come into contact and engagement with the engage-and-stop lug 368 on the outer tube 362*a* and three engage-and-stop pawls 374 are provided as spaced apart by 120 degrees such that they come into contact and engagement with the engage-and-stop lug 370 on the inner tube 362*c*. It should be noted here that the engage-and-stop pawls 372 and 374 are not both required and either one of them will do.

To mount the upper flange 366 onto the lower flange 364, the following procedure may be taken. First, the engage-and-stop pawls 372 are inserted and strongly depressed from above, whereupon the convex 362*e* at the center of the upper part of the inner tube 362*c* on the reel hub 362 made integral with the lower flange 364 deforms elastically, causing the engage-and-stop pawls 372 and 374 to snap fit to the engage-and-stop lugs 368 and 370 on the lower flange 364, whereby the upper flange 366 is mounted onto the lower flange 364. If the applied depressing force is removed after inserting the engage-and-stop pawls 372, the elastically deformed convex 362*e* causes the force that urges the upper flange 366 upward and this urging force is strong enough to get the upper flange 366 to be joined and secured tightly to the lower flange 364.

If the upper flange 366 is joined to the lower flange 364 in the way just described above, the convex 362*e* at which the lower flange 364 contacts the upper flange 366 is situated inward of the engage-and-stop pawls 372 and 374 on the upper flange 366 but in a position a reasonable distance away from the flange surface 376 of the upper flange 366; the urging force developed by the elastically deformed convex 362*e* acts in such a way as to urge the upper flange 366 upward.

As a consequence, the axial position of the upper flange 366 is determined by the distance from the reference plane A of the lower flange 364 to the engage-and-stop lug 368 or 370 and by the length from the reference plane B of the upper flange 366 to the engage-and-stop pawl 372 or 374; hence, the position of the flange surface 376 of the upper flange 366 can be accurately determined by ensuring that the heights of the engage-and-stop lugs 368 and 370 and the lengths of the engage-and-stop pawls 372 and 374 have accurate values.

In addition, as will be apparent from the foregoing description, the convex 362*e* at which the lower flange 364 contacts the upper flange 366 is desirably situated inward of the engage-and-stop pawls 372 and 374 on the upper flange 366 but in a position a reasonable distance away from the flange surface 376 of the upper flange 366, namely, either at the center of the reel hub 362 or in a nearby area; most desirably, the convex 362*e* is situated at the center of the reel hub 362 as illustrated in the specific example above. The convex 362*e* serves as the means of exerting an urging force on the engage-and-stop pawls 372 and 374 on the upper flange 366 that have been snap fitted to the engage-and-stop lugs 368 and 370 on the lower flange 364 and it can obviously be provided on the upper flange 366 rather than on the lower flange 364.

Figure 44:
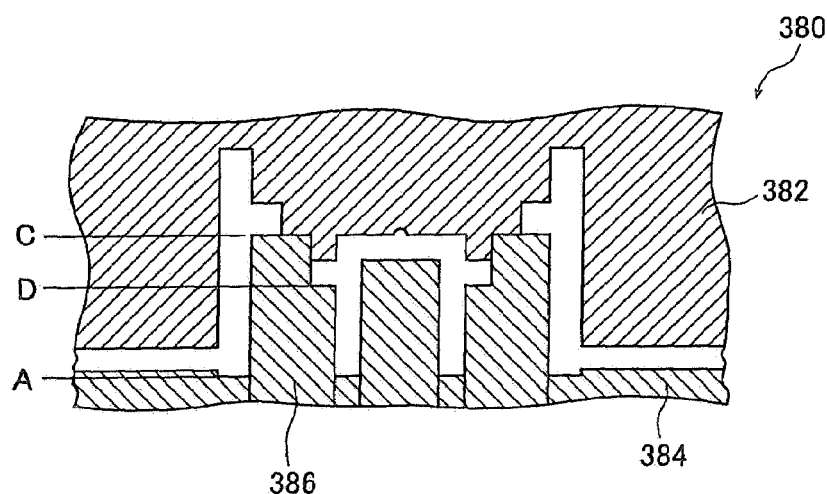
FIG. 44 is a cross-sectional view showing the structure of the essential part (central part) of a die assembly for molding the reel hub of the lower flange in the same example of the fifth aspect of the invention.

FIG. 44 is a cross-sectional view showing the structure of the essential part (central part) of a die assembly for molding the reel hub 362 of the lower flange 364 in the specific example under consideration. The die assembly generally indicated by 380 has essentially the same structure as the ordinary type and comprises a moving upper die 382 and a fixed lower die 384; into the space defined by the upper die 382 and the lower die 384, molten plastic is injected to mold a shape. The reference plane A of the lower flange 364 is formed in the lower die 384 and planes C and D which provide the engage-and-stop lugs 368 and 370 that are to be engaged by the engage-and-stop pawls 372 and 374 are also formed in a fixed core 386 secured integrally to the lower die 384.

Thus, the reference plane A of the lower flange 364 formed in the lower die 384 and the planes C and D formed in the fixed core 386 are provided parallel in the same orientation in either the fixed die or the moving die (in the fixed die in the specific example under consideration) and this assures high precision in plastics processing. Even if the mating position of dies changes on account of various factors including the precision in mating of dies, its thermal deformation and the pressure of molten plastic being injected, the relative positions of the reference plane A and the planes C and D will not change and the precision in the molding dies will be directly transferred to shaped parts.

The precision in the distance between the reference plane A and the plane C or D can be adjusted to 0.01 mm without any particular difficulty. Similarly, the distance from the reference position B of the upper flange 366 to the engage-and-stop pawl 372 or 374 can be adjusted to 0.01 mm without any particular difficulty since the they can be molded by a fixed die on the same side of the die assembly; compared to the prior art, a ten times high precision can be achieved with relative ease and the wobbling of the upper flange 366 can be reduced drastically.

If the magnetic tape cassette using the tape reel that can be broken down according to the example just described above is to be discarded after service, a suitable tool is inserted into the tape reel from below and the engage-and-stop pawls 372 and 374 are disconnected from the engage-and-stop lugs 368 and 370, whereby the upper flange 366 can be easily separated from the lower flange 364; in this way, the respective parts of the magnetic tape cassette can be assorted by material.

Figure 45:
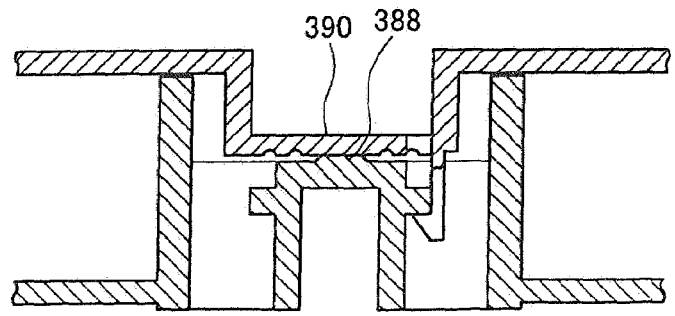
FIG. 45 is a cross-sectional view showing the essential part (central part) of another example of the fifth aspect of the invention.

FIG. 45 is a cross-sectional view showing the essential part (central part) of another specific example of the tape reel that can be broken down according to the fifth aspect of the invention. The example illustrated in FIG. 45 has the following differences from the example shown in FIG. 43: the engage-and-stop lug 368 and the engage-and-stop pawl 372 shown in FIG. 43 are omitted and only the engage-and-stop lug 370 and the engage-and-stop pawl 374 are used; the convex 362e as the area where the lower flange 364 contacts the upper flange 366 is replaced by a mesa-shaped projection 388 that will not deform elastically and an elastically deformable portion 390 is provided on the upper flange 366.

The other features of the design shown in FIG. 45 are identical to those of the specific example shown in FIG. 43 and need not be described here in detail. Needless to say, the design features of the specific example shown in FIG. 43 may be combined with those of the specific example shown in FIG. 45 so that an elastically deformable urging means is provided on both the lower flange 364 and the upper flange 366 to ensure that the upper flange 366 is urged upward by the interaction of the two urging means.

The tape reel that can be broken down according to the fifth aspect of the invention is by no means limited to the foregoing examples and it goes without saying that various improvements and alterations are possible without departing from the scope and spirit of the invention; for instance, various modifications are possible for the elastically deformable urging means and the urging force can be adjusted to various intensities.

Described above are the basic design features of the tape reel that can be broken down according to the fifth aspect of the invention.

We next describe the resinous (plastic) leaf spring according to the sixth aspect of the invention and the process for its production with reference to FIGS. 46-52.

Note that the resinous leaf spring according to the sixth aspect of the invention is applicable to both the above-mentioned one-reel type magnetic tape and the conventional two-reel type magnetic tape cassette illustrated in FIG. 53. Also note that the constituent elements of the cassette other than the resinous leaf spring according to the sixth aspect of the invention are not limited in any particular way and may be the same as those used in the prior art magnetic tape cassette shown in FIG. 53; hence, those constituent elements are not shown specifically in FIGS. 46-52, nor are they explained in the following description.

Figure 46:
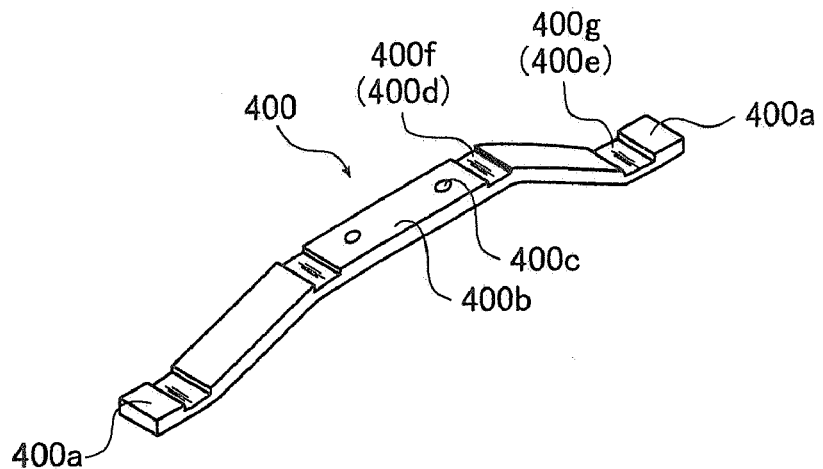
FIG. 46 is a perspective view showing the shape of a reel urging spring in the form of a resinous leaf spring according to an example of the sixth aspect of the invention.
Figure 47:
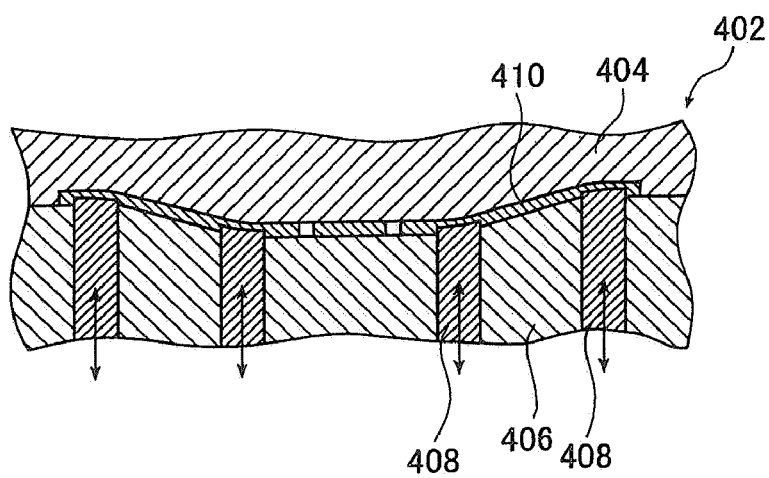
FIG. 47 is a cross-sectional view showing an exemplary die assembly that may be used to mold the reel urging spring shown in FIG. 46.

FIG. 46 is a perspective view showing the shape of a reel urging spring in the form of a resinous (plastic) leaf spring according to an example of the sixth aspect of the invention and FIG. 47 is a cross-sectional view showing an exemplary die assembly that may be used to mold the reel urging spring shown in FIG. 46.

The reel urging spring in the form of a resinous leaf spring which is generally indicated by 400 in FIG. 46 functions as a reel retaining spring and can be substituted for the conventional reel retaining spring 466 in the form of a metallic leaf spring which is shown in FIG. 53. As in the case of the conventional reel retaining spring 466, the leaf spring 400 shown in FIG. 46 is turned upside down before it is mounted on the upper half To be more specific, both end portions 400a of the leaf spring 400 are bent down and with the aid of through-holes 400c in the center portion 400b, the leaf spring 400 is fixed to the lower side of the bottom plate 452a of the upper half 452, typically by ultrasonic or thermal welding as in the case of the prior art. Mounted in this way, the reel urging spring 400 depresses the centers of two tape reels 456 by the end portions 400a so that they are urged toward the lower half 454.

The top (i.e., center 400b) of the mesa-shaped reel urging spring 400 in the form of a resinous leaf spring is defined by two inflection points 400d and the legs (i.e., end portions 400a) are defined by two inflection points 400e. In the example under consideration, thin-walled portions 400f are formed in the upper part of areas near the inflection points 400d and thin-walled portions 400g are also formed in the upper part of areas near the inflection points 400e. The thin-walled portions 400f and 400g of the leaf spring 400 having the shape shown in FIG. 46 contribute to reducing the rigidity of the leaf spring 400. Without question, the spring load of the leaf spring is in effect determined by the rigidity of the thin-walled portions and, therefore, the spring load of the leaf spring taken as a whole can be controlled by adjusting the thickness of the thin-walled portions.

The mesa-shaped resinous leaf spring 400 having the thin-walled portions 400f and 400g can be molded with a die assembly of the design illustrated in FIG. 47, which is a cross-sectional view showing an exemplary die assembly that may be used to mold the reel urging spring 400 shown in FIG. 46. The die assembly generally indicated by 402 in FIG. 47 has an upper die 404 and a lower die 406 as the base parts that define the basic shape of the reel urging spring 400. In the example under consideration, a moving part (movable core) 408 that can control the spring load by adjusting the thickness of the reel urging spring 400 is provided in the lower die (core) 406 under the inflection points 400d defining the top (i.e., center 400b) of the mesa-shaped reel urging spring 400 and under the inflection points 400e defining the legs (i.e., end portions 400a). The die assembly is so designed that the moving cores 408 are moved up and down during molding in order to control the thickness of the thin-walled portions 400f and 400g.

As indicated by two-head arrows in FIG. 47, the movable cores 408 are capable of vertical movement and can be fixed at any position. If the movable cores 408 are pushed up, the thicknesses of the thin-walled portions 400f and 400g provided under the inflection points 400d and 400e of the reel urging spring 400 decrease and so does the rigidity of the thin-walled portions to reduce the spring load of the leaf spring taken as a whole; if the movable cores 408 are pulled-down, the thicknesses of the thin-walled portions 400f and 400g provided under the inflection points 400d and 400e of the reel urging spring 400 increase and so does the rigidity of the thin-walled portions to increase the spring load of the leaf spring taken as a whole. Hence, the die assembly 402 has the advantage that it can mold the reel urging spring 410 at various values of spring load by simply changing the position of the movable cores 408.

Figure 48:
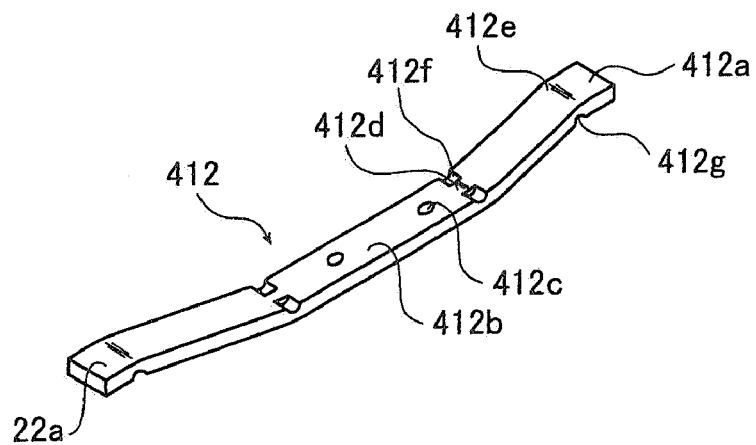
FIG. 48 is a perspective view showing the shape of a reel urging spring in the form of a resinous leaf spring according to another example of the sixth aspect of the invention.

FIG. 48 is a perspective view showing the shape of a reel urging spring in the form of a resinous leaf spring according to another example of the sixth aspect of the invention. As in the case of the reel urging spring 400 shown in FIG. 46, the reel urging spring generally indicated by 412 in FIG. 48 is turned upside down before it is mounted on the upper half. To be more specific, both end portions 412a of the reel urging spring 412 are bent down and with the aid of through-holes 412c in the center portion 412b, the reel urging spring 412 is fixed to the lower side of the bottom plate 452a of the upper half 452, typically by ultrasonic or thermal welding. As with the reel urging spring 400 shown in FIG. 46, the reel urging spring 412 depresses the centers of two tape reels 456 by the end portions 412a so that they are urged toward the lower half 454.

The reel urging spring 412 of the example under consideration and the reel urging spring 400 shown in FIG. 46 differ in the following point: the reel urging spring 400 depends on the thin-walled portions 400f and 400g for controlling spring load but in the reel urging spring 412 according to the example under consideration, recesses 412f and 412g are formed near inflection points 412d and 412e and the sizes or depths of these recesses 412f and 412g or their positions are changed to control spring load.

Figure 49:
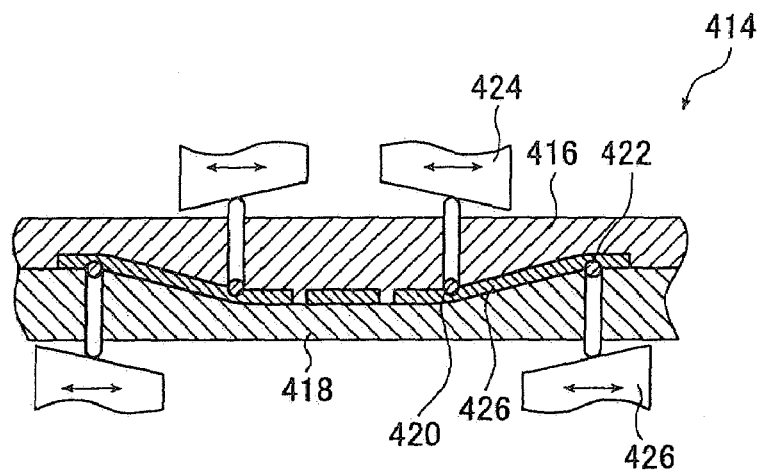
FIG. 49 is a cross-sectional view showing an exemplary die assembly that may be used to mold the reel urging spring shown in FIG. 48.

The reel urging spring 412 described above can be molded with a die assembly of the design illustrated in FIG. 49, which is a cross-sectional view showing an exemplary die assembly that may be used to mold the reel urging spring 412 shown in FIG. 48. The die assembly generally indicated by 414 in FIG. 49 has an upper die 416 and a lower die 418 as the base parts that define the basic shape of the reel urging spring 412. Moving pins 420 and 422 that can control the spring load of the reel urging spring 412 are provided on the upper die 416 near the inflection points 412d which define the top (i.e., center 412b) of the mesa-shaped reel urging spring 412 and on the lower die 418 near the inflection points 412e which define the legs (i.e., end portions 412a).

By moving the pins 420 and 422 up and down, the sizes of the recesses 412f and 412g (the depths of their dimples) relative to the thickness of the leaf spring can be adjusted; at the same time, by moving the pins 420 and 422 back and forth in a direction normal to the paper, the depths of the recesses 412f and 412g in the direction of the width of the leaf spring (how far the recesses extend widthwise) can be adjusted.

The pins 420 and 422 are not only movable in the vertical direction. They are also depressed by means of adjusting blocks 424 and 426; if the adjusting blocks 424 and 426 are moved to the right and left as indicated by arrows in FIG. 49, the adjusting pins 420 and 422 are moved up and down and can be fixed at a desired position, thereby adjusting the sizes (dimple depths) of the recesses 412f and 412g which are provided in the reel urging spring 412 near the inflection points 412d and 412e. In addition, by moving the pins 420 and 422 back and forth in a direction normal to the paper, the depths of the recesses 412f and 412g in the direction of the width of the leaf spring can be adjusted.

As in the example illustrated in FIG. 46, the reel urging spring 412 according to the example under consideration allows spring load adjustment by increasing the sizes of the recesses 412f and 412g (the depths of their dimples) or the depths of the recesses 412f and 412g, whereupon the rigidity of the reel urging spring 412 at the recesses decreases to reduce the spring load of the leaf spring or, alternatively, by reducing the sizes of the recesses 412f and 412g (the depths of their dimples) or the depths of the recesses 412f and 412g, whereupon the rigidity of the reel urging spring 412 increases to increase the spring load of the leaf spring. Hence, the die assembly 414 has the advantage that it can mold the reel urging spring 426 at various values of spring load by simply moving the pins 420 and 422 either vertically or in a direction perpendicular to the paper.

Figure 50:
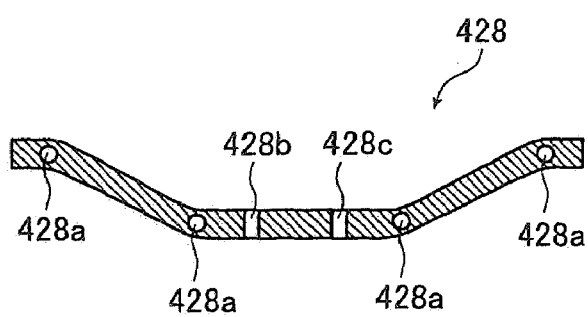
FIG. 50 is a cross-sectional view showing the shape of a resinous leaf spring (shape 1) according to still another example of the sixth aspect of the invention.

If desired, the pins 420 and 422 may be moved to the right and left (this case however is not shown in FIG. 49), whereupon the positions of the recesses to be formed in the leaf spring are changed so that the length of the leaf spring is effectively changed to adjust its spring load. If the pins 420 and 422 are positioned within the thicker portion of the leaf spring 428 as illustrated in FIG. 50, holes 428a can be opened into a lateral side of the leaf spring 428. In this alternative case, the spring load of the leaf spring 428 can be adjusted by changing the depth and position of the holes 428a made in a lateral side of the leaf spring 428. If the holes 428a are through-holes, the spring load of the leaf spring can be adjusted by effectively changing its length or thickness.

Figure 51:
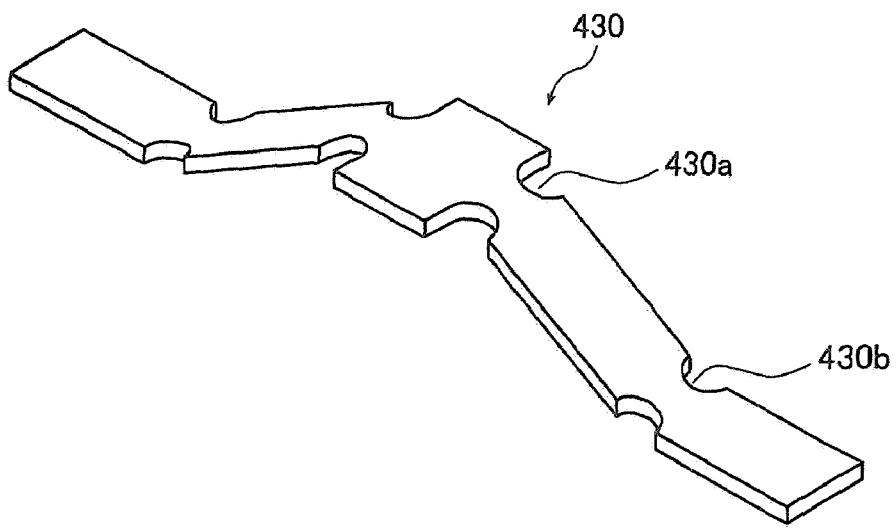
FIG. 51 is a perspective view showing the shape of a resinous leaf spring (shape 2) according to yet another example of the sixth aspect of the invention.
Figure 52:
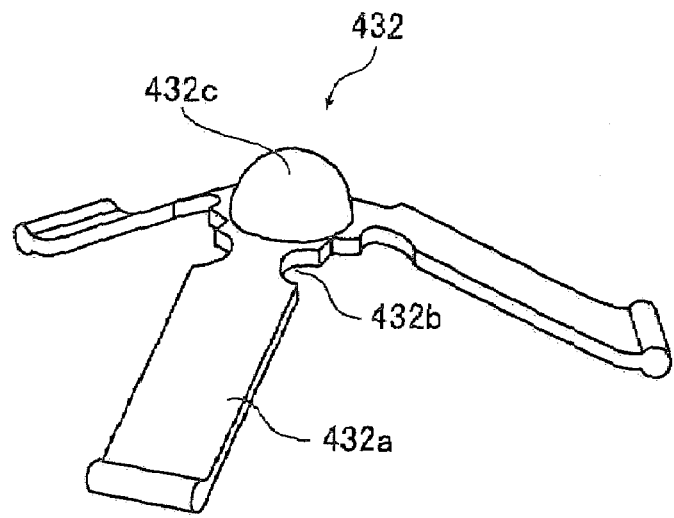
FIG. 52 is a perspective view showing the shape of a resinous leaf spring (shape 3) according to a further example of the sixth aspect of the invention.
Figure 54:
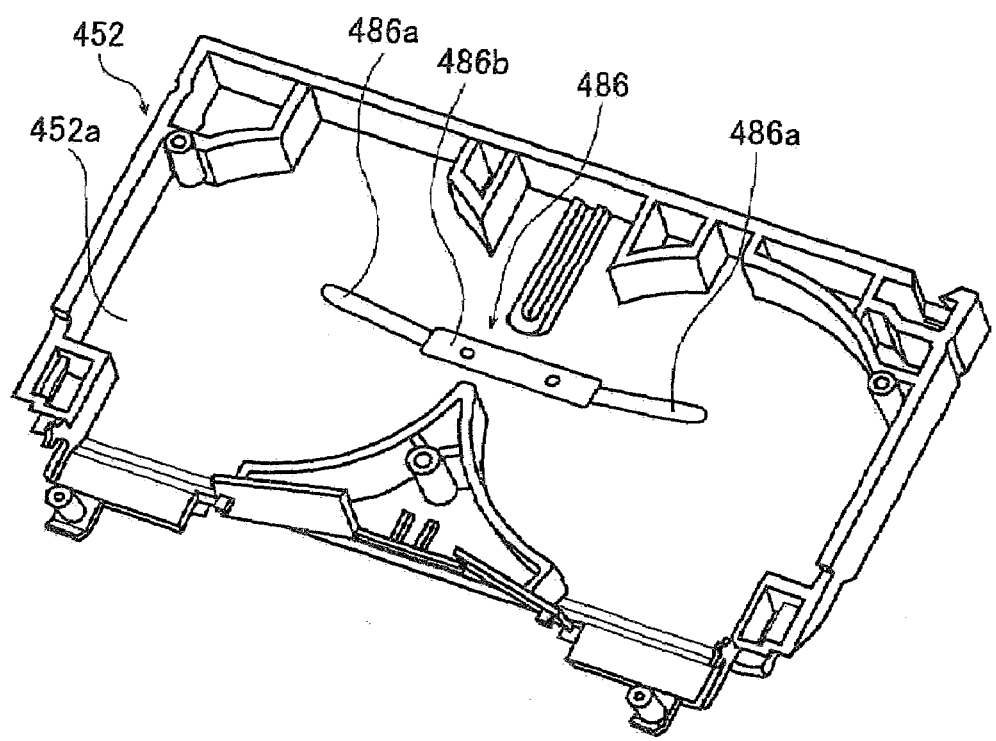
FIG. 54 is a perspective view showing how the inner surface of the upper half of a magnetic tape cassette looks like if it is fitted with a different example of the conventional reel retaining spring than is shown in FIG. 53.

FIGS. 51 and 52 are perspective views showing still other examples of the sixth aspect of the invention.

The resinous leaf spring generally indicated by 430 in FIG. 51 is not intended for use in any particular application and it has the mesa shape commonly adopted by resinous leaf springs. The leaf spring 430 has cutouts 430a and 430b formed on opposite sides near inflection points that define the mesa shape and the spring load of the leaf spring 430 is adjusted by changing the depths of the cutouts 430a and 430b. The depths of the cutouts 430a and 430b to be formed in the leaf spring 430 can be easily controlled by changing the position of the moving core in the direction of width of the leaf spring 430.

The resinous leaf spring generally indicated by 432 in FIG. 52 has a plurality of legs 432a that extend radially from the central base in a plurality of directions (three in the illustrated case); the legs 432a have cutouts 432b that are similar to the cutouts 430a and 430b in the leaf spring 430 illustrated in FIG. 51 and which are formed only in the neighborhood of inflection points at the upper end of the leaf spring 432. In this case, too, the spring load can be adjusted by changing the depth of the cutouts 432b. The depth of the cutouts 432b can also be changed easily by varying the positions of pins in the direction of the width of the leaf spring. A convex 432c that contacts the inner surface of the upper half is provided at the central base of the leaf spring 432.

The resinous leaf springs 430 and 432 shown in FIGS. 51 and 52 are similar to the reel urging springs 400 and 412 in the form of a resinous leaf spring in that they function as reel retaining springs.

The die assembly used to mold the resinous leaf spring according to the sixth aspect of the invention is in no way limited to the foregoing examples and various other methods may be adopted. Modified methods of forming thin-walled portions include forming thin-walled portions each comprising a plurality of steps on the leaf spring using a plurality of moving cores, as well as providing a moving core in the direction of spring width in order to mold a leaf spring that is reduced in width over a specified length rather than forming recesses or cutouts in selected areas as shown in FIGS. 50-52.

Modified methods can also be employed to form recesses or cutouts. In one modification, through-holes sufficiently smaller than the thickness of a leaf spring are provided through the thickness of the leaf spring and moved in the direction of its thickness so as to change the thicknesses of portions both above and under the through-holes; in another modification, through-holes are provided in a direction perpendicular to the thickness of a leaf spring and the positions of the holes are changed along the length of the leaf spring in order to vary its effective length. In the foregoing examples, thin-walled portions and recesses or cutouts are provided in the neighborhood of inflection points but this is not the sole case of the invention and thin-walled portions and recesses or cutouts may be situated at any position in the area that works as a spring.

Described above are the basic design features of the resinous leaf spring according to the sixth aspect of the invention and the process for producing it.

While the magnetic tape cassette according to the invention, the tape reel for use with it, as well as the resinous leaf spring according to the invention and the process for producing it have been described above in detail with reference to examples, it should be understood that the invention is by no means limited to the specific examples given and such examples can obviously be adopted in any desired combinations. In addition, there is no need to say that various improvements and alterations can be made without departing from the spirit and scope of the invention.

As described above in detail, according to the first aspect of the invention, tape reels housed in a cassette case can be urged toward the lower half by means of a member whose structure is simple and permits easy fitting and removal. For this reason, the magnetic tape cassette according to the first aspect of the invention is advantageous for assorted collection of resin materials.

As described above, according to the second aspect of the invention, a leaf-like reel urging spring can be easily removed from the cassette case and even a metallic reel urging spring can be easily separated for collection. For this reason, the magnetic tape cassette according to the second aspect of the invention is effective for the purpose of separating its constituent materials into resin and metal and collecting them by material.

As described above in detail, according to the third, fourth and fifth aspects of the invention, tape reels as parts of a magnetic tape cassette discarded after use can be easily separated and assorted by material.

To be specific, according to the third aspect of the invention, there are provided tape reels that will not accidentally tear apart during service of a magnetic tape cassette.

According to the fourth aspect of the invention, there are provided tape reels that are protected against accidental tearing apart during service of a magnetic tape cassette by preventing the unwanted twisting of the upper flange.

According to the fifth aspect of the invention, there are provided tape reels that can be broken down and which are so designed that the upper flange wobbles to the smallest possible extent.

As described above in detail, according to the sixth aspect of the invention, thin-walled portions or recesses or cutouts are formed in a resinous leaf spring, typically in the neighborhood of inflection points; hence, by using a die assembly that can change the thickness of thin-walled portions or the size or depth of recesses or cutouts or their positions, one can easily adjust spring load while molding the spring. Hence, the manufacturer who is attempting to determine the appropriate spring load by trial molding has no need to make a lot of expensive die assemblies and he can produce many samples of leaf spring at low cost that have different spring loads.

The die assembly used to mold the leaf spring comprises the base part which defines the basic shape of the leaf spring and a moving part that is capable of movement relative to said base part, either said base part or said moving part being equipped with a movable part that allows adjustment of the spring load of the leaf spring and which is actuated to change the thickness of the leaf spring or form recesses or cutouts in selected areas of the leaf spring at varied sizes, depths or positions, thereby adjusting the spring load of the leaf spring being molded. This offers the advantage of enabling the manufacturer to prepare die assemblies with ease on the basis of the conventional mold fabrication technology.

Further, as described above, according to the seventh aspect of the invention, tape reels housed in a cassette case can be urged by means of a resinous member of a simple structure and they still can be easily separated for collection by material.

As described above, according to the eighth aspect of the invention, tape reels housed in a cassette case can be urged by means of a simple and straightforward structure without using metallic springs and this proves advantageous for assorted collection of resin materials.

In addition, as described above in detail, according to the ninth aspect of the invention, a reel urging spring the insertion portion of which has at least two bends is inserted into a reel urging spring insertion area provided in the upper half of a magnetic tape cassette (recording media cartridge), whereby the reel urging spring is brought into engagement with the upper half. This offers the marked advantage of realizing a magnetic tape cassette from which the reel urging spring can be easily taken out.

Further in addition, as described above, according to the tenth aspect of the invention, the metallic leaf spring conventionally used as a reel urging spring in magnetic tape cassettes is replaced by a nonmetallic spring which is mounted on the tape reel, not as in the prior art being fixed to the inner surface of the upper half by screwing, ultrasonic or thermal welding, and the spring not only has an unconventional unique shape but it can also be assembled into the cassette by simply being placed in position. As a result, the need to perform screwing, ultrasonic or thermal welding or otherwise secure the reel urging spring is eliminated to enable the manufacture of magnetic tape cassettes at even lower cost.

Another advantage that is offered is evident when a magnetic tape cassette discarded after use is broken down into respective parts which are assorted by material, collected and recycled at an existing plant. To begin with, there are no metal parts that need manual separation and, secondly, the reel urging spring can be easily separated by simply breaking down the cassette or pulling up the central part of the reel urging spring after the cassette is torn apart; this contributes to substantial cut on the recycling cost.

What is claimed is:

1. A magnetic tape cassette comprising:
a case that is formed by joining an upper half and a lower half;
a tape reel or tape reels around which magnetic tape is wound and which are housed in said case;
a window through which the magnetic tape is visible and with which said upper half is provided; and
a reel urging member having a tape reel contacting portion which contacts an upper part of said tape reel or each of said tape reels, bent arms connected to opposite sides of the tape reel contacting portion and sliding end portions provided at distal ends of the bent arms,
wherein a slide groove along which said sliding end portions of said reel urging member slide is provided in an inner surface of a perimeter of a window opening in said upper half and a window member which is removably fitted in said window opening has hold-and-retain portions which hold said sliding end portions in cooperation with a bottom surface of said slide groove into which said sliding end portions have been fitted.

2. A magnetic tape cassette according to claim 1, wherein said bottom surface of said slide groove holds said sliding end portions in cooperation with said hold-and-retain portions of said window member in a way that allows the sliding end portions to slide after complete assembly of the magnetic tape cassette.

3. A magnetic tape cassette according to claim 1, wherein said sliding end portions of said reel urging member slide in opposite directions with respect to one another.

4. A magnetic tape cassette according to claim 1, wherein said bottom surface of said slide groove extends continuously between a position where one of said sliding end portions contacts said bottom surface to a position where another of said sliding end portions contacts said bottom surface.

5. The magnetic tape cassette according to claim 1, wherein each of said sliding end portions of said reel urging member is inserted between said bottom surface of said slide groove and each of said hold-and-retain portions and is free to slide.

6. A magnetic tape cassette comprising:
at least one tape reel around which magnetic tape is wound,
a case including an upper half joined to a lower half; said at least one tape reel being housed in said case; said upper half comprising
at least one window opening through which the magnetic tape is visible, and
at least one slide groove provided in an inner surface of a perimeter of said at least one window opening, said slide groove including a bottom surface;
at least one window member, said at least one window member being removably fitted in said at least one window opening, each of said at least one window member including hold-and-retain portions; and
at least one reel urging member, each of said at least one reel urging member including a tape reel contacting portion which contacts an upper part of a tape reel, bent arms connected to opposite sides of the tape reel contacting portion and sliding end portions provided at distal ends of the bent arms; and
wherein said sliding end portions of said at least one reel urging member are positioned to slide along said bottom surface of said at least one slide groove such that said sliding end portions are held between said bottom surface and said hold-and-retain portions.

7. A magnetic tape cassette according to claim 6, wherein said bottom surface of said slide groove holds said sliding end portions in cooperation with said hold-and-retain portions of said window member in a way that allows the sliding end portions to slide after complete assembly of the magnetic tape cassette.

8. A magnetic tape cassette according to claim 6, wherein said sliding end portions of said reel urging member slide in opposite directions with respect to one another.

9. A magnetic tape cassette according to claim 6, wherein said bottom surface of said slide groove extends continuously between a position where one of said sliding end portions contacts said bottom surface to a position where another of said sliding end portions contacts said bottom surface.

10. A magnetic tape cassette comprising:
a case that is formed by joining an upper half and a lower half;
a tape reel or tape reels around which magnetic tape is wound and which are housed in said case;
a window through which the magnetic tape is visible and with which said upper half is provided; and
a reel urging member having a tape reel contacting portion which contacts an upper part of a center of said tape reel or each of said tape reels, two bent arms connected to opposite sides of the tape reel contacting portion and two sliding end portions provided at distal ends of the two bent arms, respectively,
wherein a slide groove along which said two sliding end portions of both ends of said reel urging member slide, respectively, is provided in an inner surface of a perimeter of a window opening in said upper half and in both sides of said tape reel housed in said case such that said slide traverses said center of said tape reel, and
a window member which is removably fitted in said window opening has two hold-and-retain portions which are located in opposite sides of a center in a longitudinal direction of said slide groove, and hold said two sliding end portions of both ends of said reel urging member in cooperation with a bottom surface of said slide groove into which said two sliding end portions have been fitted, respectively and,
wherein each of said two sliding end portions of said reel urging member is inserted between said bottom surface of said slide groove and each of said two hold-and-retain portions and is free to slide.

11. The magnetic tape cassette according to claim 10, wherein two spaces are provided in said opposite sides of said center in the longitudinal direction of said slide groove between said bottom surface of said slide groove and said two hold-and-retain portions, respectively, and said two sliding end portions of said reel urging member are inserted into said two spaces, respectively.

12. The magnetic tape cassette according to claim 10, wherein
said window member further has a border that is thinner than a thickness of said window just fitted in said window opening and that is provided in said perimeter of said window opening except a portion corresponding to said slide groove and having said two hold-and-retain portions, and a thickness of said two hold-and-retain portions is thinner than that of said window, two first stepped areas which have a step smaller than that of said slide groove and into which two distal ends of said two hold-and-retain portions of said window member are fitted are further provided along said slide groove in said inner surface of said perimeter of said window opening in said upper half, a second stepped area which has a step smaller than that of said slide groove and into which said border of said window member is fitted is further provided along said window opening except said slide groove in said inner surface of said perimeter of said window opening in said upper half, and an inner surface of said upper half in which said window member is fitted in said window opening by inserting said window, said two hold-and-retain portions and said border into said window opening, two first stepped areas and said second stepped area is flat.

* * * * *